(12) United States Patent
Takahashi

(10) Patent No.: US 7,522,484 B2
(45) Date of Patent: Apr. 21, 2009

(54) OPTICAL INFORMATION PROCESSOR

(75) Inventor: Yuuichi Takahashi, Kitakatsuragi-gun (JP)

(73) Assignee: Panaosnic Corporation, Kadoma (JP)

( * ) Notice: Subject to any disclaimer, the term of this patent is extended or adjusted under 35 U.S.C. 154(b) by 602 days.

(21) Appl. No.: 11/274,914

(22) Filed: Nov. 15, 2005

(65) Prior Publication Data

US 2006/0104185 A1    May 18, 2006

(30) Foreign Application Priority Data

Nov. 17, 2004   (JP)   ............................. 2004-332991

(51) Int. Cl.
   *G11B 7/00* (2006.01)
(52) U.S. Cl. ............................. 369/44.23; 369/112.01
(58) Field of Classification Search ............ 369/112.01, 369/112.02, 112.03, 44.23, 44.24, 118, 44.41, 369/44.42
   See application file for complete search history.

(56) References Cited

U.S. PATENT DOCUMENTS

| | | | | |
|---|---|---|---|---|
| 5,499,262 | A * | 3/1996 | Nakata | ........................ 372/108 |
| 5,640,380 | A   | 6/1997 | Saimi et al. | |
| 6,014,361 | A * | 1/2000 | Nagashima et al. | .... 369/112.28 |
| 6,144,623 | A * | 11/2000 | Inoue et al. | ............... 369/44.23 |
| 6,160,646 | A * | 12/2000 | Takahashi et al. | ....... 369/112.08 |
| 6,346,695 | B2  | 2/2002 | Yanagawa et al. | |
| 6,618,417 | B2 * | 9/2003 | Ohkubo et al. | ............ 372/46.01 |
| 6,788,644 | B1 * | 9/2004 | Braat | ....................... 369/275.4 |
| 6,914,870 | B2 * | 7/2005 | Asada et al. | ............ 369/112.18 |
| 6,917,454 | B2 * | 7/2005 | Mori et al. | ..................... 359/15 |
| 6,920,101 | B2 * | 7/2005 | Saitoh et al. | ............ 369/112.01 |
| 7,113,316 | B2 * | 9/2006 | Mori et al. | ..................... 359/15 |
| 7,177,336 | B2 * | 2/2007 | Taneya et al. | ................. 372/64 |

FOREIGN PATENT DOCUMENTS

| | | |
|---|---|---|
| JP | 8-102080 | 4/1996 |
| JP | 2907759 | 4/1996 |

OTHER PUBLICATIONS

Matsushita Technical Journal, "DVD", vol. 45, No. 6, Dec. 1999 (cited in [0010], p. 7 of the specification).

* cited by examiner

*Primary Examiner*—Nabil Z Hindi
(74) *Attorney, Agent, or Firm*—Renner, Otto, Boisselle & Sklar, LLP

(57) ABSTRACT

An optical information processor reads information from a storage medium or writes information on a storage medium by irradiating it with light radiated from a light source. The processor includes: the light source for radiating the light; a condensing element for converging the light, radiated from the light source, toward the storage medium; and a detector for detecting a portion of the light radiated from the light source. Supposing that in a far-field pattern of the light radiated from the light source, an aperture area A is defined by a portion of the light entering the condensing element and a photosensitive area B is defined by another part of the light entering the detector and that the light has the narrower angle of radiation in an x direction and the wider angle of radiation in a y direction, respectively, the center of the photosensitive area B in the x direction is offset with respect to that of the far-field pattern in the x direction.

11 Claims, 42 Drawing Sheets

HORIZONTAL (x) DIRECTION

VERTICAL (y) DIRECTION

LASER CONTROLLER
6

HORIZONTAL (x) DIRECTION

VERTICAL (y) DIRECTION

LASER CONTROLLER

HORIZONTAL (x) DIRECTION

HORIZONTAL (x) DIRECTION

HORIZONTAL (x) DIRECTION

VERTICAL (y) DIRECTION

LASER CONTROLLER
226

OPTICAL INFORMATION PROCESSOR

BACKGROUND OF THE INVENTION

1. Field of the Invention

The present invention relates to an optical information processor for optically reading information from a storage medium or writing information on a storage medium.

2. Description of the Related Art

Recently, various types of optical information processors for reading and writing information optically have become more and more popular. Among other things, optical disk drives for reading and writing data, representing various types of information including video, image and audio, from/on a disk storage medium such as a Compact Disc (CD), a Mini Disk (MD), a Digital Versatile Disc (DVD) and a Blu-ray Disc (BD), have become particularly popular among consumers.

In each of these drives, a semiconductor laser is usually used as a light source to perform read and write operations. The light that has been radiated from the semiconductor laser is converged by a lens or any other optical element on a storage medium. In writing data on the storage medium, the optical power of the semiconductor laser is set relatively high, thereby increasing the intensity of the light that makes a beam spot on the storage medium and changing a physical property (such as the reflectance or magnetic property) of the storage medium. In this manner, the data is written as marks or pits on the storage medium. In reading data from the storage medium, on the other hand, the optical power of the semiconductor laser is set lower than in the write operation, thereby sensing a variation in the physical property (such as the reflectance or magnetic property) of the storage medium at the marks or pits and reading the data from the storage medium.

Thus, such a drive needs to change the optical power of its light source in a broad range from the low power to the high power. Also, the best light intensity of the beam spot to write data with good stability changes from one drive to another according to the rate of scanning done on the storage medium or the type of the given storage medium. For these reasons, in performing a write operation, the optical power of the light source needs to be controlled so as to keep the best writing conditions always.

Meanwhile, there are increasing demands for high-speed data writing these days. To write data on the same type of storage medium faster, a technique of increasing the rate of scanning the storage medium is usually adopted. However, as the scanning rate is increased, the energy of the radiated light applied to a unit area of the storage medium decreases. That is why to ensure the minimum required light intensity for writing, the optical power of the light source must be further increased.

On the other hand, various techniques of increasing the storage densities have also been researched thoroughly nowadays. As a result, the physical dimensions of marks or pits to be left on a storage medium have become smaller and smaller. To make (or record) those small marks on a storage medium just as intended, not only the amount of time in which the storage medium is irradiated with the light but also the intensity of the radiated light need to be controlled with high precision.

Thus, in order to control the optical power of the light source highly precisely in a broad range, an optical disk drive detects the intensity of the light emitted from the light source and controls the optical power of the light source based on the result of the detection. More specifically, the optical power of the light source is monitored in real time by getting a portion of the emission of the light source detected by a detector, thereby controlling the optical output of the light source (see Japanese Patent Publication No. 2907759, for example).

This conventional technique will be outlined with reference to FIGS. 22A through 26. FIGS. 22A and 22B are respectively a top view and a side view illustrating the arrangement of an optical system in a conventional optical disk drive. The top view illustrated in FIG. 22A shows the optical system as viewed from over the storage medium. As shown in FIGS. 22A and 22B, light 222 emitted from a semiconductor laser 221 as a light source is transformed into a parallel beam by a collimator lens 223. A portion of the parallel beam is transmitted through a reflective mirror 224 and incident onto a detector 225 for monitoring the optical power. The output of the detector 225 is supplied to a laser controller 226, which adjusts the output of the semiconductor laser 221 to a required value. On the other hand, another part of the parallel beam is reflected by the reflective mirror 224, transmitted through a condenser lens 227 and then converged toward a storage medium 228. The light that has been reflected from the storage medium 228 follows the same path in the opposite direction, and is diffracted by a detecting diffraction element 229, transmitted through the collimator lens 223, and then incident onto signal detectors 2210 and 2211, which are arranged near the semiconductor laser 221. Various types of signals including focus error, tracking error and RF signals are detected from the light that has entered the detectors 2210 and 2211. The configurations of the detectors 2210 and 2211 and the methods of detecting those various signals are not essential features to be compared to the present invention and already well known in the art, and the description thereof will be omitted herein.

FIG. 23 shows the far-field pattern (FFP) of the light that has been radiated from the semiconductor laser 221. In the far-field pattern 231 shown in FIG. 23, the center of the aperture area 232 (which will be sometimes referred to herein as "Area A") defined by the condenser lens 227 and the center of the photosensitive area 233 (which will be sometimes referred to herein as "Area B") defined by the optical power monitoring detector 225 substantially agree with that of the far-field pattern 231. As shown in FIG. 24, the far-field pattern 231 has an almost normal distribution. If the condenser lens and optical power monitoring detector are arranged such that the center of the aperture area and the center of the photosensitive area agree with that of the far-field pattern, then the light emitted from the light source can be used most efficiently. That is why the semiconductor laser 221, condenser lens 227 and detector 225 are normally arranged such that the respective centers of the aperture and photosensitive areas 232 and 233 agree with that of the far-field pattern 231.

Recently, a semiconductor laser called a "real refractive index guided laser", of which the operating current is reduced for the purpose of increasing its optical power and improving its performance at elevated temperatures, has been used actually (see Matsushita Technical Journal Vol. 45, No. 6 (December 1999), for example). This semiconductor laser is characterized in that the angle of radiation of its emission in the horizontal direction generally changes according to its optical power. FIG. 25 schematically shows how the intensity of the light emitted from a real refractive index guided laser changes with the angle of radiation of the light in the horizontal direction. In the example shown in FIG. 25, the higher the intensity of the light, the wider the angle of radiation of the light.

If a real refractive index guided laser having such a characteristic is used as the light source of an optical disk drive, the ratio of the intensity of the light that enters the optical power monitoring detector (which will be identified herein by Pm) to that of the light that enters the storage medium through the condenser lens (which will be identified herein by Po) changes according to the optical power. As a result, the linearity of the Pm/Po ratio cannot be maintained and it is difficult to control the optical power precisely. As shown in FIG. 26, if the linearity of the Pm/Po ratio can be maintained, then the Pm/Po ratio can be represented by the line 251. On the other hand, if the linearity of the Pm/Po ratio cannot be maintained, then the Pm/Po ratio is represented by the curve 252 or the curve 253.

This is because the aperture area 232 (Area A) of the condenser lens and the photosensitive area 233 (Area B) of the optical power monitoring detector have mutually different sizes and shapes as shown in FIG. 23. And this is also because the ratio of the coupling efficiency of the laser beam that has been emitted from the semiconductor laser and has entered Area B (which will be identified by ηB) to that of the laser beam that has entered Area A (which will be identified by ηA) changes with the optical power.

That is to say, if the coupling efficiencies when the semiconductor laser has an optical power P1 are represented by ηA1 and ηB1 and the coupling efficiencies when the semiconductor laser has an optical power P2 are represented by ηA2 and ηB2, then $$\frac{\eta B1}{\eta A1} \neq \frac{\eta B2}{\eta A2}$$

is satisfied.

As a result, the linearity of the Pm/Po ratio (=ηB/ηA) is lost. In that case, the optical power of the semiconductor laser cannot be controlled precisely anymore. That is to say, the optical power of the semiconductor laser deviates from its target value.

SUMMARY OF THE INVENTION

In order to overcome the problems described above, an object of the present invention is to provide an optical information processor that can monitor the optical power accurately.

An optical information processor according to a preferred embodiment of the present invention is designed to read information from a storage medium or writes information on a storage medium by irradiating the storage medium with light that has been radiated from a light source. The optical information processor preferably includes: the light source for radiating the light; a condensing element for converging the light, radiated from the light source, toward the storage medium; and a detector for detecting a portion of the light that has been radiated from the light source. Supposing that in a far-field pattern of the light radiated from the light source, an aperture area A is defined by a part of the light entering the condensing element and a photosensitive area B is defined by another part of the light entering the detector and that the light has the narrower angle of radiation in an x direction and the wider angle of radiation in a y direction, respectively, the center of the photosensitive area B in the x direction is offset with respect to that of the far-field pattern in the x direction.

In one preferred embodiment of the present invention, supposing the aperture area A has a width of 2 rAx in the x direction, the photosensitive area B has a width of 2 rBx in the x direction, a distance from the center of the aperture area A in the x direction to the center of light intensity distribution of the far-field pattern in the x direction is dAx, and a distance from the center of the photosensitive area B in the x direction to the center of the light intensity distribution of the far-field pattern in the x direction is dBx, respectively, rAx, rBx, dAx and dBx preferably satisfy rAx>rBx and dAx<dBx.

In this particular preferred embodiment, rAx, rBx, dAx and dBx satisfy dAx<0.25 rAx and 0.25 rAx<dBx<0.55 rAx.

In an alternative preferred embodiment, supposing a distance from the center of the aperture area A in the y direction to the center of the light intensity distribution of the far-field pattern in the y direction is dAy and a distance from the center of the photosensitive area B in the y direction to the center of the light intensity distribution of the far-field pattern in the y direction is dBy, respectively, dAy and dBy preferably satisfy dBy>dAy.

In a specific preferred embodiment, supposing the aperture area A has a width of 2 rAy in the y direction, dBy and rAy preferably satisfy dBy>rAy.

In still another preferred embodiment, the optical information processor may further include at least one more light source and optical axes defined from the light sources to the condensing element may be aligned with each other at least partially.

An optical information processor according to another preferred embodiment of the present invention is designed to read information from a storage medium or write information on a storage medium by irradiating the storage medium with light beams that have been radiated from a plurality of light sources. The optical information processor preferably includes: first and second light sources; a condensing element for converging the light beams, radiated from the first and second light sources, toward the storage medium; and a detector for detecting respective portions of the light beams that have been radiated from the first and second light sources. Supposing that in a first far-field pattern of the light beam radiated from the first light source, an aperture area A1 is defined by a portion of the light beam entering the condensing element and a photosensitive area B1 is defined by another part of the light beam entering the detector and that the light beam has the narrower angle of radiation in an x direction and the wider angle of radiation in a y direction, respectively, the center of the photosensitive area B1 in the x direction is offset with respect to that of the first far-field pattern in the x direction. Supposing that in a second far-field pattern of the light beam radiated from the second light source, an aperture area A2 is defined by a portion of the light beam entering the condensing element and a photosensitive area B2 is defined by another part of the light beam entering the detector and that the light beam has the narrower angle of radiation in the x direction and the wider angle of radiation in the y direction, respectively, the center of the photosensitive area B2 in the x direction is offset with respect to that of the second far-field pattern in the x direction.

In one preferred embodiment of the present invention, supposing the aperture area A1 has a width of 2 rA1x in the x direction, the photosensitive area A1 has a width of 2 rB1x in the x direction, a distance from the center of the aperture area A1 in the x direction to the center of light intensity distribution of the first far-field pattern in the x direction is dA1x, and a distance from the center of the photosensitive area B1 in the x direction to the center of the light intensity distribution of the first far-field pattern in the x direction is dB1x, respectively, and supposing the aperture area A2 has a width of 2 rA2x in the x direction, the photosensitive area B1 has a width of 2 rB2x in the x direction, a distance from the center of the aperture area A2 in the x direction to the center of light intensity distribution of the second far-field pattern in the x direction is dA2x, and a distance from the center of the photosensitive area B2 in the x direction to the center of the light intensity distribution of the second far-field pattern in the x direction is dB2x, respectively, rA1x, rB1x, dA1x, dB1x, rA2x, rB2x, x and dB2x satisfy rA1x>rB1x, rA2x>rB2x, (rA1x/rB1x)>(rA2x/rB2x) and (dB1x/rB1x)> (dB2x/rB2x).

In this particular preferred embodiment, rA1x, rB1x, dA1x and dB1x preferably satisfy dA1x<0.25 rA1x and 0.25 rA1x<dB1x<0.55 rA1x.

In another preferred embodiment, supposing a distance from the center of the aperture area A1 in the y direction to the center of the light intensity distribution of the first far-field pattern in the y direction is dA1y and a distance from the center of the photosensitive area B1 in the y direction to the center of the light intensity distribution of the first far-field pattern in the y direction is dB1y, respectively, dA1y and dB1y preferably satisfy dB1y>dA1y.

In a specific preferred embodiment, supposing the aperture area A1 has a width of 2 rA1y in the y direction, dB1y and rA1y preferably satisfy dB1y>rA1y.

According to the present invention, in the far-field pattern of light that has been radiated from a light source, the center of the photosensitive area of a detector is offset with respect to that of the far-field pattern in the direction in which the light has the narrower angle of radiation. That is why even if the angle of radiation of the light emitted from the light source changes according to the optical power, the ratio of the intensity of the light entering the detector to that of the light entering the storage medium by way of the condenser lens varies to a much lesser degree with the optical power. Therefore, even if the optical power changes in a broad range, the output of the light source can be controlled with high precision. As a result, an optical information processor that can read and write information from/on a high-density storage medium at high speeds is realized.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Hereinafter, an optical disk drive for at least one of reading from a disk storage medium and writing on a disk storage medium data, representing various types of information such as video, image and audio will be described as an exemplary optical information processor according to a preferred embodiment of the present invention. However, the present invention can also be used effectively in any other type of optical information processor as long as the processor can read information from a storage medium or write information on a storage medium by irradiating the storage medium with light that has been radiated from a light source. For example, the present invention is also applicable for use in holographic memory apparatuses, semiconductor exposure apparatuses, laser printers, etc.

Embodiment 1

Figure 1A:
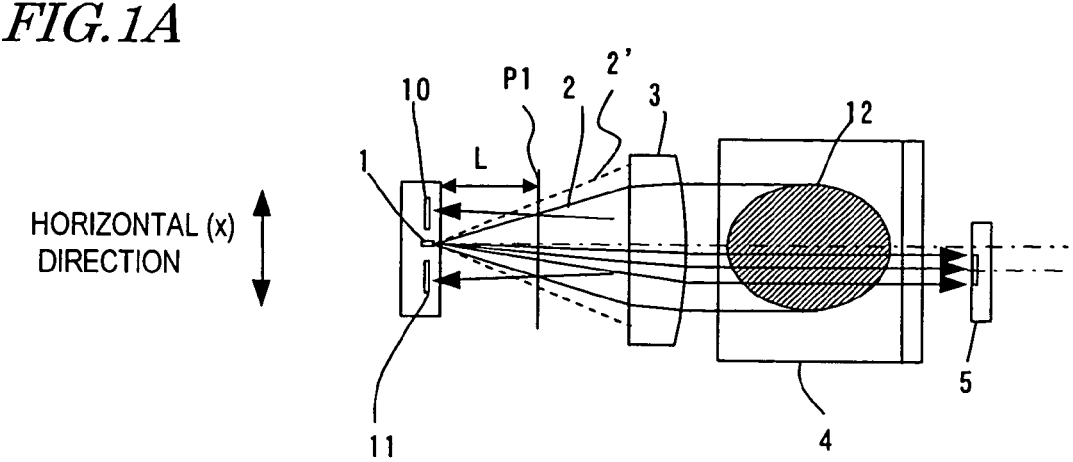
FIG. 1A illustrates a horizontal arrangement of main components in an optical information processor according to a first preferred embodiment of the present invention.
Figure 1B:
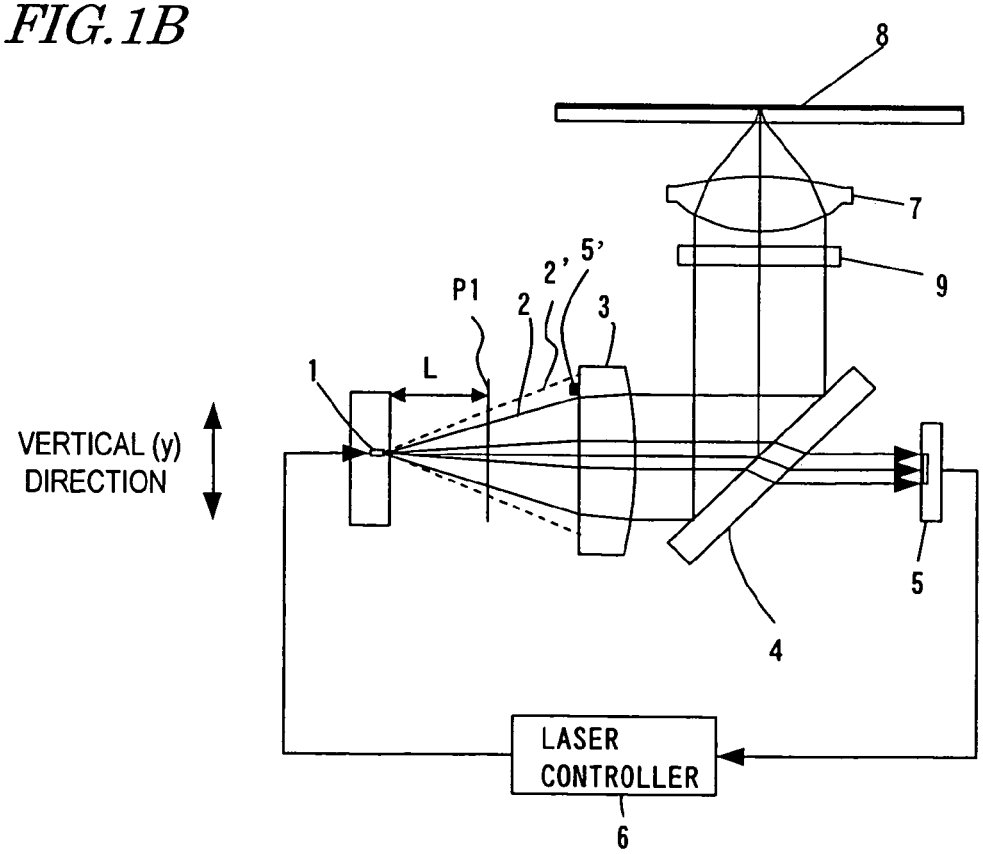
FIG. 1B illustrates a vertical arrangement of the main components in the optical information processor of the first preferred embodiment.
Figure 1C:
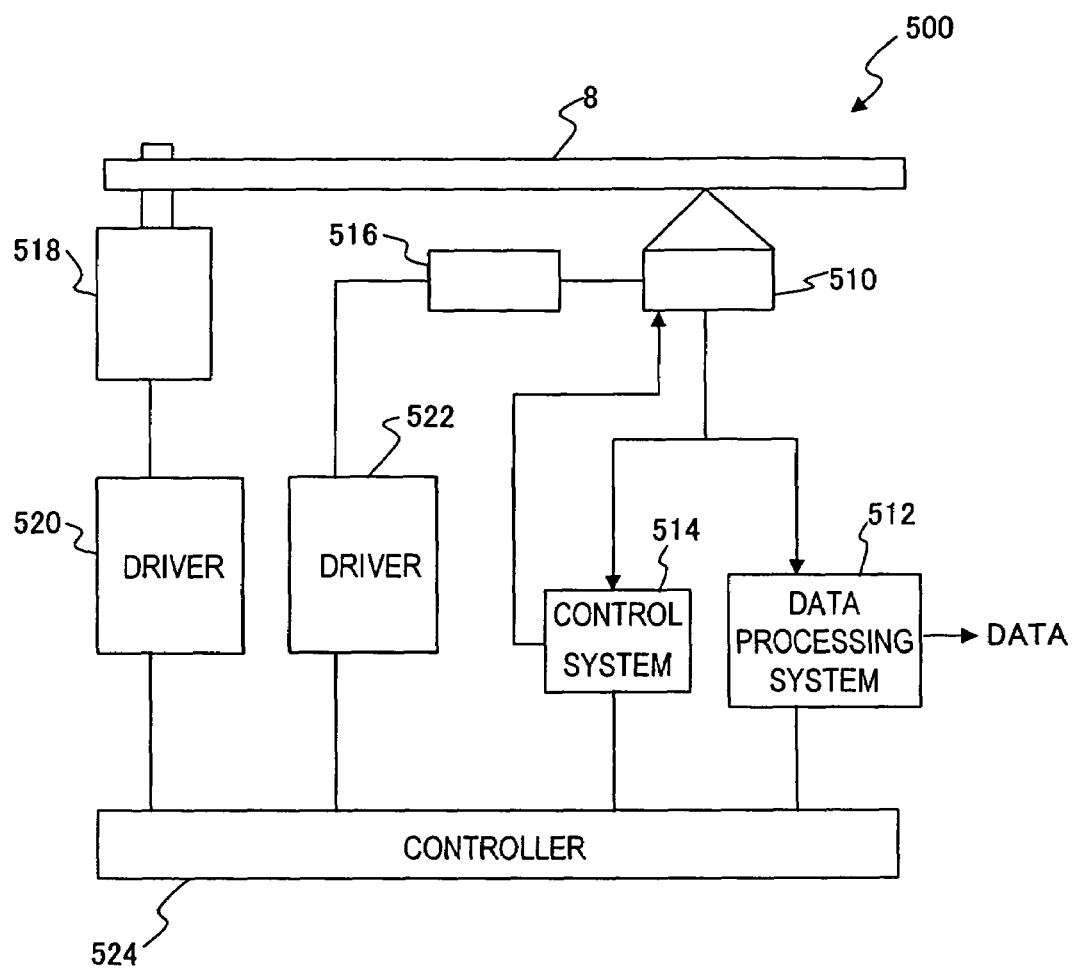
FIG. 1C is a block diagram showing the configuration of the optical information processor of the first preferred embodiment.

FIGS. 1A and 1B are respectively a top view and a side view illustrating the arrangement of an optical system in an optical disk drive according to a preferred embodiment of the present invention. The top view illustrated in FIG. 1A shows the optical system as viewed from over the storage medium. FIG. 1C is a block diagram showing the configuration of the optical disk drive.

As shown in FIG. 1C, the optical disk drive 500 preferably includes an optical pickup 510, a control system 514, a data processing system 512, a traverse drive section 516, a rotational drive section 518, drivers 520 and 522, and a controller 524.

The rotational drive section 518 preferably includes a turntable, on which an optical disk 8 is mounted as an information storage medium, and rotates and drives the optical disk 8 mounted on the turntable. As will be described later, the optical pickup 510 preferably includes a condenser lens that adjusts the converging state of the light entering the data storage side of the disk, and converges the light toward the data storage side of the optical disk 8, thereby reading data from the data storage side or writing data on the data storage side using the converged light.

On receiving the light that has been converged toward, and reflected from, the data storage side, the control system 514 generates a control signal for controlling the rotation of the optical disk 8 and a control signal for controlling the converging state and beam spot of the light to be focused on the data storage side of the optical disk 8. In response to these control signals, the drivers 520 and 522 drive not only the rotational drive section 518 and traverse drive section 516 but also the condensing element drive section (not shown) of the optical pickup 510. The data processing system 512 reads the data from the data storage side based on the reflected light.

The optical system shown in FIGS. 1A and 1B is included in the optical pickup 510 shown in FIG. 1C. In other words, the optical pickup 510 includes a semiconductor laser 1, a condenser lens 7 and a detector 5 as shown in FIGS. 1A and 1C. The optical pickup 510 further includes a collimator lens 3, a reflective mirror 4, a detecting diffraction element 9 and detectors 10 and 11. A portion 2 of the light 2' that has been emitted from the semiconductor laser 1 as a light source with a predetermined angle of radiation is guided to the condenser lens 7. More specifically, the light 2 emitted from the semiconductor laser 1 is transformed by the collimator lens 3 into a parallel beam, only a part (e.g., 5%) of which is transmitted through the reflective mirror 4 and incident onto the optical power monitoring detector 5. The output of the detector 5 is supplied to a laser controller 6, which adjusts the output of the semiconductor laser 1 to a predetermined value based on the output of the detector 5. On the other hand, the rest (e.g., 95%) of the light 2 is reflected by the reflective mirror 4, transmitted through the detecting diffraction element 9 and condenser lens 7 and then converged toward the storage medium 8. In this preferred embodiment, a condenser lens is used as the condensing element. However, a non-lens condensing element such as a prism may also be used. The light that has been reflected from the data storage layer of the storage medium 8 follows the same path in the opposite direction, and is diffracted by the detecting diffraction element 9, transmitted through the collimator lens 3, and then incident onto the signal detectors 10 and 11, which are arranged near the semiconductor laser 1. The light that has entered the detectors 10 and 11 is then input to the control system 514 and data processing system 512 as shown in FIG. 1C.

As shown in FIG. 1A, the present invention is partly characterized in that the center of the photosensitive area of the detector 5 is offset with respect to that of the light beam 12 in horizontal (x) direction. Hereinafter, this feature will be described in detail.

Figure 2A:
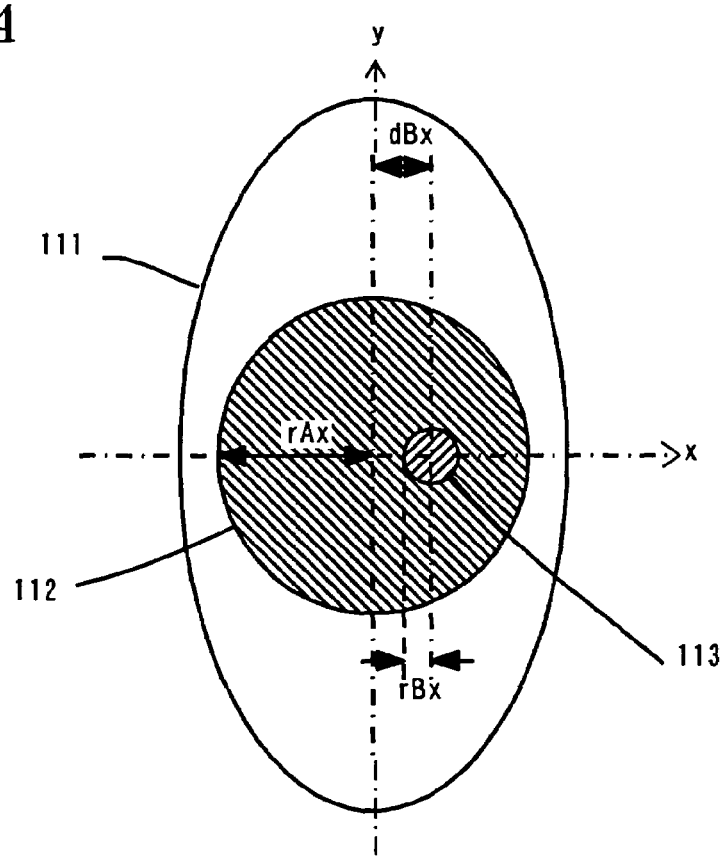
FIG. 2A shows a far-field pattern as viewed on a plane perpendicular to the optical axis of the light source of the first preferred embodiment.
Figure 2B:
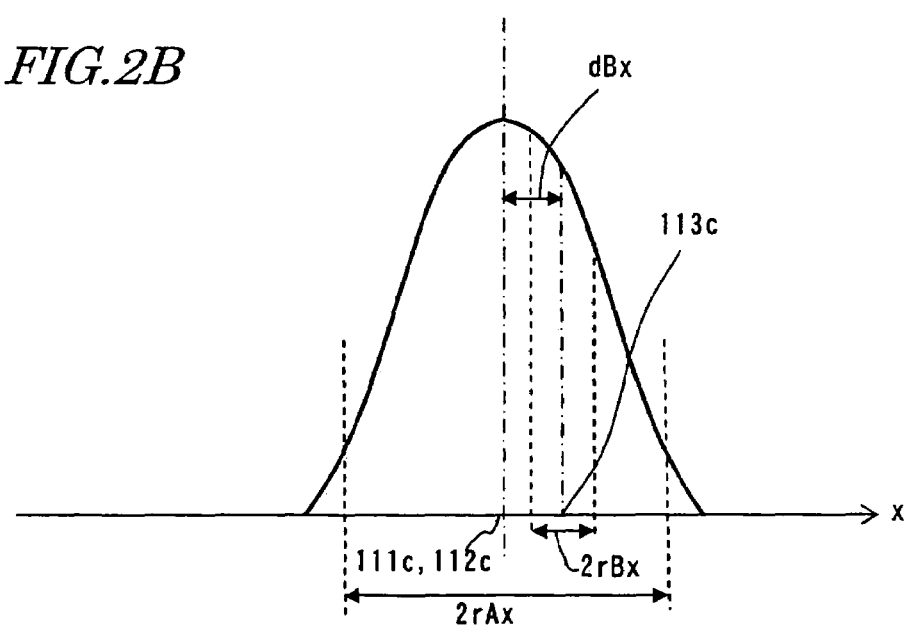
FIG. 2B shows the intensity distribution of the far-field pattern of FIG. 2A in the x direction.

FIGS. 2A and 2B show the far-field pattern of the light that has been radiated from the semiconductor laser 1. Specifically, FIG. 2A shows its distribution perpendicularly to the optical axis. FIG. 2B shows the light intensity distribution in the x-axis direction, where the x-axis defines the direction in which the light radiated from the semiconductor laser 1 has the narrowest angle of radiation. On the other hand, the y-axis defines the direction in which the light radiated from the semiconductor laser 1 has the widest angle of radiation. In a real refractive index guided semiconductor laser, the angle of radiation of the light decreases as the optical power increases. In this preferred embodiment, the semiconductor laser 1 is preferably a real refractive index guided semiconductor laser, and has the narrower angle of radiation in the horizontal direction. That is to say, the horizontal direction is the x direction.

As used herein, the "far-field pattern" means the distribution of the light that has gone out of the semiconductor laser 1 as a light source as observed sufficiently far away from the light source. Suppose the distribution of the outgoing light is observed on a plane P1 that is L mm away from the emission plane of the semiconductor laser 1 as shown in FIGS. 1A and 1B. In that case, if L is 10 mm or more, the plane P1 can be regarded as being sufficiently away from the semiconductor laser 1 and the distribution of the outgoing light as observed on the plane P1 can be regarded as the far-field pattern. However, the far-field pattern does not have to be observed or defined at the position shown in FIGS. 1A and 1B. Alternatively, as long as the far-field pattern is at least L mm away from the emission plane of the semiconductor laser 1, the far-field pattern may also be observed between the collimator lens 3 and the reflective mirror 4.

As shown in FIG. 2A, the far-field pattern 111 of the outgoing light has an elliptical cross section on a plane perpendicular to the optical axis. FIG. 2A also shows the aperture area 112 (Area A) defined by the condenser lens 7 and the photosensitive area 113 (Area B) defined by the detector 5 on the far-field pattern 111. If the far-field pattern is defined on the plane P1 as shown in FIGS. 1A and 1B, a portion of the beam cross section on the plane P1 that is going to enter the condenser lens 7 is the aperture area 112, while another portion of the beam cross section on the plane P1 that is going to enter the detector 5 is the photosensitive area 113. In FIG. 2A, the aperture area 112 and photosensitive area 113 both have circular shapes. However, the aperture area 112 and photosensitive area 113 do not have to be circular but may also have a rectangular, polygonal or any other suitable shape. If the condenser lens 7 and detector 5 had areas that do not receive the outgoing light of the semiconductor laser 1, then efficiency would drop. That is why the aperture area 112 and photosensitive area 113 are entirely included within the far-field pattern.

If the aperture area 112 has a width of 2 rAx in the x direction and the photosensitive area 113 has a width of 2 rBx in the x direction as shown in FIG. 2B, then rAx and rBx satisfy rAx>rBx. Also, the center 112C of the aperture area 112 substantially agrees with the center 111C of the far-field pattern 111. On the other hand, the center 113C of the photosensitive area 113 is offset with respect to the center 111C of the far-field pattern 111 in the x direction. The magnitude of this offset will be identified by dBx. Also, the intensity of the light that has been transmitted through the condenser lens 7 and then incident on the optical disk 8 will be identified herein by Po, and that of the light that has been transmitted through the condenser lens 7 and then incident on the detector 5 will be identified herein by Pm.

Hereinafter, it will be described by way of specific examples how dBx changes with Po, Pm and the Pm/Po ratio when the angle of radiation of the emission of the semiconductor laser 1 changes in the x direction. Suppose the optical system is arranged as shown in FIGS. 1A and 1B and the semiconductor laser 1 has an angle of radiation θx (Lo)

(which is a full angle at half maximum) of 8 degrees in the x (horizontal) direction in its low output mode and has an angle of radiation θx (Hi) of 10 degrees in the x direction in its high output mode. Accordingly, if the optical power is changed from high into low, or vice versa, the difference Δθx of the angle of radiation θx will be zero to two degrees. Meanwhile, the angle of radiation θy in the vertical direction is supposed to be constant at 17 degrees without depending on the output. The present inventors calculated how Po, Pm and the Pm/Po ratio changed with Δθx (i.e., the variation in θx with the optical power) when the collimator lens 3 had a focal length fc of 20 mm, the condenser lens 7 had a circular aperture area with a radius rA of 2 mm, and the detector 5 also had a circular photosensitive area with a radius rB of 0.35 mm. The results are shown in FIGS. 3A and 3B.

Figure 3A:
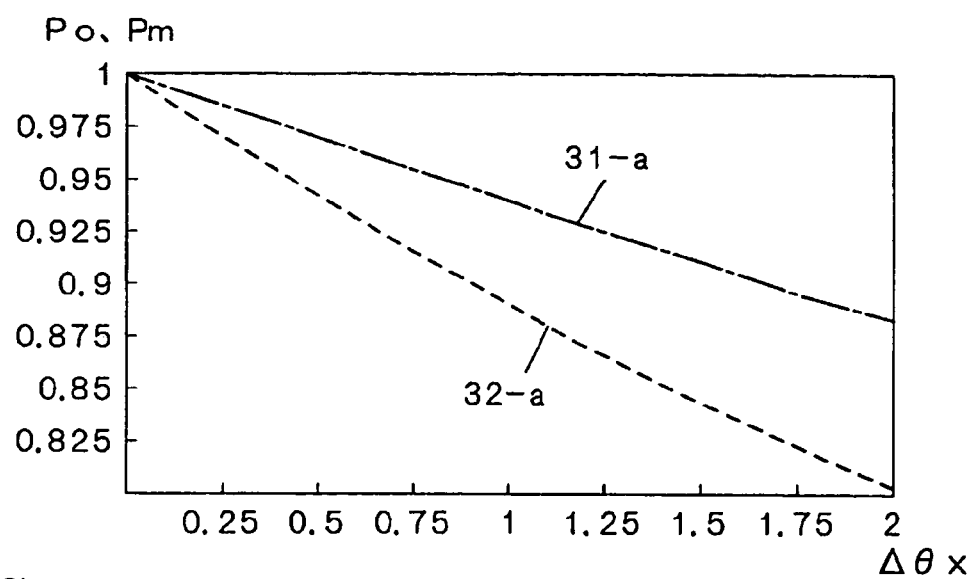
FIG. 3A shows how Po and Pm change depending on $\Delta\theta x$ in the first preferred embodiment if the angle of radiation changes from 8 deg into 10 deg and if dBx=0.
Figure 3B:
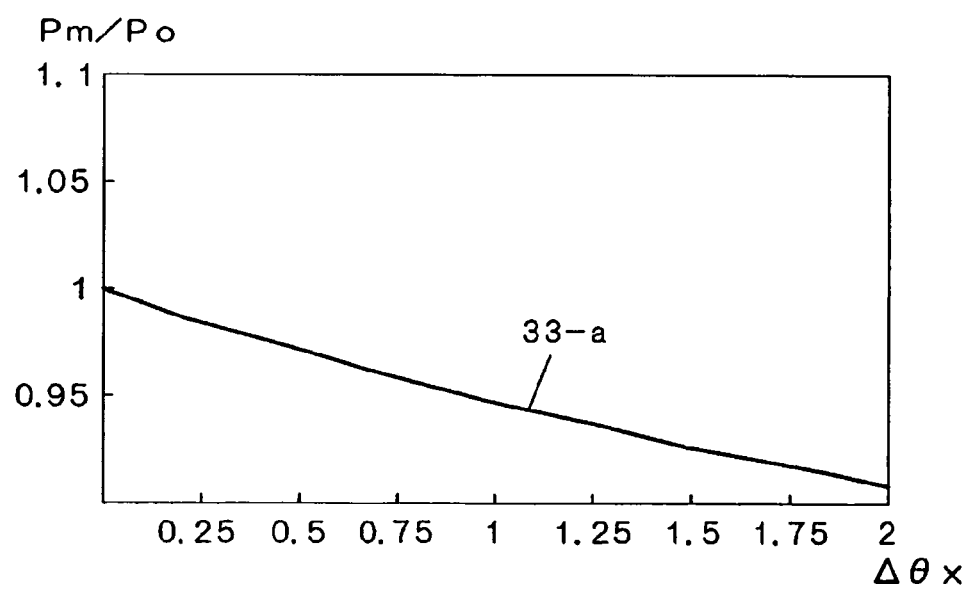
FIG. 3B shows how Pm/Po changes depending on $\Delta\theta x$ in the first preferred embodiment if the angle of radiation changes from 8 deg into 10 deg and if dBx=0.

As shown in FIG. 3A, when dBx=0, the dependences of Po and Pm on Δθx are represented by the curves 31-a and 32-a, respectively. As is clear from FIG. 3A, the dependence of Pm on Δθx is greater than that of Po on Δθx. Accordingly, if Δθx changes from 0 degrees into 2 degrees, the Pm/Po ratio changes by about 9% as represented by the curve 33-a in FIG. 3B. It should be noted that the Pm/Po ratio is normalized in FIG. 3B with the value when Δθx=0. The same statement will apply to the following examples, too.

Figure 3C:
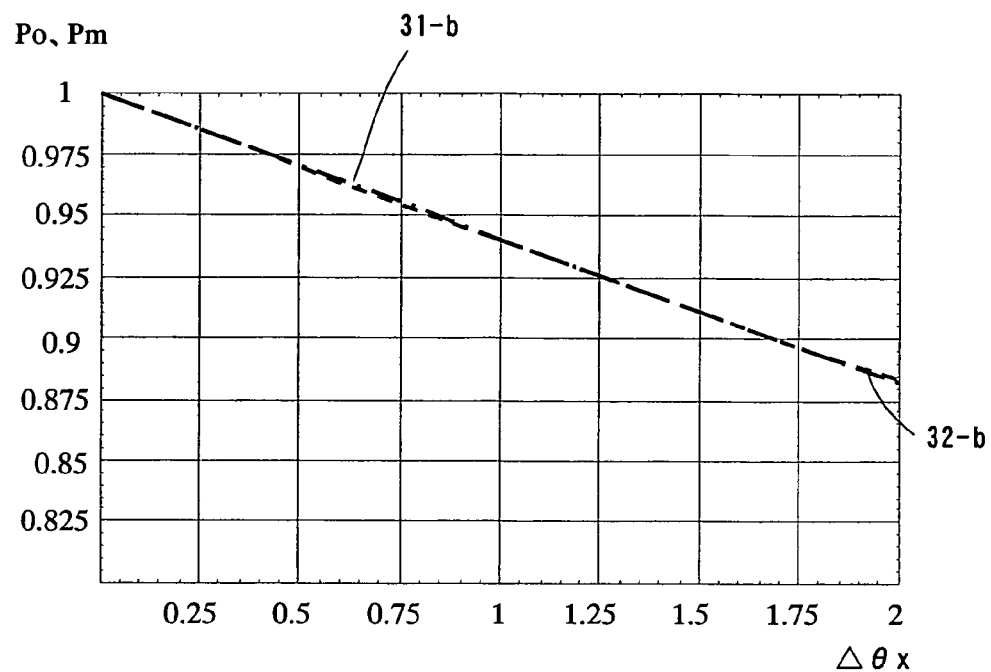
FIG. 3C shows how Po and Pm change depending on $\Delta\theta x$ in the first preferred embodiment if the angle of radiation changes from 8 deg into 10 deg and if dBx=0.87.
Figure 3D:
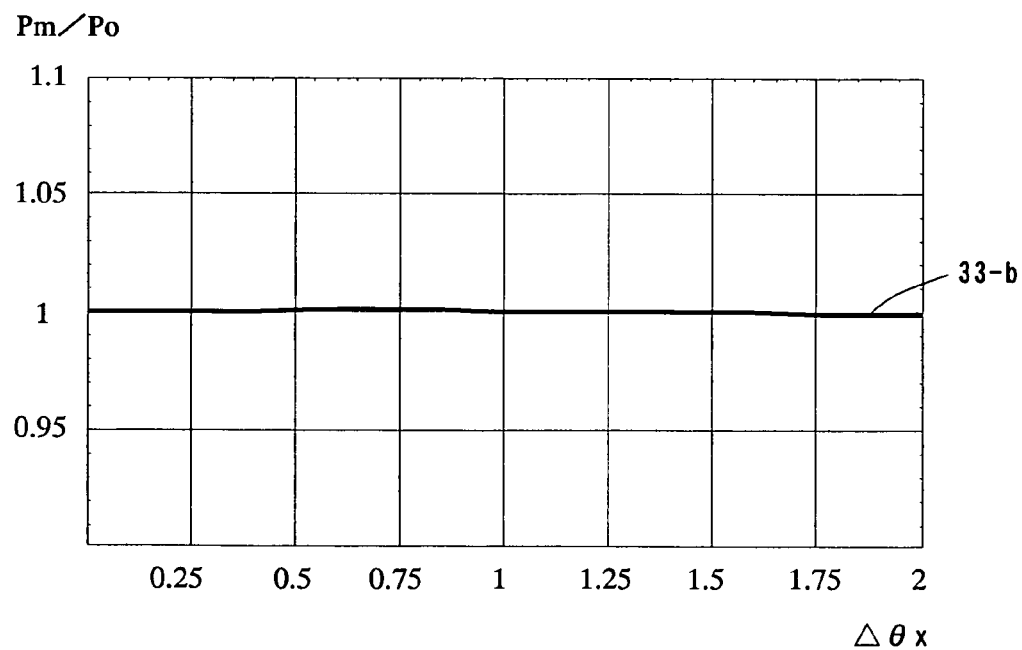
FIG. 3D shows how Pm/Po changes depending on $\Delta\theta x$ in the first preferred embodiment if the angle of radiation changes from 8 deg into 10 deg and if dBx=0.87.

FIGS. 3C and 3D show how Po, Pm and the Pm/Po ratio change depending on Δθx if dBx=0.87 mm. As shown in FIG. 3C, the dependences of Po and Pm on Δθx are represented by the curves 31-b and 32-b, respectively. As is clear from FIG. 3C, the dependence of Pm on Δθx is now almost equal to that of Po on Δθx. As a result, even when Δθx changes from 0 degrees into 2 degrees, the Pm/Po ratio hardly changes and its variation can be reduced to about 0.2% or less as represented by the curve 33-b in FIG. 3D.

Figure 4A:
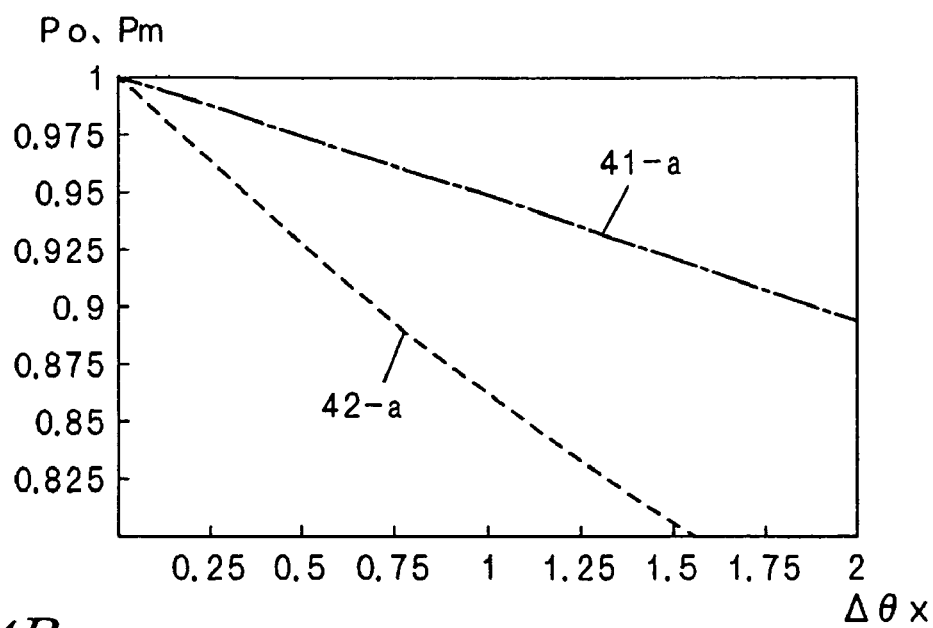
FIG. 4A shows how Po and Pm change depending on $\Delta\theta x$ in the first preferred embodiment if the angle of radiation changes from 6 deg into 8 deg and if dBx=0.
Figure 4B:
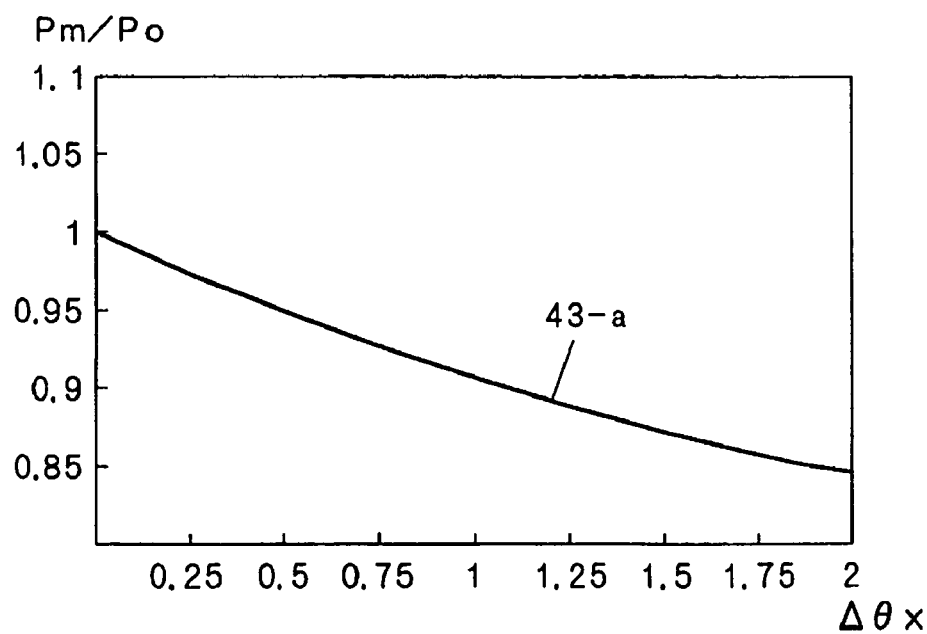
FIG. 4B shows how Pm/Po changes depending on $\Delta\theta x$ in the first preferred embodiment if the angle of radiation changes from 6 deg into 8 deg and if dBx=0.

The present inventors looked for dominating parameters that would be useful to reduce the variation in Pm/Po ratio with Δθx. First, the present inventors measured the effects of dBx in a situation where the semiconductor laser 1 was supposed to have an angle of radiation θx (Lo) of 8 degrees in its low output mode and an angle of radiation θx (Hi) of 10 degrees in its high output mode, respectively. Also, dBx was supposed to be zero and the other parameters were supposed to be the same as in the example described above. The results are shown in FIGS. 4A and 4B. In FIG. 4A, the dependences of Po and Pm on Δθx are represented by the curves 41-a and 42-a, respectively. As is clear from FIG. 4A, the dependence of Pm on Δθx is greater than that of Po on Δθx. Accordingly, if Δθx changes from 0 degrees into 2 degrees, the Pm/Po ratio changes by about 15% as represented by the curve 43-a in FIG. 4B.

Figure 4C:
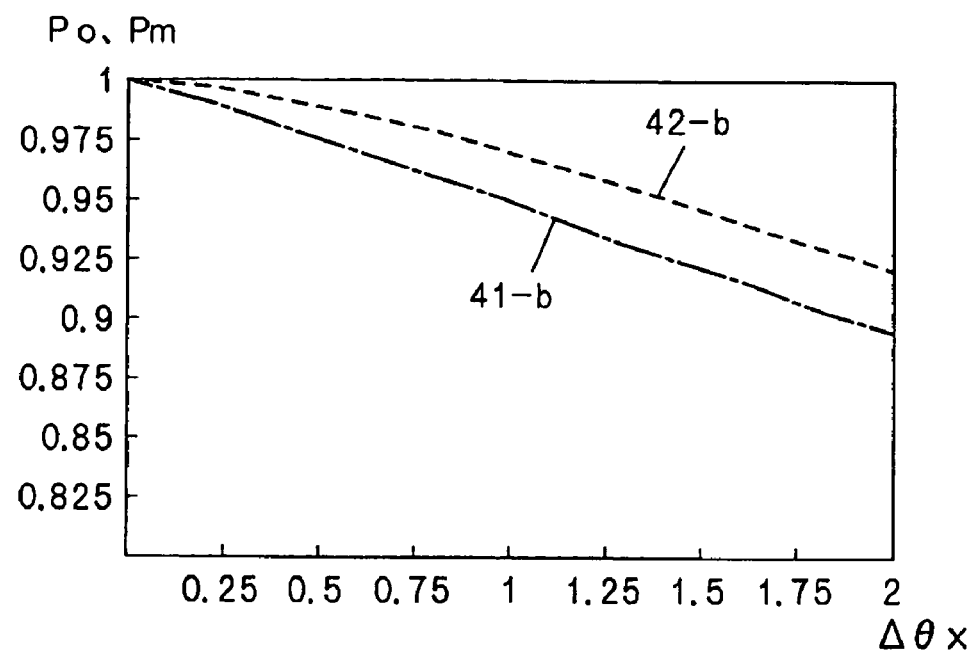
FIG. 4C shows how Po and Pm change depending on $\Delta\theta x$ in the first preferred embodiment if the angle of radiation changes from 6 deg into 8 deg and if dBx=0.87.
Figure 4D:
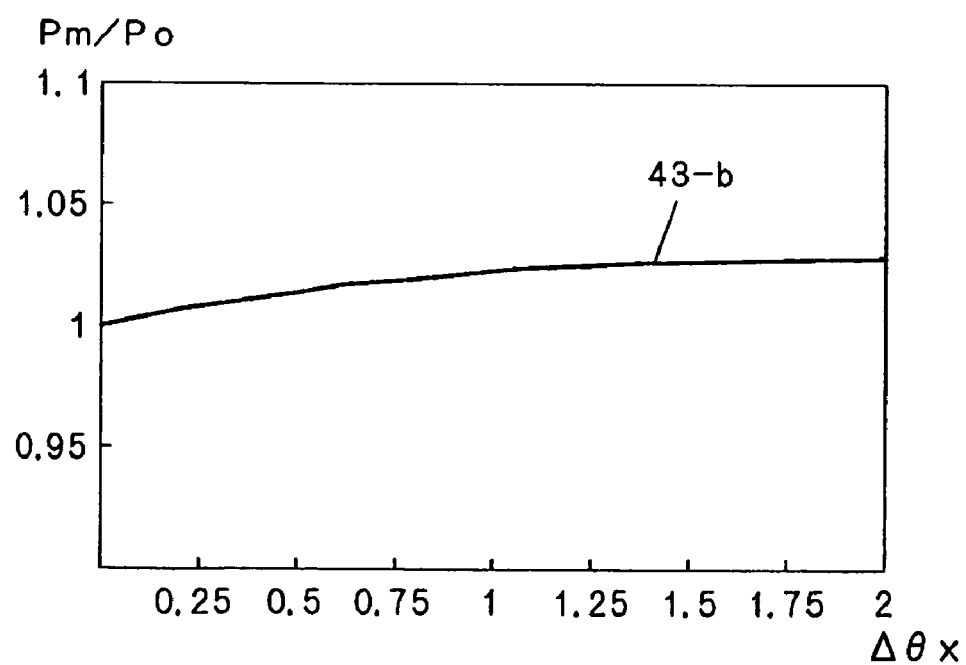
FIG. 4D shows how Pm/Po changes depending on $\Delta\theta x$ in the first preferred embodiment if the angle of radiation changes from 6 deg into 8 deg and if dBx=0.87.

On the other hand, if dBx=0.87 mm, the dependences of Po and Pm on Δθx are represented by the curves 41-b and 42-b, respectively, as shown in FIG. 4C. The dependence of Po on Δθx is not so much different from the situation where dBx=0, while the dependence of Pm on Δθx has decreased significantly and is now almost equal to that of Po on Δθx. As a result, the variation in Pm/Po when Δθx changes from 0 degrees into 2 degrees can be reduced to about 3% as represented by the curve 43-b in FIG. 4D.

Next, the present inventors measured the effects of dBx in a situation where the semiconductor laser 1 was supposed to have an angle of radiation θx (Lo) of 10 degrees in its low output mode and an angle of radiation θx (Hi) of 12 degrees in its high output mode. Also, dBx was supposed to be zero and the other parameters were supposed to be the same as in the examples described above. The results are shown in FIGS. 5A and 5B.

Figure 5A:
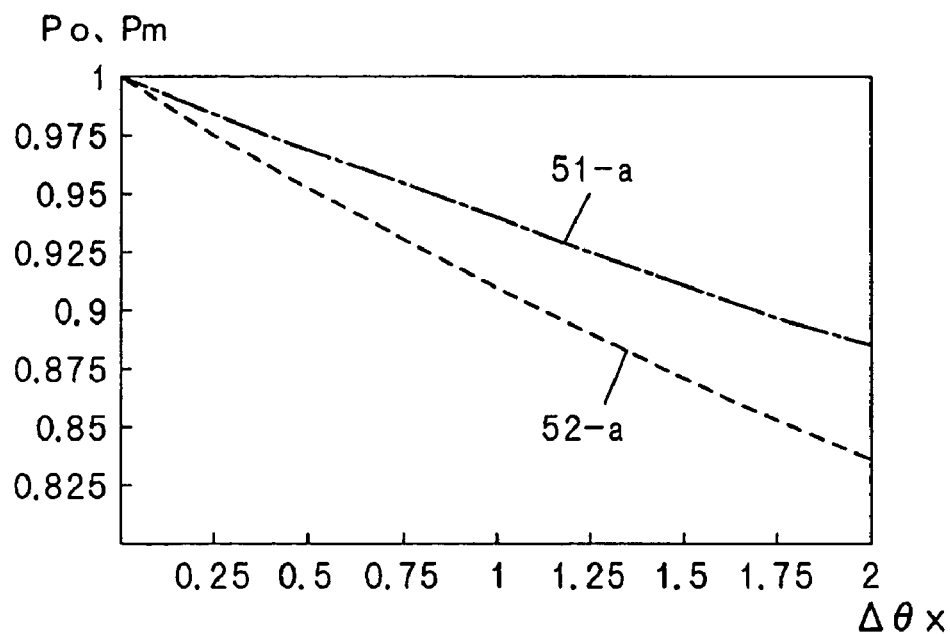
FIG. 5A shows how Po and Pm change depending on $\Delta\theta x$ in the first preferred embodiment if the angle of radiation changes from 10 deg into 12 deg and if dBx=0.
Figure 5B:
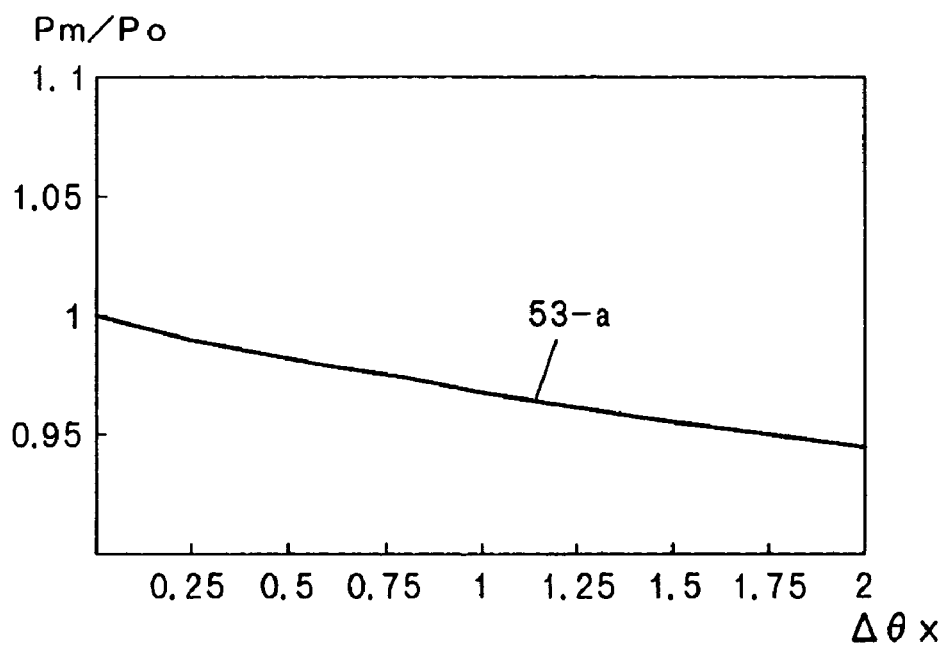
FIG. 5B shows how Pm/Po changes depending on $\Delta\theta x$ in the first preferred embodiment if the angle of radiation changes from 10 deg into 12 deg and if dBx=0.

In FIG. 5A, the dependences of Po and Pm on Δθx are represented by the curves 51-a and 52-a, respectively. As is clear from FIG. 5A, the dependence of Pm on Δθx is greater than that of Po on Δθx. Accordingly, if Δθx changes from 0 degrees into 2 degrees, the Pm/Po ratio changes by about 6% as represented by the curve 53-a in FIG. 5B.

Figure 5C:
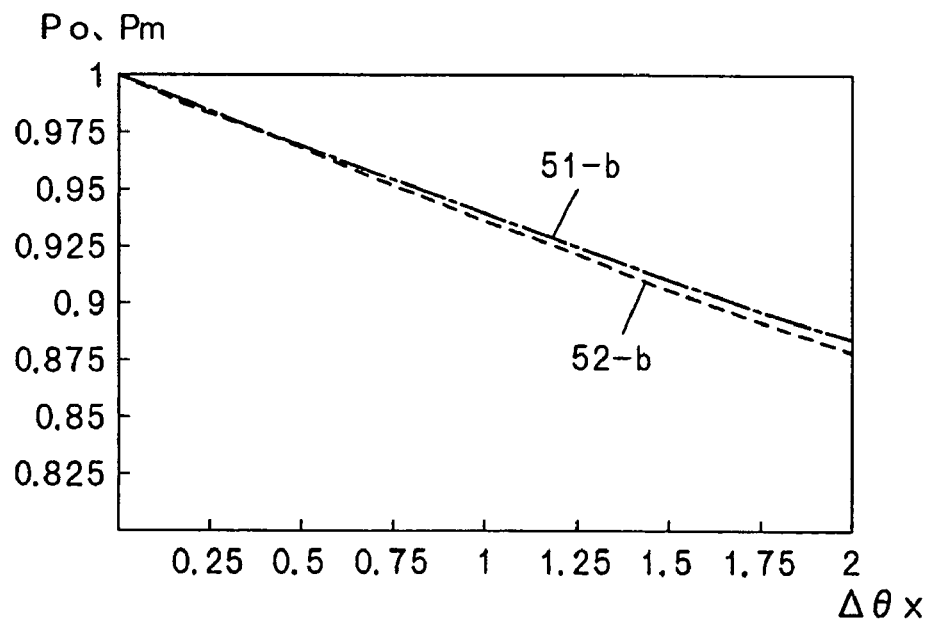
FIG. 5C shows how Po and Pm change depending on $\Delta\theta x$ in the first preferred embodiment if the angle of radiation changes from 10 deg into 12 deg and if dBx=0.87.
Figure 5D:
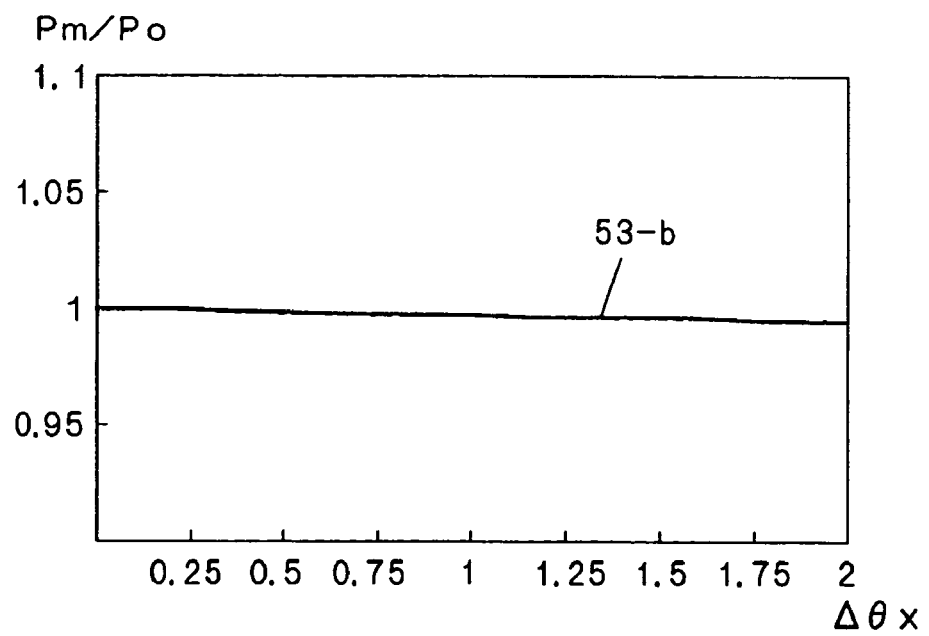
FIG. 5D shows how Pm/Po changes depending on $\Delta\theta x$ in the first preferred embodiment if the angle of radiation changes from 10 deg into 12 deg and if dBx=0.87.

On the other hand, if dBx=0.87 mm, the dependences of Po and Pm on Δθx are represented by the curves 51-b and 52-b, respectively, as shown in FIG. 5C. As is clear from FIG. 5C, the dependences of Po and Pm on Δθx match each other well. As a result, the variation in Pm/Po when Δθx changes from 0 degrees into 2 degrees can be reduced to 1% or less as represented by the curve 53-b in FIG. 5D.

A semiconductor laser for use as a light source for writing data on a CD, an MD, a DVD, a BD or any other storage medium has an angle of radiation θx (Lo) of 6 to 8 degrees when its output is relatively low, and is normally used so as to have a difference Δθx of about 2 degrees in angle of radiation between its low and high output modes. Accordingly, as already described with reference to FIGS. 3A through 5D, if the magnitude of offset dBx is set to 0.87 mm, then the variation in the Pm/Po ratio with Δθx can be reduced sufficiently irrespective of the value of θx as long as the semiconductor laser has an angle of radiation θx falling within a normal range for writing. That is to say, if the angle of radiation of the light emitted from a light source changes with the optical power, the center of the photosensitive area of a detector is preferably offset with respect to that of the light intensity distribution of a far-field pattern in the direction in which the angle of radiation changes most significantly. Then, the effects of the variation in the angle of radiation can be minimized and the optical power of the light source can be monitored accurately.

Next, it will be described how these effects manifest themselves when the focal length fc of the collimator lens 3 is changed. The results obtained when fc=15 mm are shown in FIGS. 6A through 6D. In this example, the semiconductor laser 1 was supposed to have an angle of radiation θx (Lo) of 8 degrees in its low output mode and an angle of radiation θx (Hi) of 10 degrees in its high output mode, respectively.

Figure 6A:
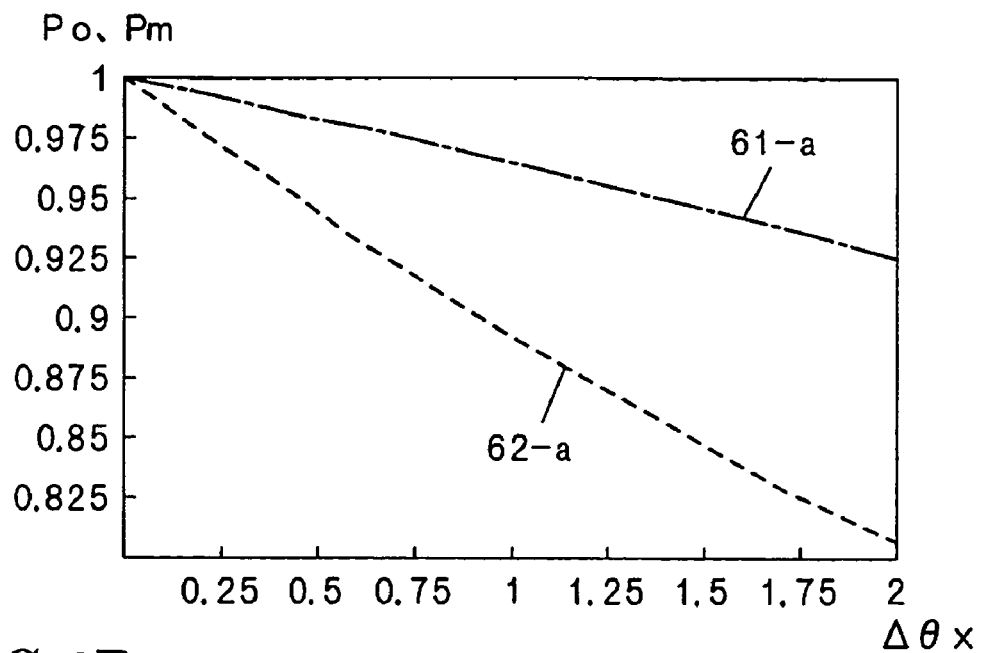
FIG. 6A shows how Po and Pm change depending on $\Delta\theta x$ in the first preferred embodiment if the fc=15 and dBx=0.
Figure 6B:
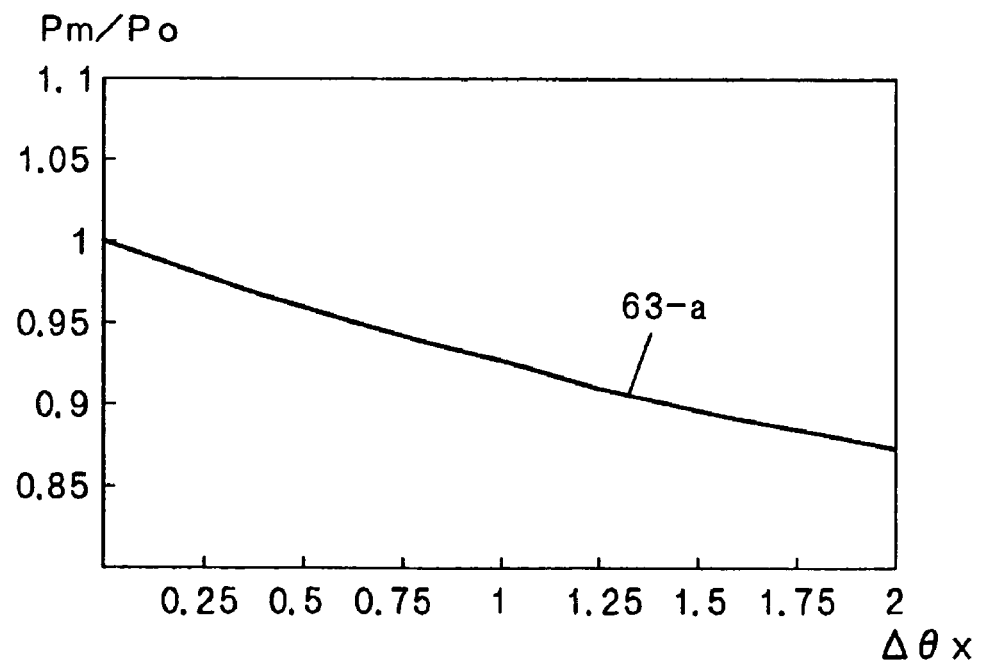
FIG. 6B shows how Pm/Po changes depending on $\Delta\theta x$ in the first preferred embodiment if the fc=15 and dBx=0.

If dBx=0, the dependences of Po and Pm on Δθx are represented by the curves 61-a and 62-a, respectively, as shown in FIG. 6A. As is clear from FIG. 6A, the dependence of Pm on Δθx is greater than that of Po on Δθx. Accordingly, if Δθx changes from 0 degrees into 2 degrees, the Pm/Po ratio changes by about 13% as represented by the curve 63-a in FIG. 6B.

Figure 6C:
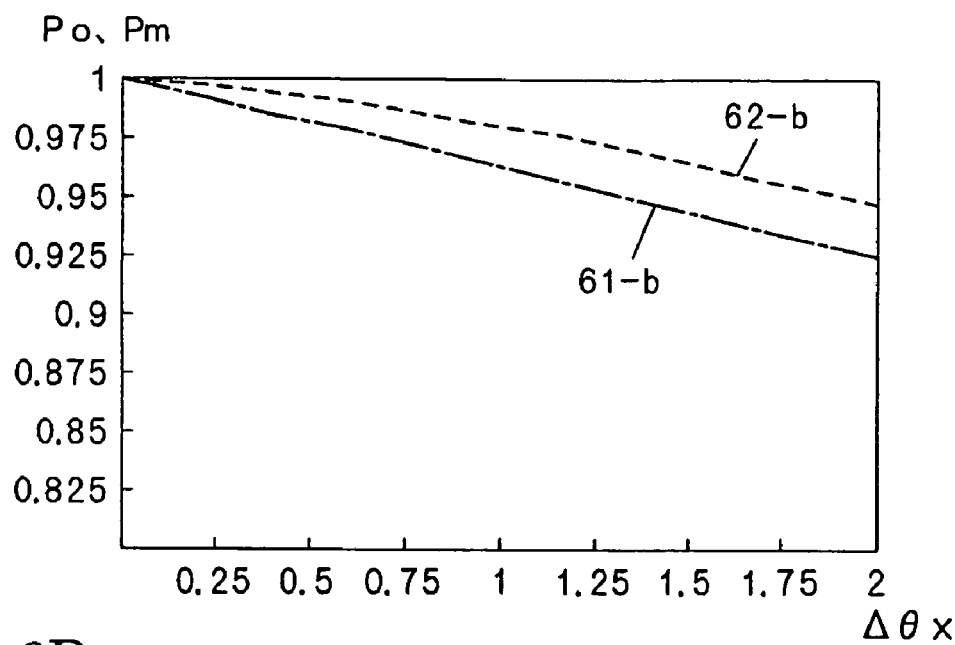
FIG. 6C shows how Po and Pm change depending on $\Delta\theta x$ in the first preferred embodiment if the fc=15 and dBx=0.87.
Figure 6D:
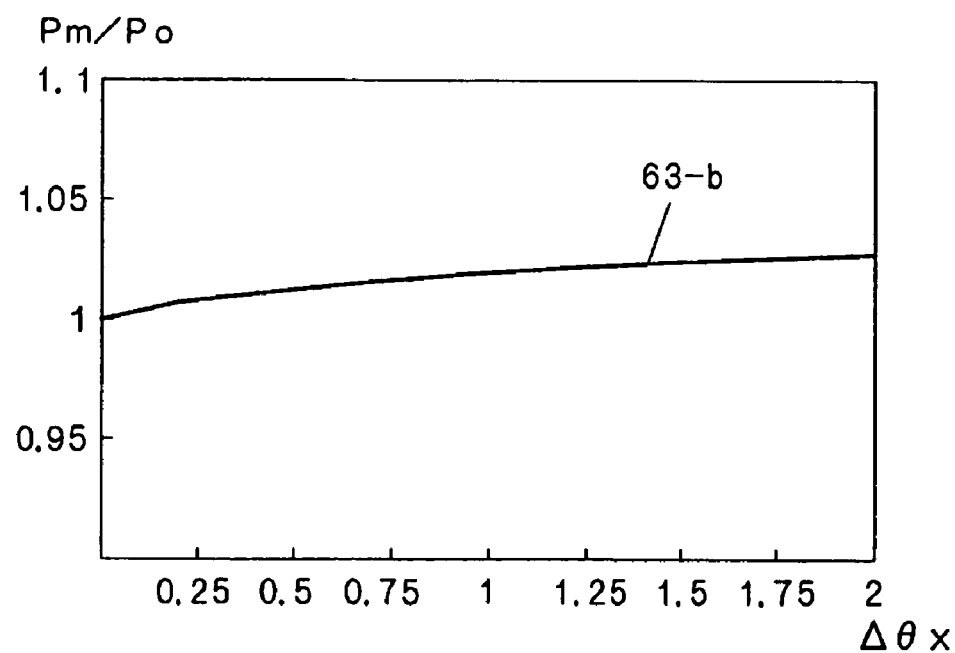
FIG. 6D shows how Pm/Po changes depending on $\Delta\theta x$ in the first preferred embodiment if the fc=15 and dBx=0.87.

On the other hand, if dBx=0.87 mm, the dependences of Po and Pm on Δθx are represented by the curves 61-b and 62-b, respectively, as shown in FIG. 6C. As is clear from FIG. 6C, since the dependence of Pm on Δθx decreases, so does the difference in dependence on Δθx between Po and Pm. As a result, even if Δθx changes from zero degrees into two degrees, the variation in Pm/Po can be reduced to about 3% as shown in FIG. 6D.

Figure 7A:
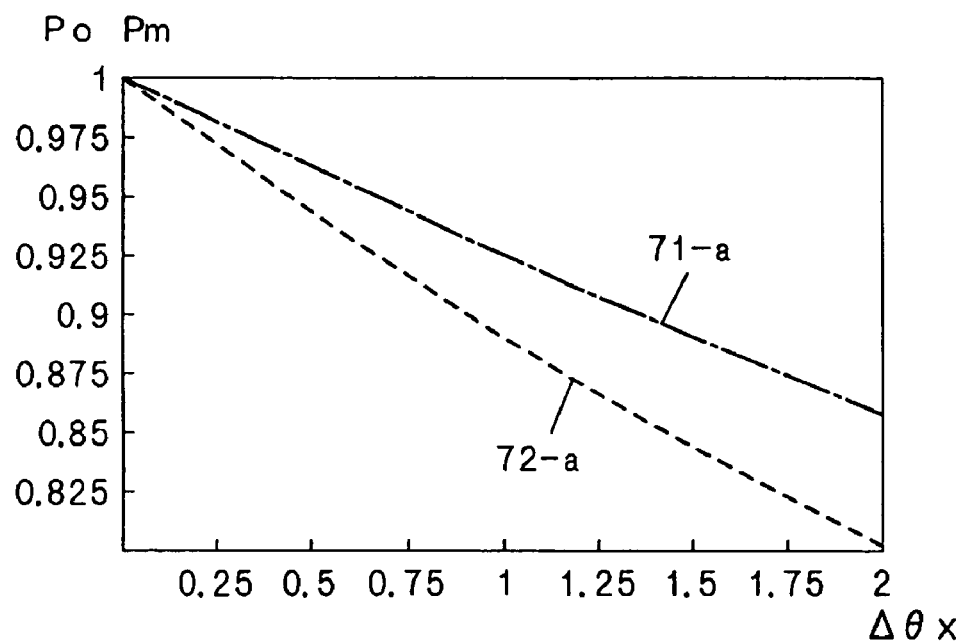
FIG. 7A shows how Po and Pm change depending on $\Delta\theta x$ in the first preferred embodiment if the fc=25 and dBx=0.
Figure 7B:
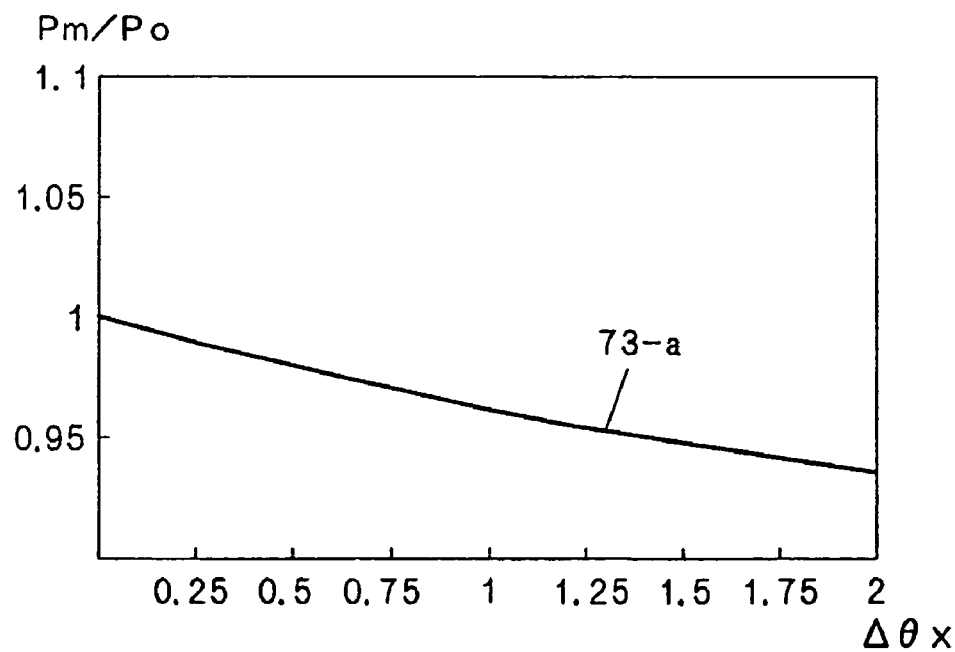
FIG. 7B shows how Pm/Po changes depending on $\Delta\theta x$ in the first preferred embodiment if the fc=25 and dBx=0.

FIGS. 7A through 7D show the results obtained when the collimator lens 3 had a focal length fc of 25 mm. In FIG. 7A, when dBx=0, the dependences of Po and Pm on Δθx are represented by the curves 71-a and 72-a, respectively. As is clear from FIG. 7A, although its difference decreases compared to the situation where fc=15 mm, the dependence of Pm on Δθx is still greater than that of Po on Δθx. Accordingly, if Δθx changes from 0 degrees into 2 degrees, the Pm/Po ratio changes by about 6% as represented by the curve 73-a in FIG. 7B.

Figure 7C:
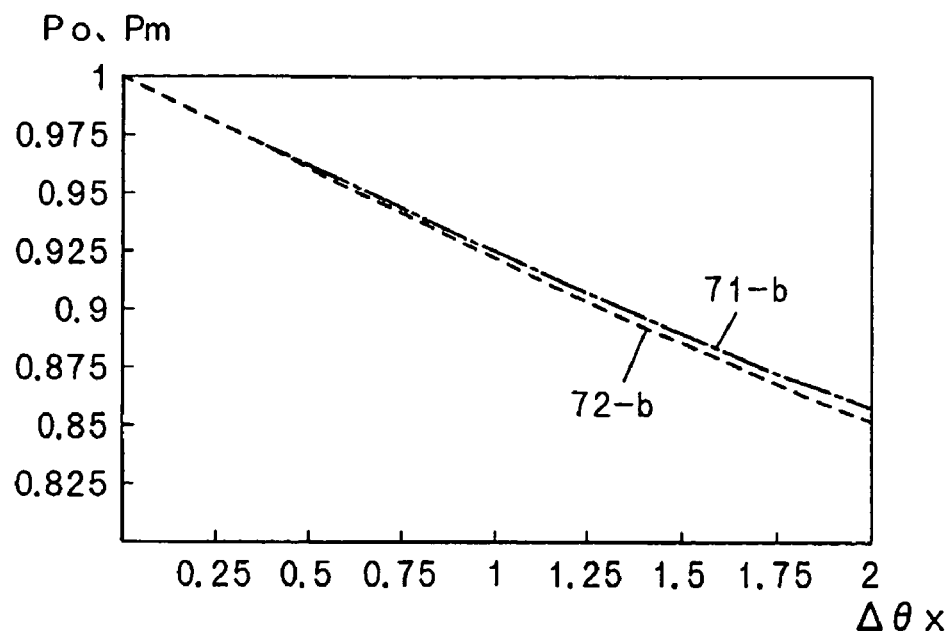
FIG. 7C shows how Po and Pm change depending on $\Delta\theta x$ in the first preferred embodiment if the fc=25 and dBx=0.87.
Figure 7D:
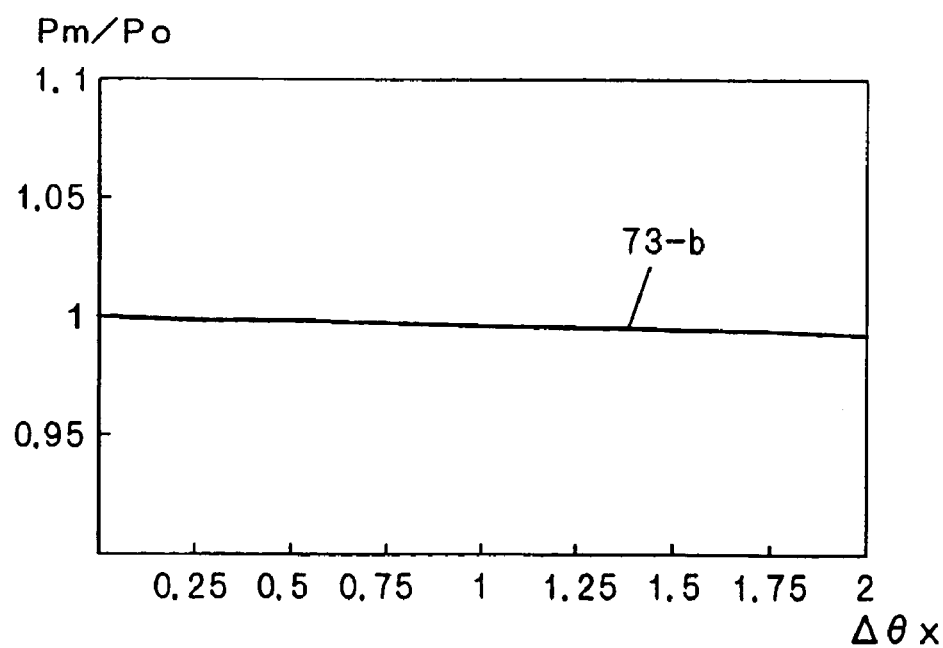
FIG. 7D shows how Pm/Po changes depending on $\Delta\theta x$ in the first preferred embodiment if the fc=25 and dBx=0.87.

On the other hand, if dBx=0.87 mm, the dependences of Po and Pm on Δθx are represented by the curves 71-b and 72-b, respectively, as shown in FIG. 7C. As is clear from FIG. 7C, the dependence of Pm on Δθx is now almost equal to that of Po on Δθx. As a result, even when Δθx changes from 0 degrees into 2 degrees, the Pm/Po ratio hardly changes and its variation can be reduced to about 1% or less as represented by the curve 73-b in FIG. 7D.

A variation in the focal length of the collimator lens is equivalent to a variation in the rim intensity of the light entering the condenser lens 7. As used herein, the "rim intensity" means the intensity of the light entering the rim (i.e., the outer edge) of the aperture area 112 of the condenser lens 7 and is expressed in percentages when the highest intensity of the light entering the aperture area 112 of the condenser lens 7 is 100%. If the focal length fc of the collimator lens changes from 15 mm into 25 mm, then the rim intensity of the light entering the condenser lens 7 in the horizontal direction changes from about 8% into about 56%. This range almost covers the entire range of possible rim intensities that may be adopted as a condition for designing an optical system in an optical disk drive for writing data on a CD, an MD, a DVD, a BD or any other storage medium in view of how much the beam spot, made by the condenser lens, has been converged and how efficiently the light emitted from the light source can be used. Accordingly, as long as a normal rim intensity condition is adopted, by offsetting the center of the photosensitive area of the detector with respect to that of the light intensity distribution of the far-field pattern in the direction in which the angle of radiation changes most significantly, the effects of the variation in the angle of radiation can be minimized and the optical power of the light source can be monitored accurately irrespective of the rim intensity (or the focal length of the collimator lens).

Next, it will be described what effects the dimensions of the photosensitive area of the detector 5 will have. FIGS. 8A through 8D show the results of calculations that were obtained when the photosensitive area of the detector 5 had a radius rB of 0.25 mm. In this example, the collimator lens 3 had a focal length fc of 20 mm and the other conditions were just as described above.

Figure 8A:
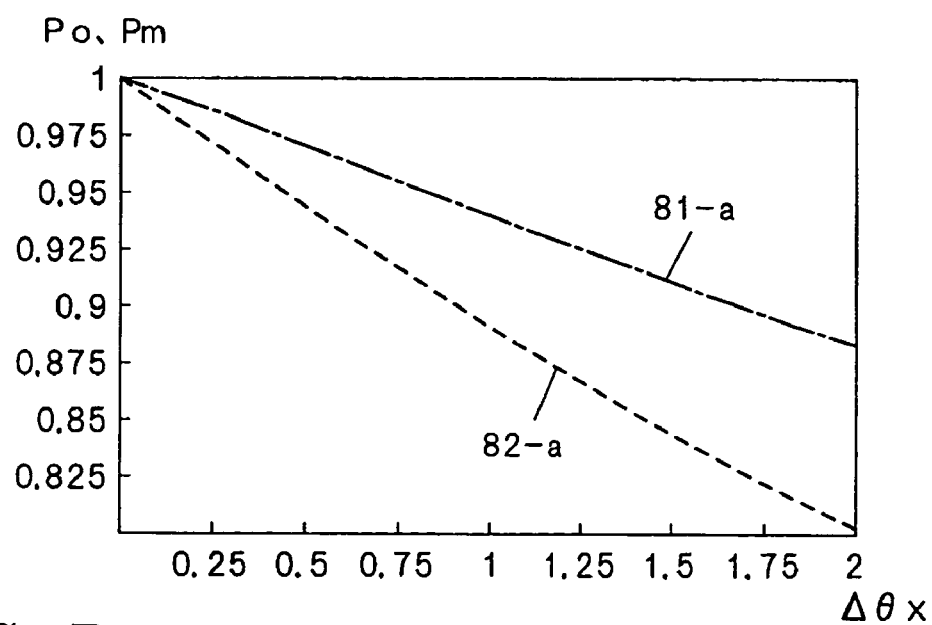
FIG. 8A shows how Po and Pm change depending on $\Delta\theta x$ in the first preferred embodiment if the rB=0.25 and dBx=0.
Figure 8B:
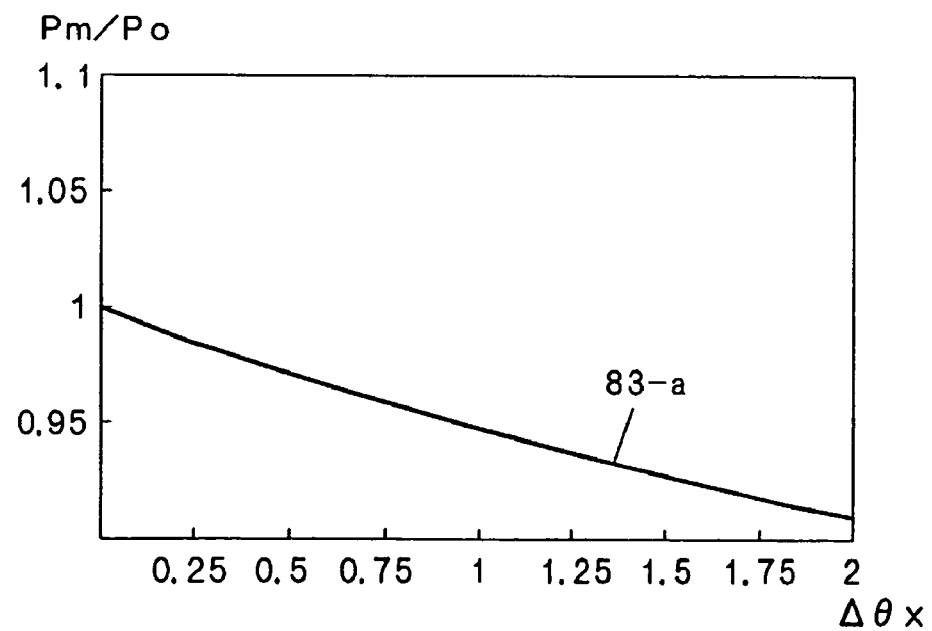
FIG. 8B shows how Pm/Po changes depending on $\Delta\theta x$ in the first preferred embodiment if the rB=0.25 and dBx=0.

In FIG. 8A, if dBx=0, the dependences of Po and Pm on Δθx are represented by the curves 81-a and 82-a, respectively. As is clear from FIG. 8A, the dependence of Pm on Δθx is greater than that of Po on Δθx. Accordingly, if Δθx changes from 0 degrees into 2 degrees, the Pm/Po ratio changes by about 9% as represented by the curve 83-a in FIG. 8B.

Figure 8C:
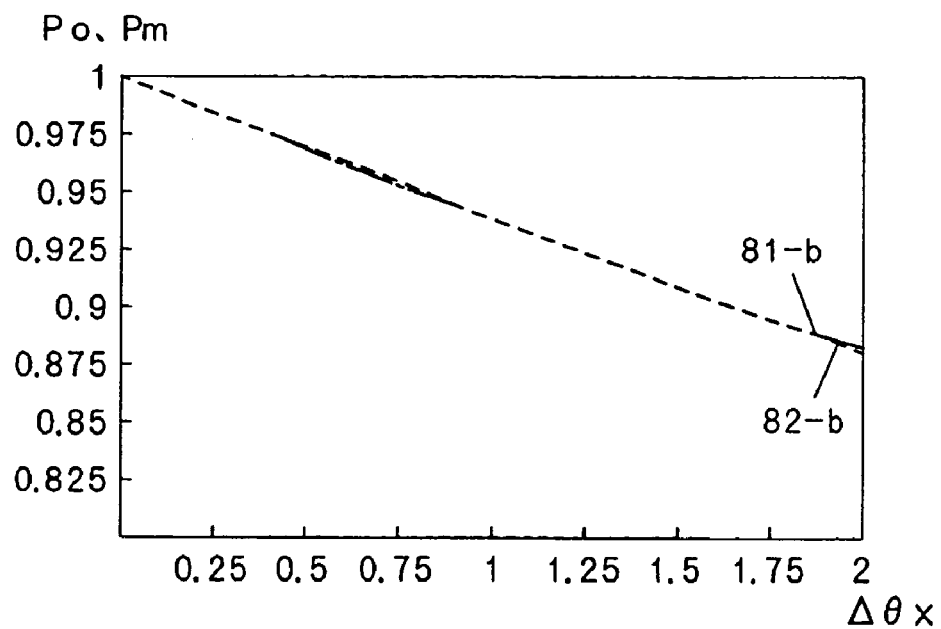
FIG. 8C shows how Po and Pm change depending on $\Delta\theta x$ in the first preferred embodiment if the rB=0.25 and dBx=0.87.
Figure 8D:
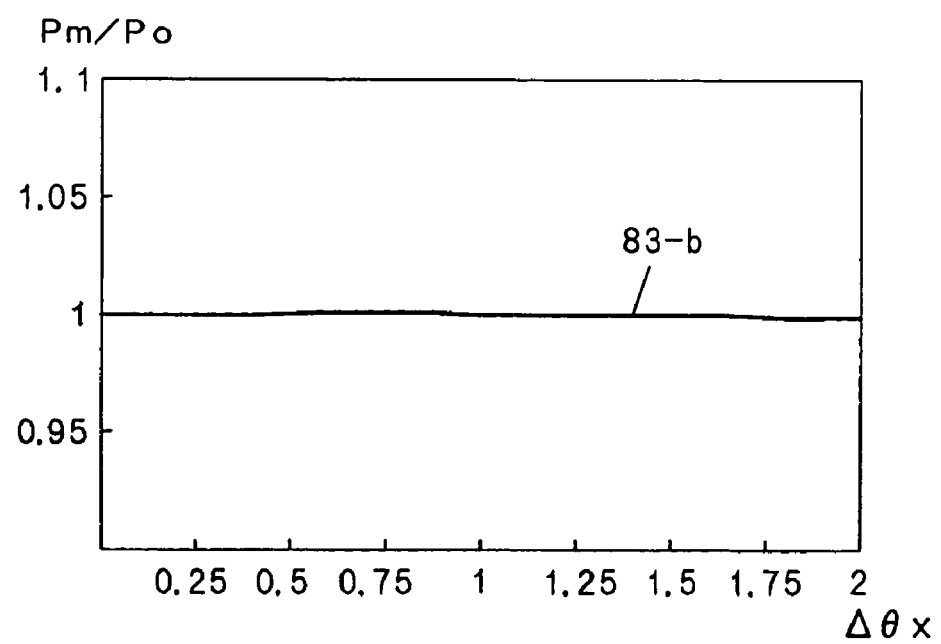
FIG. 8D shows how Pm/Po changes depending on $\Delta\theta x$ in the first preferred embodiment if the rB=0.25 and dBx=0.87.

On the other hand, if dBx=0.87 mm, the dependences of Po and Pm on Δθx are represented by the curves 81-b and 82-b, respectively, as shown in FIG. 8C. As is clear from FIG. 8C, the dependences of Po and Pm on Δθx match each other very well. As a result, even when Δθx changes from 0 degrees into 2 degrees, the variation in Pm/Po can be reduced to about 0.2% or less, and the Pm/Po ratio can be kept substantially constant, as represented by the curve 83-b in FIG. 8D.

Figure 9A:
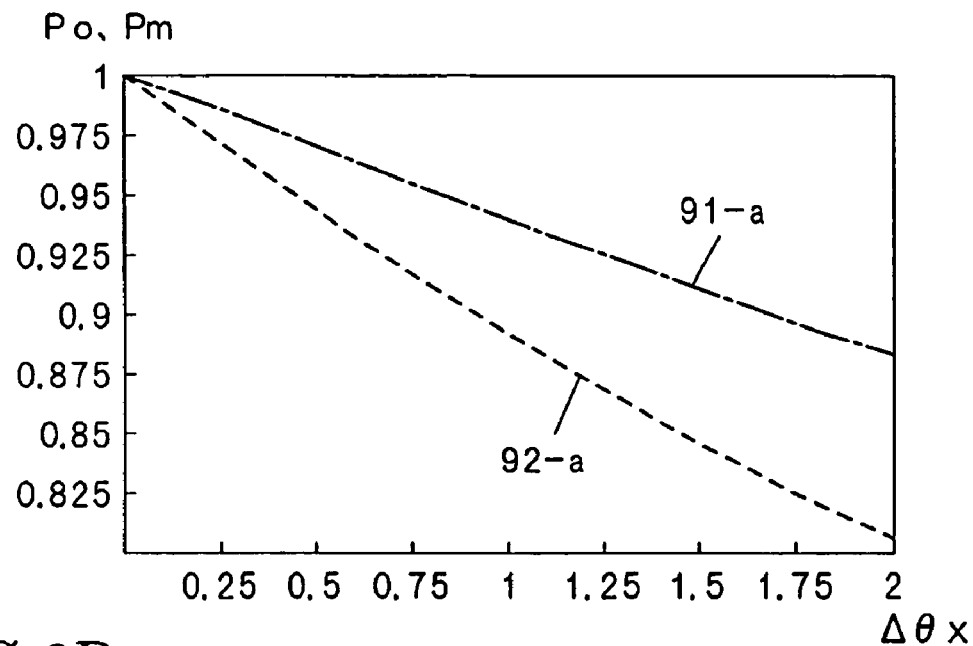
FIG. 9A shows how Po and Pm change depending on $\Delta\theta x$ in the first preferred embodiment if the rB=0.45 and dBx=0.
Figure 9B:
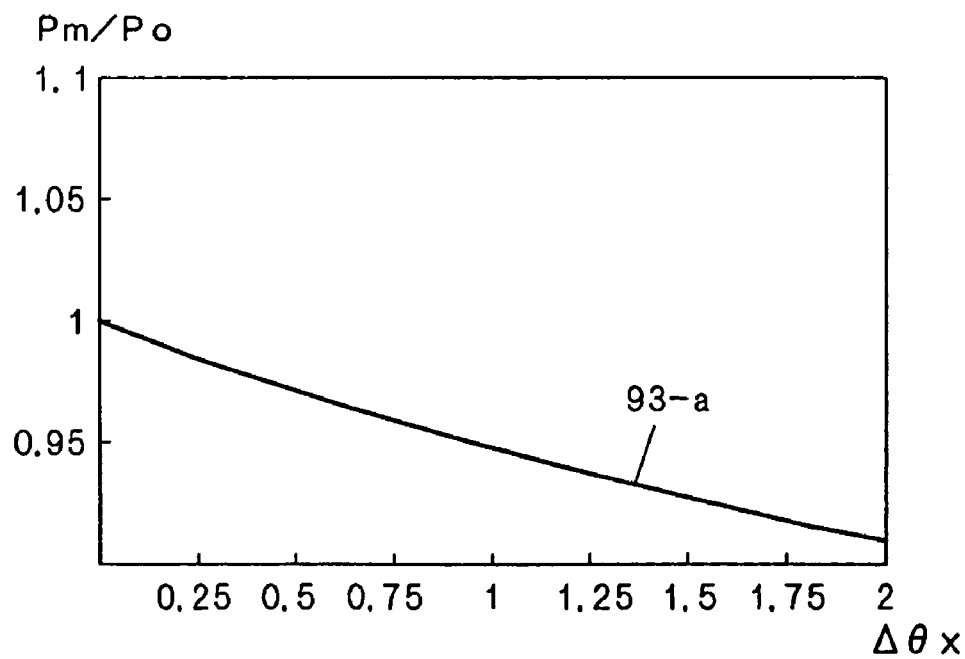
FIG. 9B shows how Pm/Po changes depending on $\Delta\theta x$ in the first preferred embodiment if the rB=0.45 and dBx=0.

Even when the photosensitive area had a radius rB of 0.45 mm, almost the same results were obtained. Specifically, if dBx=0, the dependences of Po and Pm on Δθx are represented by the curves 91-a and 92-a, respectively, as shown in FIG. 9A. As is clear from FIG. 9A, the dependence of Pm on Δθx is greater than that of Po on Δθx. Accordingly, if Δθx changes from 0 degrees into 2 degrees, the Pm/Po ratio changes by about 9% as represented by the curve 93-a in FIG. 9B.

Figure 9C:
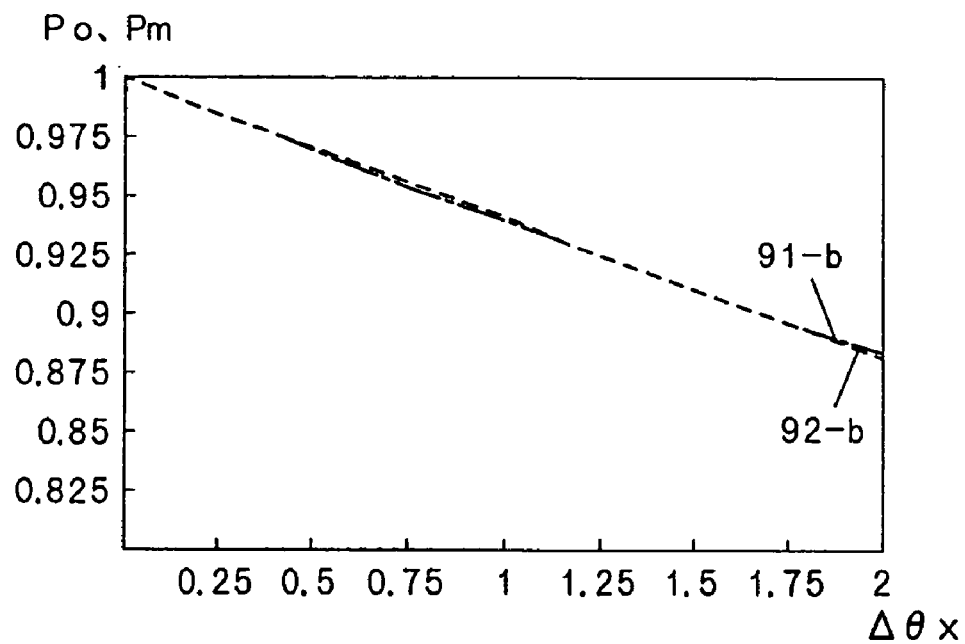
FIG. 9C shows how Po and Pm change depending on $\Delta\theta x$ in the first preferred embodiment if the rB=0.45 and dBx=0.87.
Figure 9D:
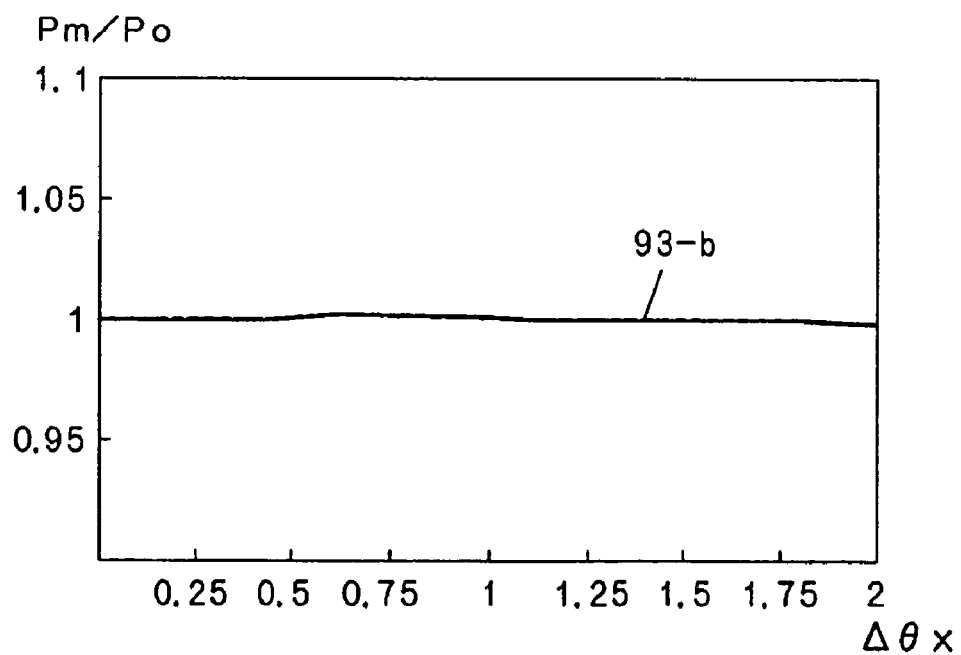
FIG. 9D shows how Pm/Po changes depending on $\Delta\theta x$ in the first preferred embodiment if the rB=0.45 and dBx=0.87.

On the other hand, if dBx=0.87 mm, the dependences of Po and Pm on Δθx are represented by the curves 91-b and 92-b, respectively, as shown in FIG. 9C. As is clear from FIG. 9C, the dependences of Po and Pm on Δθx match each other very well. As a result, even when Δθx changes from 0 degrees into 2 degrees, the variation in Pm/Po can be reduced to about 0.1% or less, and the Pm/Po ratio can be kept substantially constant, as represented by the curve 93-b in FIG. 9D.

An optical disk drive for writing data on a CD, an MD, a DVD, a BD or any other storage medium usually monitors the optical power by using a detector that has a photosensitive area with a diameter φ of about 0.5 mm to about 0.9 mm. Accordingly, in such a normal optical disk drive, by offsetting the center of the photosensitive area of the detector by about 0.87 mm with respect to that of the light intensity distribution of the far-field pattern in the direction in which the angle of radiation changes most significantly, the effects of the variation in the angle of radiation can be minimized and the optical power of the light source can be monitored accurately irrespective of the actual dimensions of the photosensitive area of the detector.

Next, it will be described what effects the dimensions of the aperture area of the condenser lens 7 will have. In the following example, the photosensitive area of the detector was supposed to have a radius rB of 0.35 mm. FIGS. 10A through 10D show the results of calculations that were obtained when the aperture area of the condenser lens 7 had a radius rA of 1 mm.

Figure 10A:
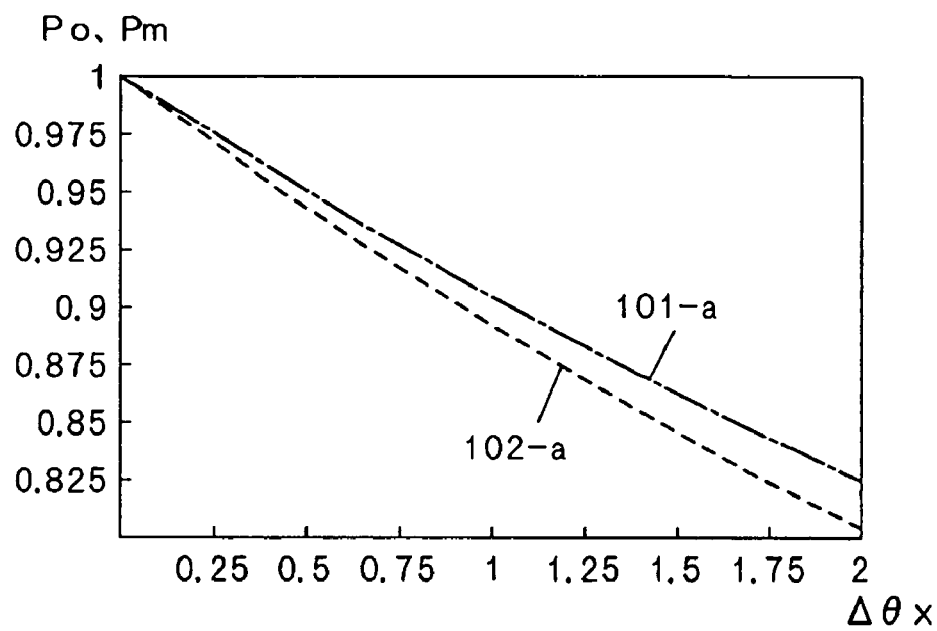
FIG. 10A shows how Po and Pm change depending on $\Delta\theta x$ in the first preferred embodiment if the rA=1 and dBx=0.
Figure 10B:
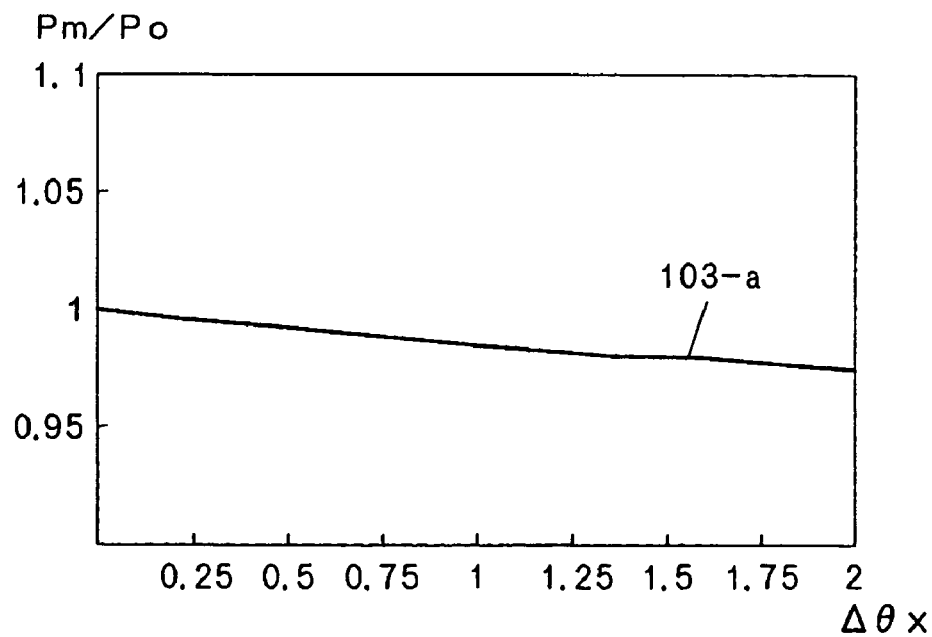
FIG. 10B shows how Pm/Po changes depending on $\Delta\theta x$ in the first preferred embodiment if the rA=1 and dBx=0.

In FIG. 10A; if dBx=0, the dependences of Po and Pm on Δθx are represented by the curves 101-a and 102-a, respectively. As is clear from FIG. 10A, the dependences of Po and Pm on Δθx are not so much different from each other. Accordingly, if Δθx changes from 0 degrees into 2 degrees, the Pm/Po ratio changes by no more than about 3% as represented by the curve 103-a in FIG. 10B.

Figure 10C:
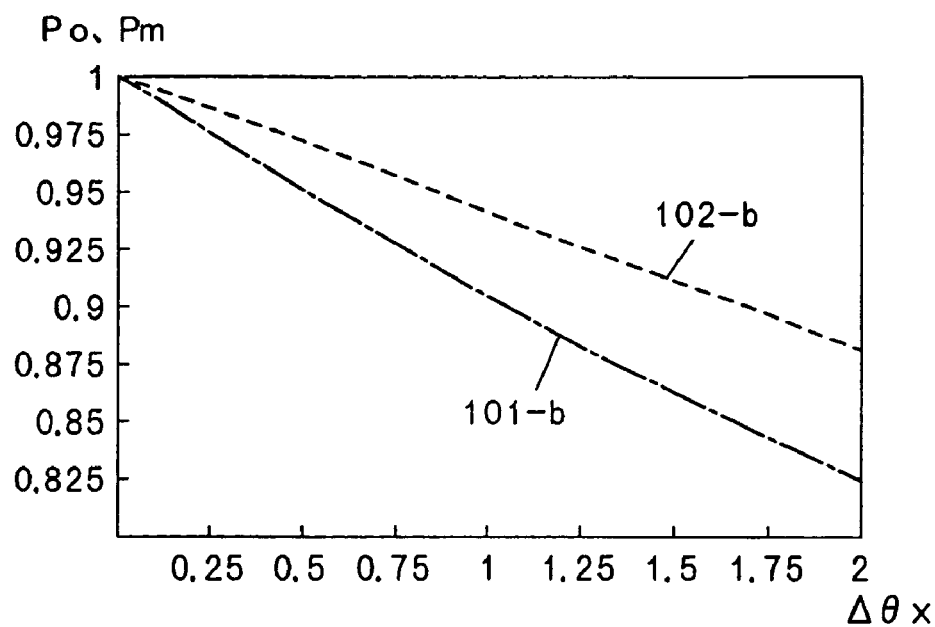
FIG. 10C shows how Po and Pm change depending on $\Delta\theta x$ in the first preferred embodiment if the rA=1 and dBx=0.87.
Figure 10D:
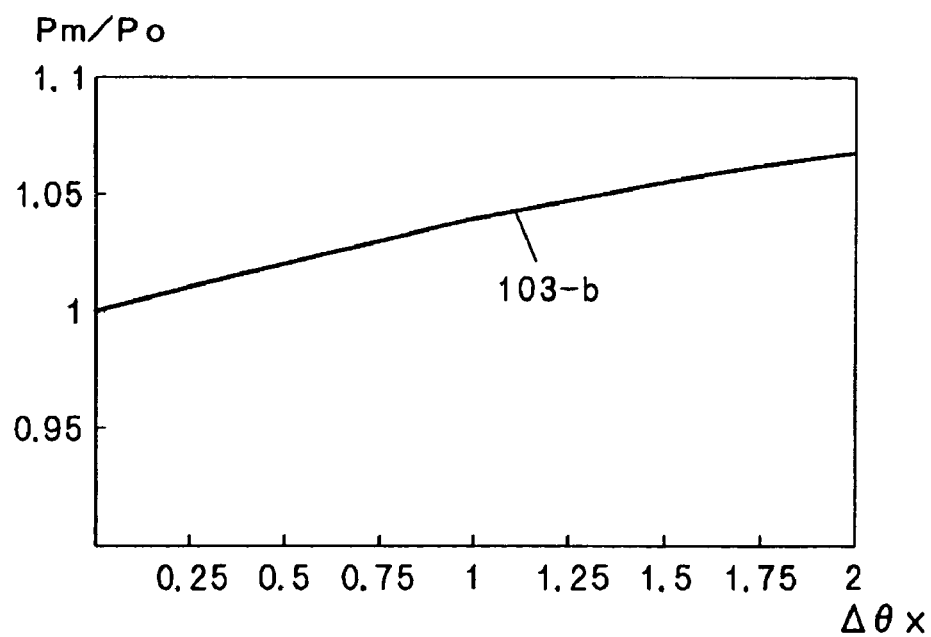
FIG. 10D shows how Pm/Po changes depending on Δθx in the first preferred embodiment if the rA=1 and dBx=0.87.

On the other hand, if dBx=0.87 mm, the dependences of Po and Pm on Δθx are represented by the curves 101-b and 102-b, respectively, as shown in FIG. 10C. As is clear from FIG. 10C, the dependence of Pm on Δθx decreases significantly compared to the situation where dBx=0. As a result, the difference in dependence on Δθx between Po and Pm rather increases. As a result, when Δθx changes from 0 degrees into 2 degrees, the variation in Pm/Po increases to about 7% as represented by the curve 103-b in FIG. 10D.

Figure 10E:
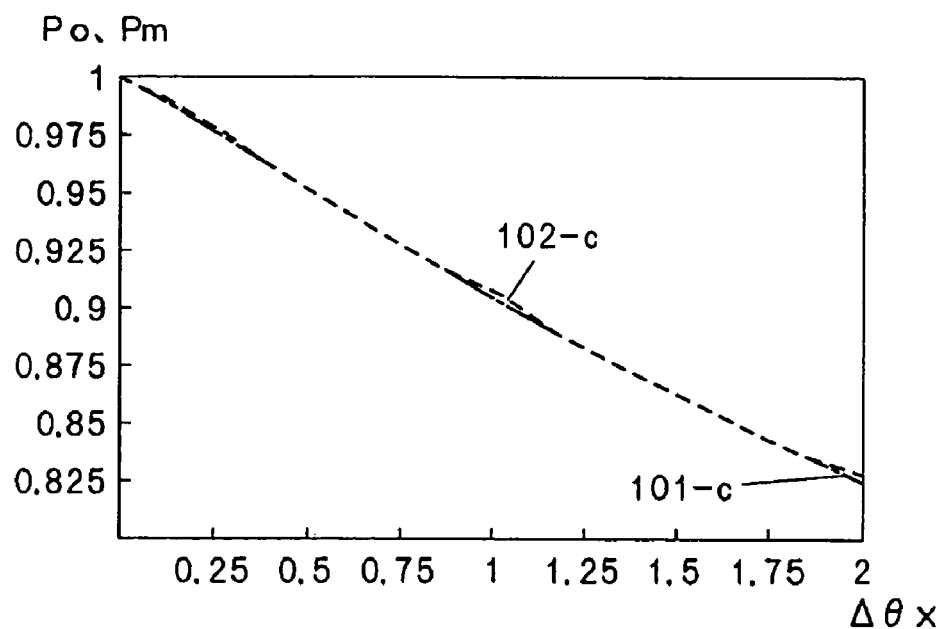
FIG. 10E shows how Po and Pm change depending on Δθx in the first preferred embodiment if the rA=1 and dBx=0.46.
Figure 10F:
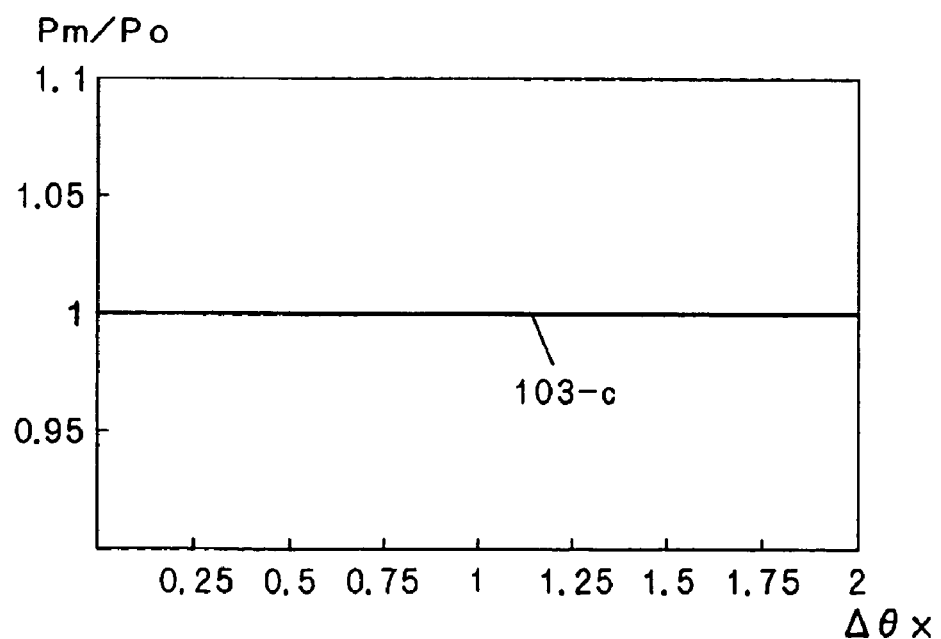
FIG. 10F shows how Pm/Po changes depending on Δθx in the first preferred embodiment if the rA=1 and dBx=0.46.

On these conditions, dBk that minimizes the variation in Pm/Po ratio is 0.46 mm. As represented by the curves 101-c and 102-c in FIG. 10E, the dependences of Po and Pm on Δθx substantially match each other. In that case, when Δθx changes from 0 degrees into 2 degrees, the variation in Pm/Po can be reduced to no more than ±0.2%, and the Pm/Po ratio can be kept substantially constant, as represented by the curve 103-c in FIG. 10F.

Figure 11A:
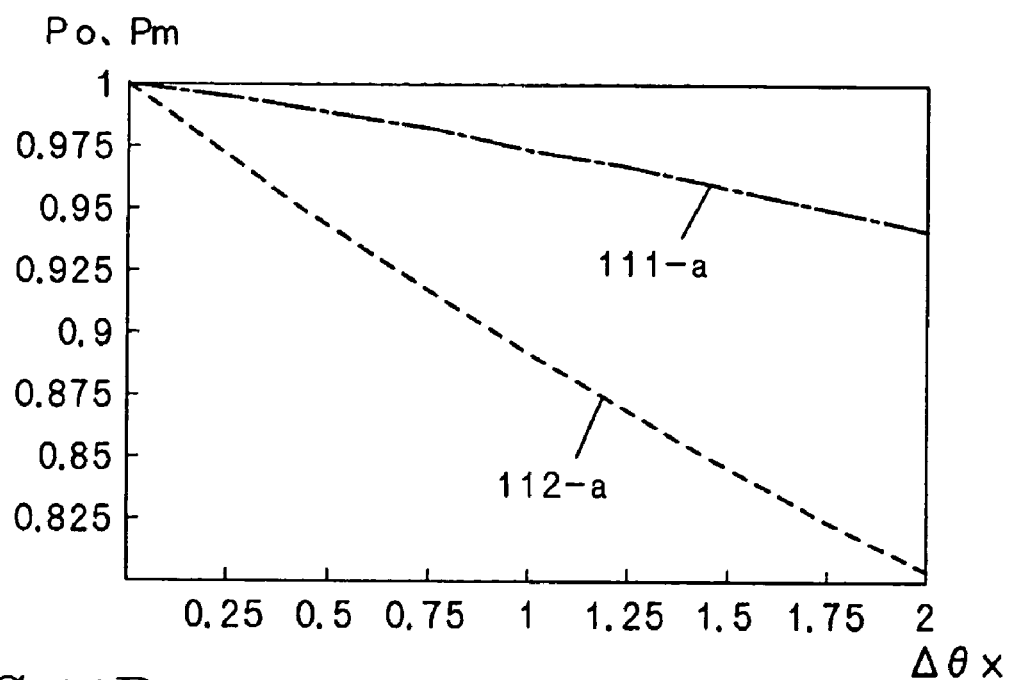
FIG. 11A shows how Po and Pm change depending on Δθx in the first preferred embodiment if the rA=3 and dBx=0.
Figure 11B:
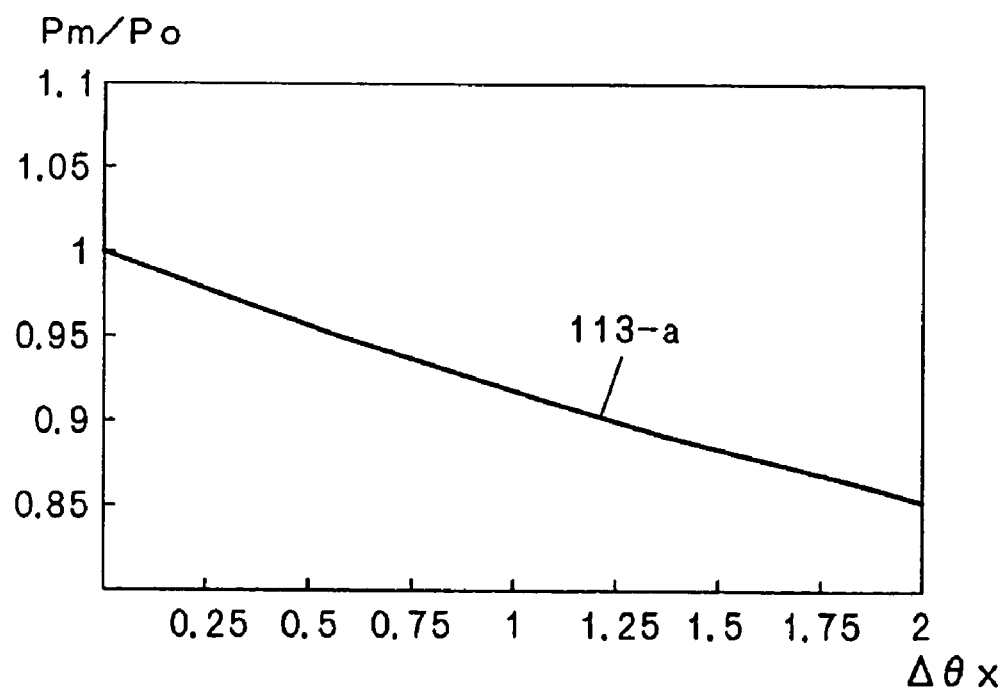
FIG. 11B shows how Pm/Po changes depending on Δθx in the first preferred embodiment if the rA=3 and dBx=0.
Figure 11C:
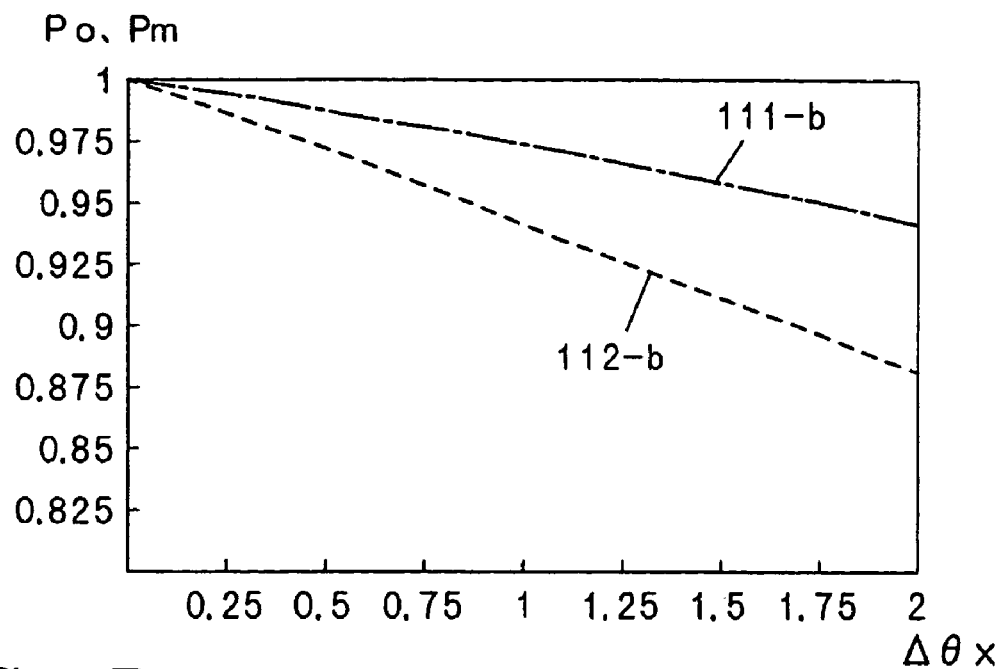
FIG. 11C shows how Po and Pm change depending on Δθx in the first preferred embodiment if the rA=3 and dBx=0.87.
Figure 11D:
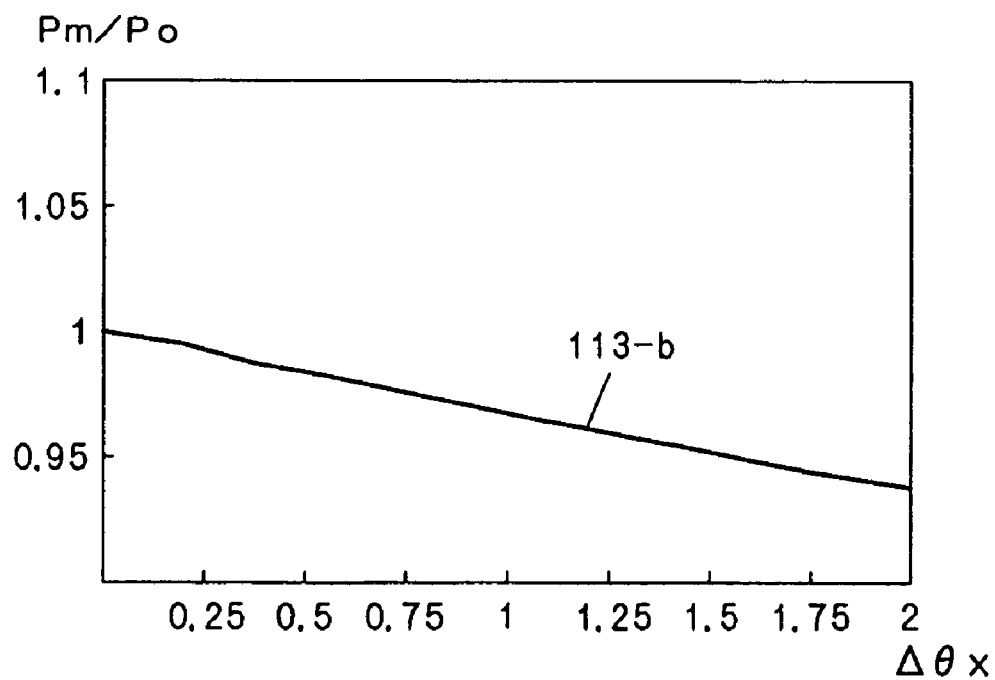
FIG. 11D shows how Pm/Po changes depending on Δθx in the first preferred embodiment if the rA=3 and dBx=0.87.

Next, FIGS. 11A through 11D show the results of calculations that were obtained when the aperture area of the condenser lens had a radius rA of 3 mm. In FIG. 11A, if dBx=0, the dependences of Po and Pm on Δθx are represented by the curves 111-a and 112-a, respectively. As is clear from FIG. 11A, the dependence of Pm on Δθx is greater than that of Po on Δθx. Accordingly, if Δθx changes from 0 degrees into 2 degrees, the Pm/Po ratio changes by about 15% as represented by the curve 113-a in FIG. 11B.

On the other hand, if dBx=0.87 mm, the dependences of Po and Pm on Δθx are represented by the curves 111-b and 112-b, respectively, as shown in FIG. 1C. As is clear from FIG. 11C, although the dependence of Pm on A e x has decreased, there is still a significant difference between the respective dependences of Pm and Po on Δθx. As a result, even when Δθx changes from 0 degrees into 2 degrees, the variation in Pm/Po is about 6% as represented by the curve 113-b in FIG. 1D.

Figure 11E:
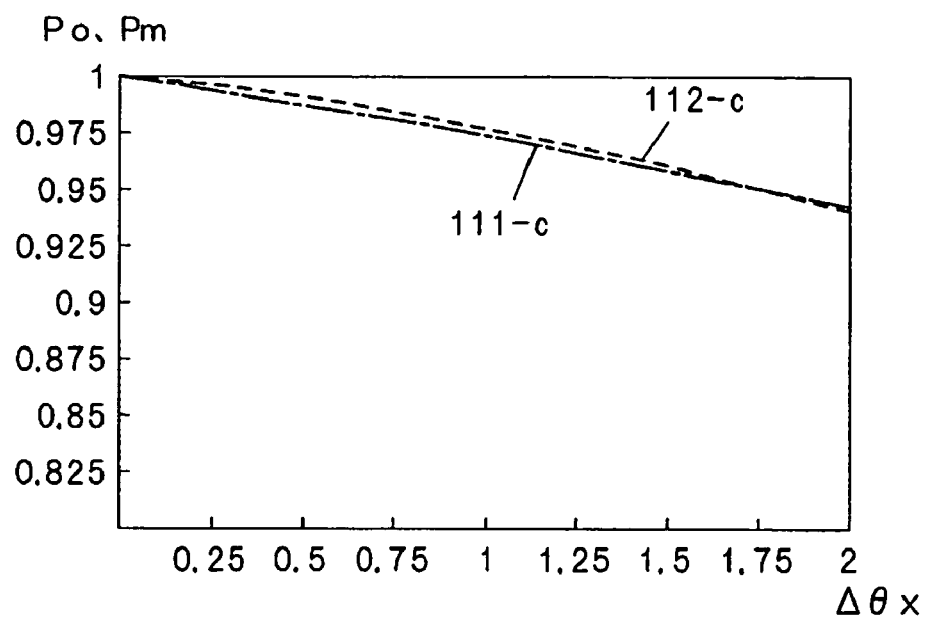
FIG. 11E shows how Po and Pm change depending on Δθx in the first preferred embodiment if the rA=3 and dBx=1.13.
Figure 11F:
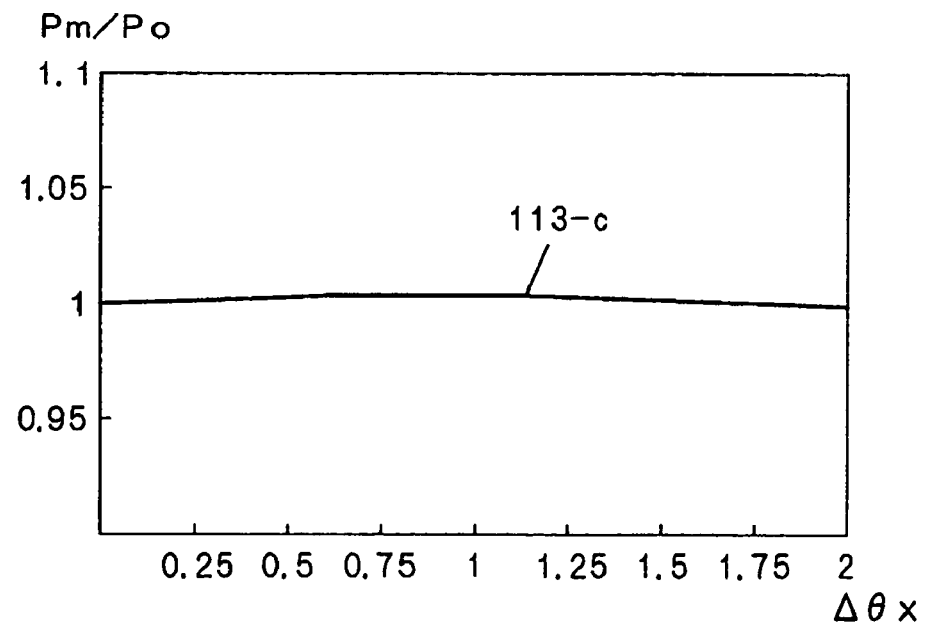
FIG. 11F shows how Pm/Po changes depending on Δθx in the first preferred embodiment if the rA=3 and dBx=1.13.

On these conditions, dBk that minimizes the variation in Pm/Po ratio is 1.13 mm. As represented by the curves 111-c and 112-c in FIG. 11E, the dependences of Po and Pm on Δθx substantially match each other. In that case, when $\Delta\theta x$ changes from 0 degrees into 2 degrees, the variation in Pm/Po can be reduced to no more than ±0.5%, and the Pm/Po ratio can be kept substantially constant, as represented by the curve 113-c in FIG. 11F.

Figure 12:
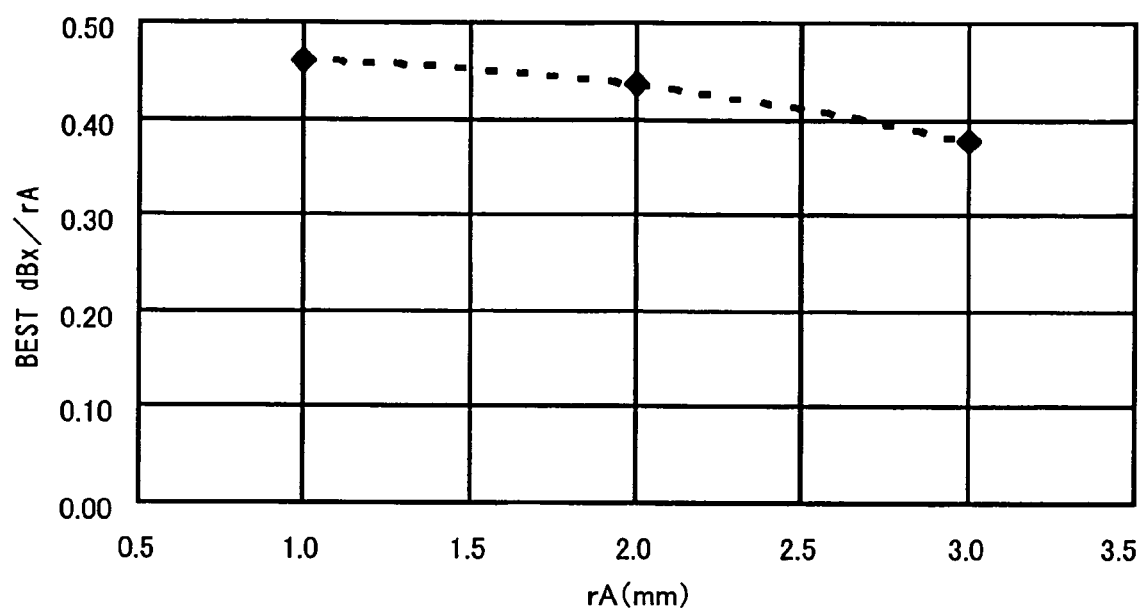
FIG. 12 shows how the best dx changes with rA in the first preferred embodiment.

By analyzing these results, correlation can be found between the radius rA of the aperture area of the condenser lens and the distance dBx from the center of the light intensity distribution of the far-field pattern to that of the photosensitive area of the detector. FIG. 12 shows how the best dBx changes with rA. As can be seen from FIG. 12, if rA falls within the range of 1 mm to 3 mm, the ratio of the best dBx to rA (i.e., dBx/rA ratio) is in the range of 0.38 to 0.46. In this rA range, the ratio of the best dBx to rA has an average of 0.42. Consequently, to reduce the variation in Pm/Po with $\Delta\theta x$, it is effective to set the dBx/rA ratio to about 0.42.

In actually designing a drive, however, the best dBx, derived from the dBx/rA ratio, sometimes cannot be adopted because the photodetector sensitivity of the optical power monitoring detector needs to be matched to the intensity of the incoming light and because of various design constraints on the dimensions of the drive, layout rules, and so on. Hereinafter, the range of dBx that can still reduce the variation in Pm/Po ratio with $\Delta\theta x$ even in such situations will be defined.

Figure 13A:
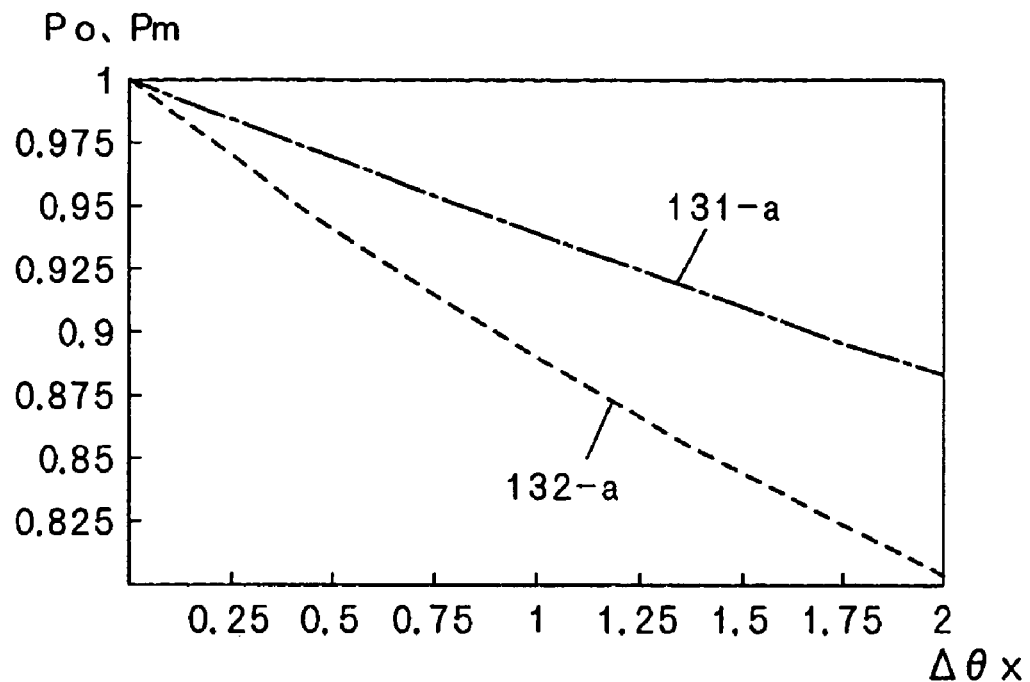
FIG. 13A shows how Po and Pm change depending on Δθx in the first preferred embodiment if dBx=0 under a predetermined condition.
Figure 13B:
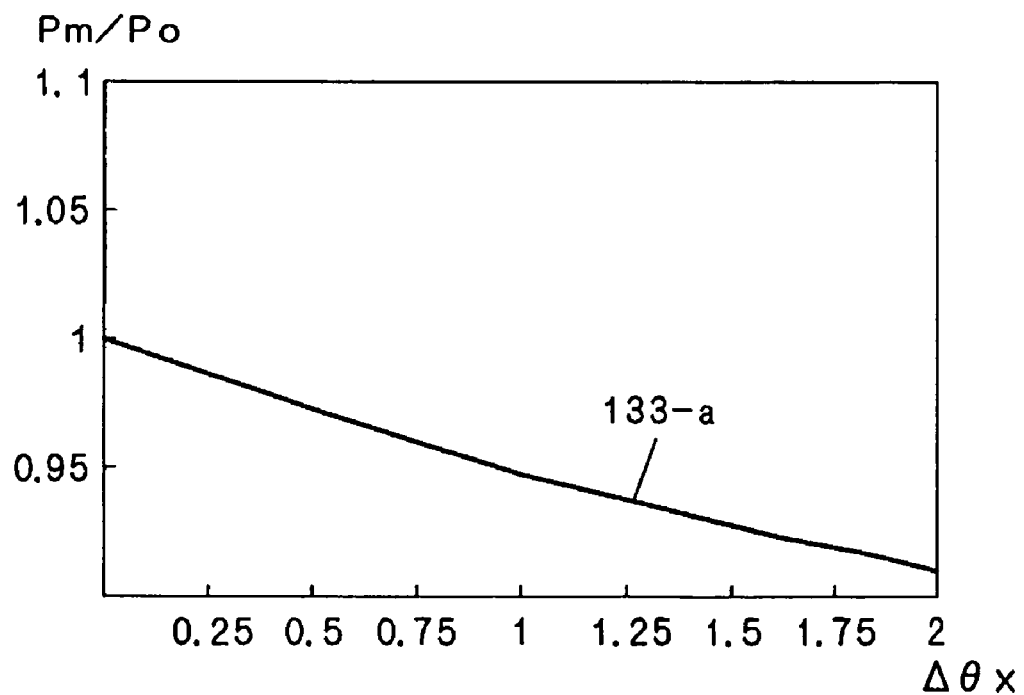
FIG. 13B shows how Pm/Po changes depending on Δθx in the first preferred embodiment if dBx=0 under a predetermined condition.

Under the following conditions, if the center of the aperture area of the condenser lens agrees with that of the photosensitive area of the detector (i.e., when dBx=0), then Po and Pm have the $\Delta\theta x$ dependences represented by the curves 131-a and 132-a, respectively, as shown in FIG. 13A. Also, when $\Delta\theta x$ changes from 0 degrees to 2 degrees, the Pm/Po ratio changes by about 9% as shown in FIG. 13B.

Angle of radiation $\theta x$ (Lo) of the light source in low output mode: 8 degrees;
Angle of radiation $\theta x$ (Hi) of the light source in high output mode: 10 degrees;
Angle of radiation $\theta y$ of the light source in y direction: 17 degrees (constant);
Focal length fc of the collimator lens: 20 mm;
Radius rA of the aperture area: 2 mm; and
Radius rB of the photosensitive area: 0.35 mm.

Figure 13C:
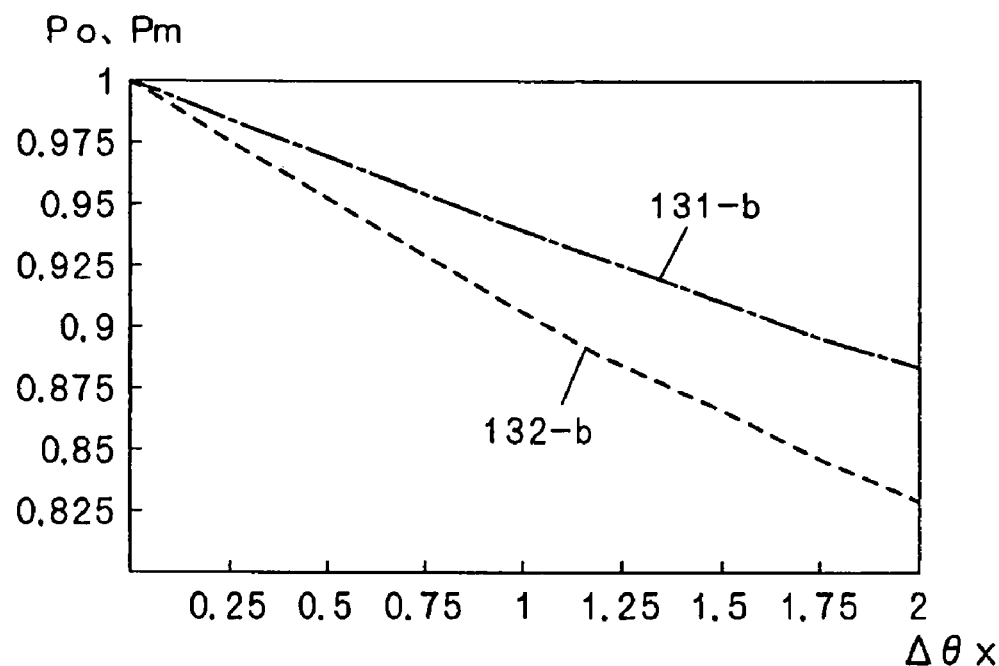
FIG. 13C shows how Po and Pm change depending on Δθx in the first preferred embodiment if dBx=0.5 under a predetermined condition.
Figure 13D:
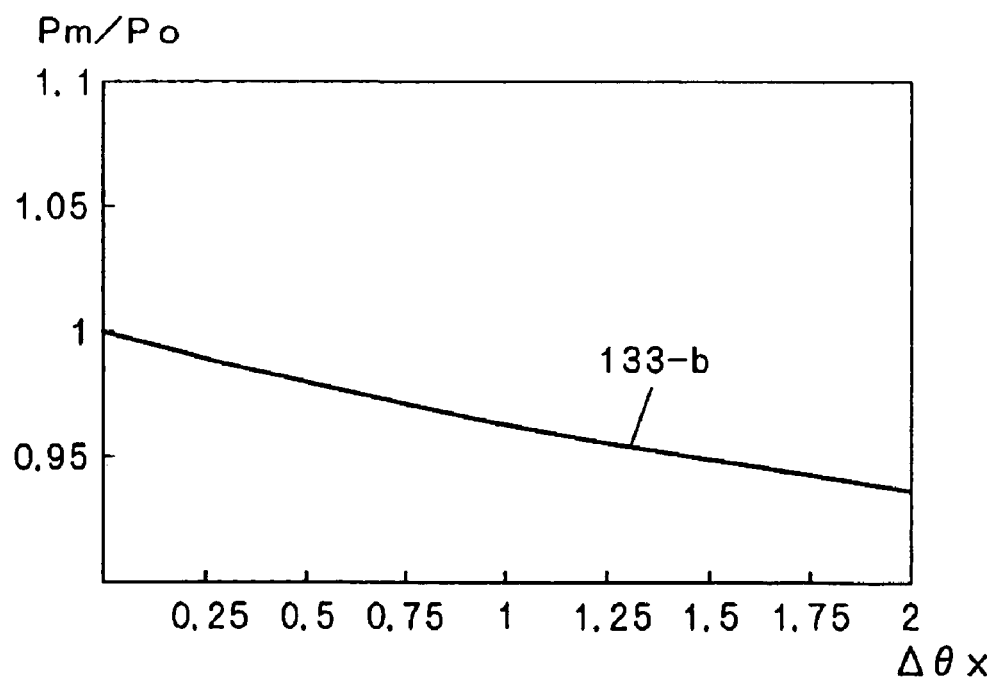
FIG. 13D shows how Pm/Po changes depending on Δθx in the first preferred embodiment if dBx=0.5 under a predetermined condition.
Figure 13E:
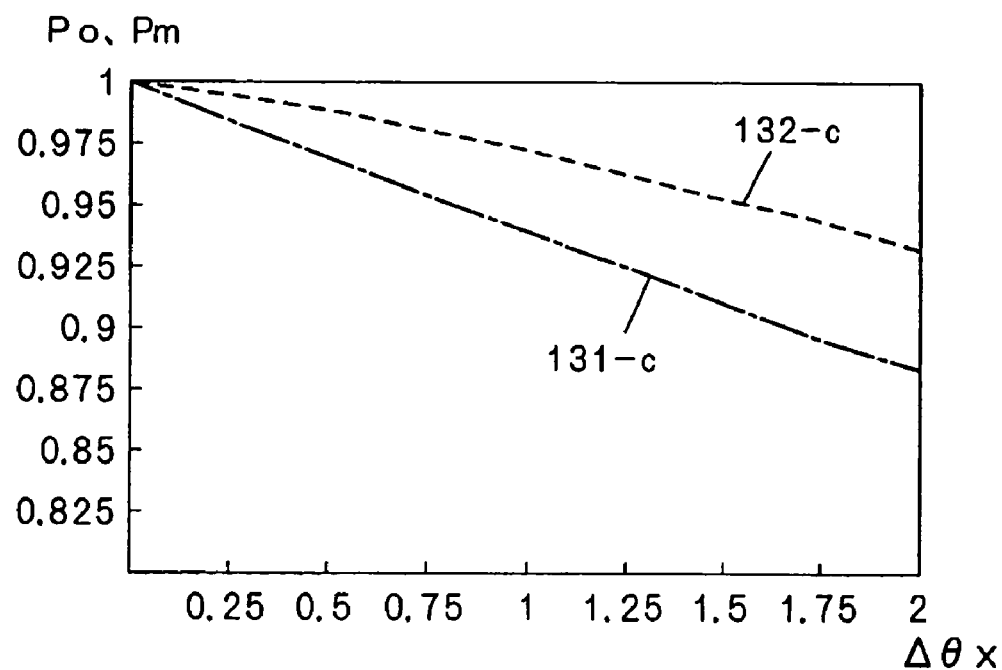
FIG. 13E shows how Po and Pm change depending on Δθx in the first preferred embodiment if dBx=1.1 under a predetermined condition.
Figure 13F:
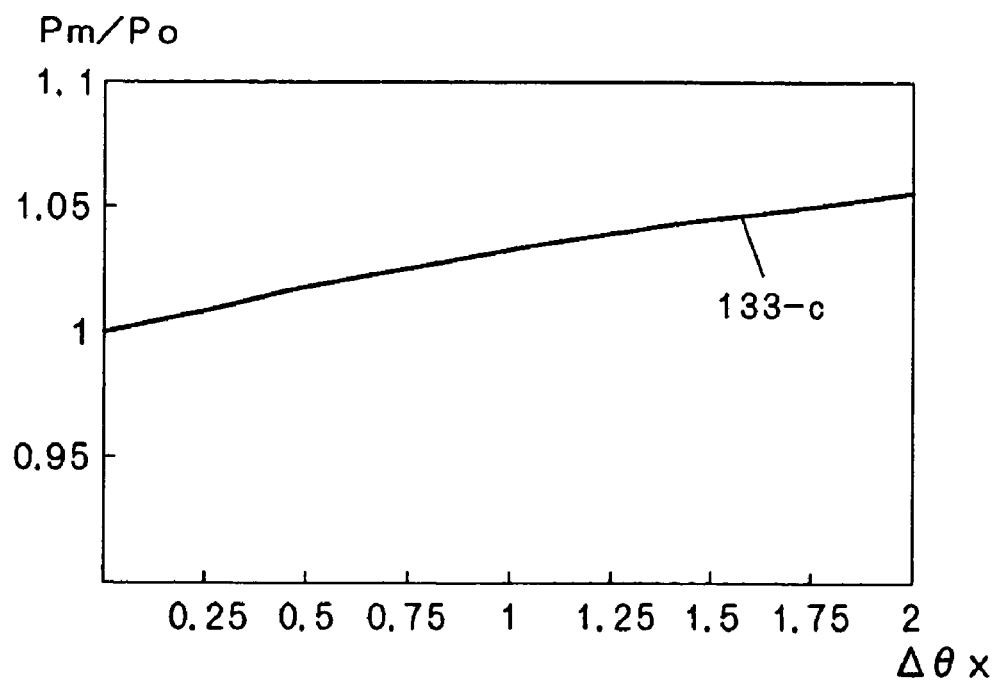
FIG. 13F shows how Pm/Po changes depending on Δθx in the first preferred embodiment if dBx=1.1 under a predetermined condition.

On these conditions, dBx that could reduce the variation in Pm/Po ratio to ±6% or less was in the range of 0.5 to 1.1. FIGS. 13C and 13D show the dependences of Po, Pm and the Pm/Po ratio on $\Delta\theta x$ in a situation where dBx is 0.5. On the other hand, FIGS. 13E and 13F show the dependences of Po, Pm and the Pm/Po ratio on $\Delta\theta x$ in a situation where dBx is 1.1. If the dBx values have such a degree of freedom, the variation in Pm/Po ratio with $\Delta\theta x$ can be reduced with various design constrains on the drive satisfied. In this case, dBx/rA satisfies the inequality 0.25<dBx/rA<0.55 (i.e., 0.25 rA<dBx<0.55 rA).

In the preferred embodiment described above, the center of the aperture area of the condenser lens agrees with that of the light intensity distribution of the far-field pattern of the light radiated from the light source. However, these two centers do not have to agree with each other. More specifically, the center of the aperture area of the condenser lens may have an offset, which should be smaller than the offset dBx of the center of the photosensitive area of the detector in the x direction, with respect to that of the light intensity distribution of the far-field pattern. This is because the change in Po is little affected by a location of the center of the aperture area due to the large aperture area and low rim intensity thereof. For example, as shown by the curve 31-a, if dAx=0 and the radiation $\theta x$ changes from 8 deg to 10 deg, the Po decreases by 12%. On the other hand, if dAx=0.25rAx under the same condition, the Po decreases by 11%. In this way, the change in Po is little dependent on dAx. Accordingly, supposing the distance from the center of the aperture area of the condenser lens to that of the light intensity distribution of the far-field pattern in the x direction is dAx, the effects of the present invention described above are achieved as long as dAx<0.25 rAx is satisfied.

Also, in the preferred embodiment described above, the aperture area of the condenser lens and the photosensitive area of the detector have circular shapes. Alternatively, these areas may have a rectangular, polygonal or any other suitable shape as described above. Even so, the effects of the present invention are achieved if the aperture and photosensitive areas have widths of 2 rAx and 2 rBx, respectively, in the x direction and if rAx and rBx satisfy the conditions described above.

Figure 14A:
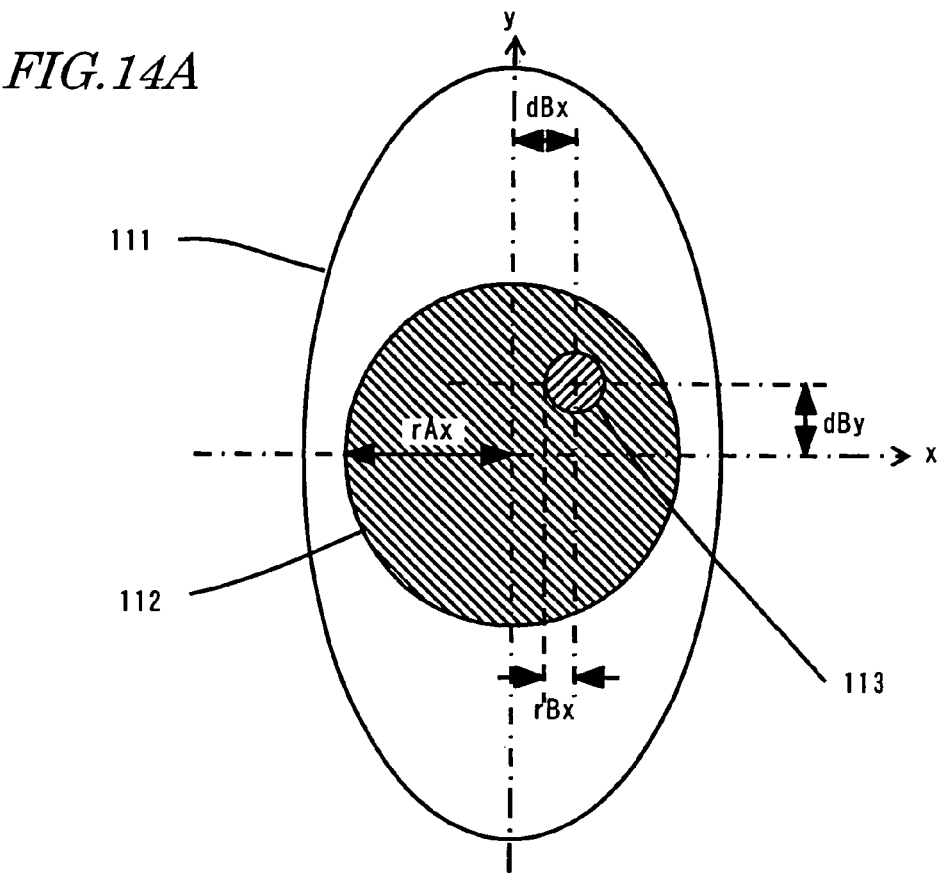
FIG. 14A shows a far-field pattern as viewed on a plane perpendicular to the optical axis of the light source of the first preferred embodiment.
Figure 14B:
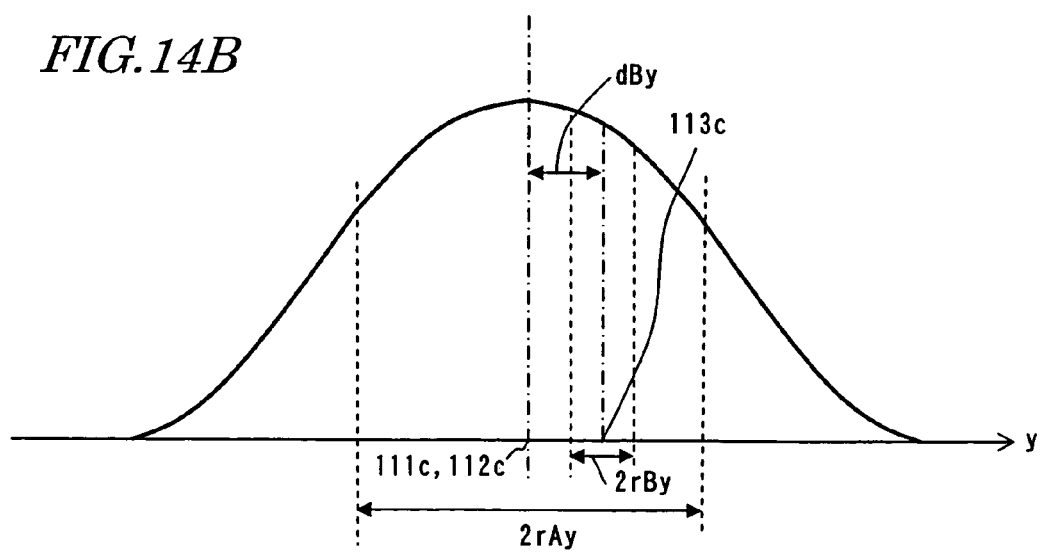
FIG. 14B shows the intensity distribution of the far-field pattern of FIG. 14A in the y direction.

Also, in a real refractive index guided semiconductor laser, the angle of radiation normally changes with the optical power in the x direction but does not change in the y direction. That is why the center of the photosensitive area of the detector 5 may be offset in the y direction as long as the conditions described above are satisfied. As shown in FIGS. 14A and 14B, the distance dBy from the center 111C of the far-field pattern 111 of the light radiated from the light source to the center 113C of the photosensitive area 113, representing the offset of the center of the photosensitive area 113 with respect to the center 111C of the light intensity distribution of the far-field pattern 111 in the y direction, may have any arbitrary value as long as the photosensitive area 113 is located within the far-field pattern 111. Therefore, the center of the photosensitive area may be offset in the y direction either for the purpose of adjusting the intensity of the light entering the photosensitive area or due to some design consideration of respective members of the optical system.

However, if the optical system is designed such that the detector 5 detects a portion of the light is going to enter the condenser lens 7 as shown in FIGS. 1A and 1B, then the photosensitive area 113 may not be located outside of the aperture area 112 in the y direction. That is to say, supposing the width of the photosensitive area 113 in the y direction is identified by 2 rAy, dBy<rAy needs to be satisfied.

As also described above, the center of the aperture area 112 does not have to agree with the center 111C of the far-field pattern 111 in the y direction, either. Instead, the center of the aperture area 112 may have an offset, which should be smaller than the offset of the center of the photosensitive area 113 in the y direction, with respect to the center 111C of the far-field pattern 111. That is to say, supposing the distance from the center of the aperture area of the condenser lens to that of the light intensity distribution of the far-field pattern in the y direction is identified by dAy, dBy>dAy needs to be satisfied.

Figure 15A:
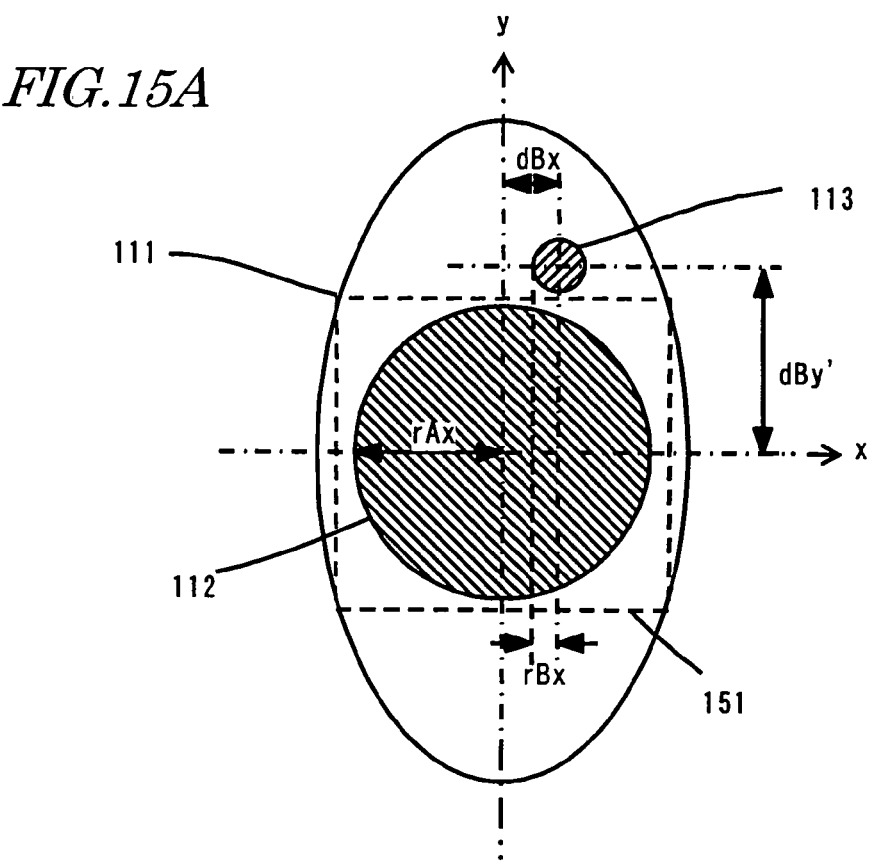
FIG. 15A shows a far-field pattern as viewed on a plane perpendicular to the optical axis of the light source of the first preferred embodiment.
Figure 15B:
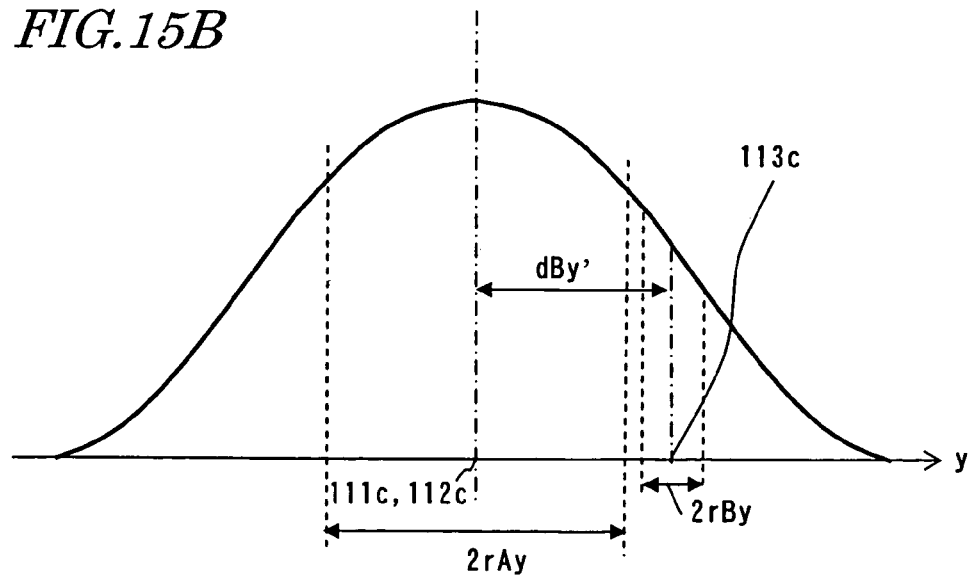
FIG. 15B shows the intensity distribution of the far-field pattern of FIG. 15A in the y direction.

Furthermore, in the preferred embodiment described above, the optical system is designed such that the detector 5 detects a portion of the light is going to enter the condenser lens 7. However, the detector may also be arranged outside of the optical path of the light that is going to enter the condenser lens 7. For example, a detector 5' may be arranged on the collimator lens 3 outside of the optical path of the light 2 that is going to enter the condenser lens 7 as shown in FIG. 1B. In that case, in a far-field pattern on a plane perpendicular to the optical axis of the light that has been radiated from the light source, the photosensitive area 113 of the detector 5' is located outside of the area 151 of the reflective mirror 4 as shown in FIG. 15A. FIG. 15B shows the light intensity distribution of the far-field pattern in the y direction. As shown in FIGS. 15A and 15B, the distance dBy' from the center 113C of such a photosensitive area 113 to the center 111C of the far-field pattern 111 satisfies dBy'>rAy, supposing that the width of the aperture area 112 of the condenser lens in the y direction is identified by 2 rAy. By adopting an optical system with such a structure, the light emitted from the light source can be guided to the condenser lens 7 without sacrificing the intensity of light for the purpose of monitoring the optical power.

As has been described in detail, according to the present invention, the center of the photosensitive area of a detector 5 offsets with respect to that of the far-field pattern of the light that has been radiated from a light source in the direction in which the light has the narrower angle of radiation. Accordingly, even if the angle of radiation of the light emitted from the light source changes with the optical power, the variation in the Pm/Po ratio (i.e., the ratio of the intensity Pm of the light entering the detector to the intensity Po of the light entering the storage medium by way of a condensing element) with the optical power can be reduced. Particularly, by setting the magnitude of the offset within the range defined above, the variation in Pm/Po ratio with the optical power can be minimized with various constraints on the drive satisfied. To achieve these effects, just the detector needs to be arranged within a predetermined range and there is no need to provide any additional component for the conventional drive. Therefore, even if the optical power varies in a broad range, the output of the light source can be controlled highly precisely using a simple configuration. Consequently, an optical information processor that can read or write information from a high-density storage medium at high speeds is realized.

Embodiment 2

Figure 16A:
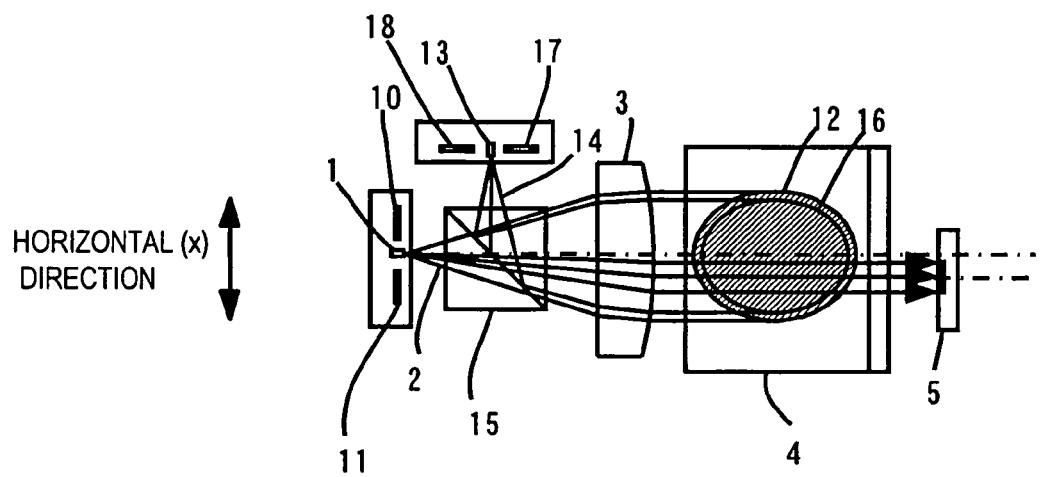
FIG. 16A illustrates a horizontal arrangement of main components in an optical information processor according to a second preferred embodiment of the present invention.
Figure 16B:
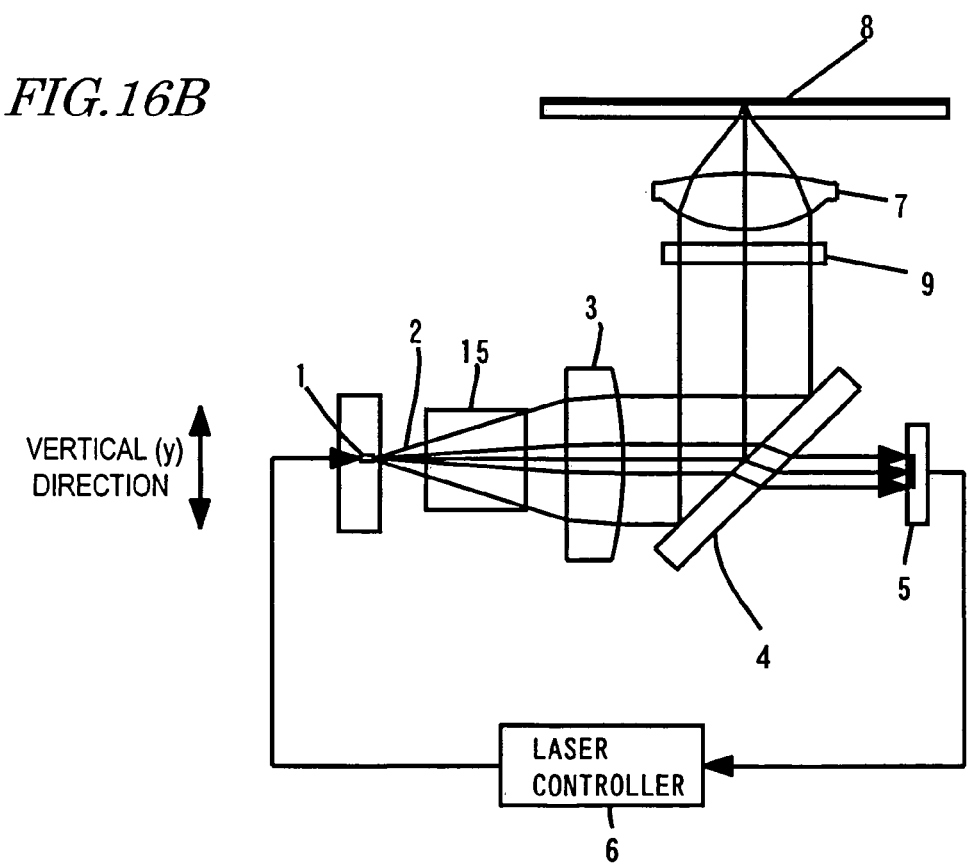
FIG. 16B illustrates a vertical arrangement of the main components in the optical information processor of the second preferred embodiment.

FIGS. 16A and 16B are respectively a top view and a side view illustrating the arrangement of an optical system for an optical disk drive according to a second preferred embodiment of the present invention. The top view illustrated in FIG. 16A shows the optical system as viewed from over the storage medium.

As in the first preferred embodiment described above, the optical information processor of this second preferred embodiment is also implemented as an optical disk drive. But the optical disk drive of this preferred embodiment includes two semiconductor lasers 1 and 13 that radiate laser beams with mutually different wavelengths. The two semiconductor lasers 1 and 13 are not usually driven simultaneously but one of them is selectively driven according to the type of the given storage medium. If the optical information processor is implemented as an optical disk drive, the semiconductor lasers 1 and 13 may be two of semiconductor lasers for emitting beams with wavelengths of 780 nm, 650 nm and 400 nm for CDs, DVDs, and BDs.

The light 2 emitted from the semiconductor laser 1 as a first light source is transmitted through a beam splitter 15 and transformed by the collimator lens 3 into a parallel beam, only a part of which is transmitted through the reflective mirror 4 and incident onto the optical power monitoring detector 5. The output of the detector 5 is supplied to the laser controller 6, which controls the output of the semiconductor laser 1 based on the output of the detector 5. On the other hand, another part of the light 2 is reflected by the reflective mirror 4, transmitted through the condenser lens 7 and then converged toward the storage medium 8. The light that has been reflected from the data storage layer of the storage medium 8 follows the same path in the opposite direction, and is diffracted by the detecting diffraction element 9, transmitted through the collimator lens 3, and then incident onto the signal detectors 10 and 11, which are arranged near the semiconductor laser 1. The signals generated responsive to the light that has entered the detectors 10 and 11 are then input to the control system 514 and data processing system 512 as already described for the first preferred embodiment.

Meanwhile, the light 14 emitted from the semiconductor laser 13 as a second light source is reflected by the beam splitter 15 and transformed by the collimator lens 3 into a parallel beam, only a part of which is transmitted through the reflective mirror 4 and incident onto the optical power monitoring detector 5. The output of the detector 5 is supplied to the laser controller 6, which controls the output of the semiconductor laser 13 based on the output of the detector 5. On the other hand, another part of the light 14 is reflected by the reflective mirror 4, transmitted through the condenser lens 7 and then converged toward the storage medium 8. The light that has been reflected from the data storage layer of the storage medium 8 follows the same path in the opposite direction, and is diffracted by the detecting diffraction element 9, transmitted through the collimator lens 3, and then incident onto signal detectors 17 and 18, which are arranged near the semiconductor laser 13. The signals generated responsive to the light that has entered the detectors 17 and 18 are then input to the control system 514 and data processing system 512. As shown in FIGS. 16A and 16B, the laser beams 2 and 14 emitted from the semiconductor lasers 1 and 13 have their optical axes aligned with each other.

Figure 17A:
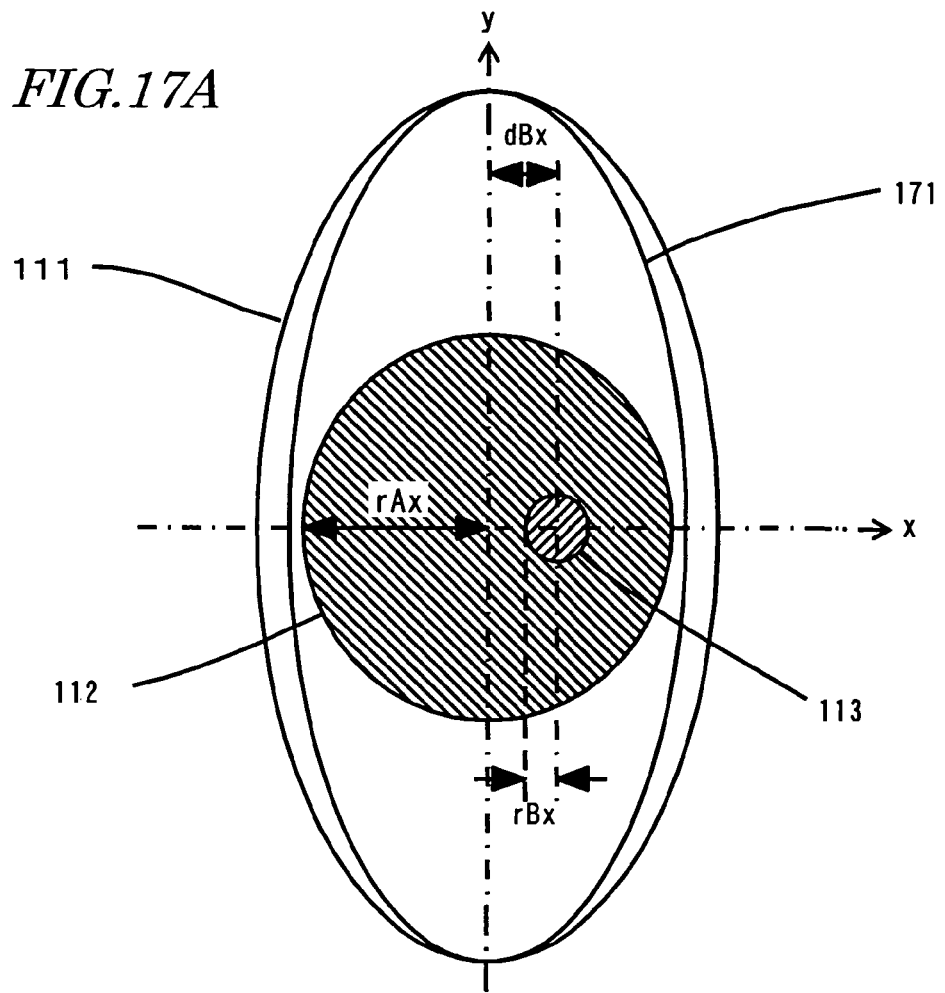
FIG. 17A shows a far-field pattern as viewed on a plane perpendicular to the optical axis of the light source of the second preferred embodiment.
Figure 17B:
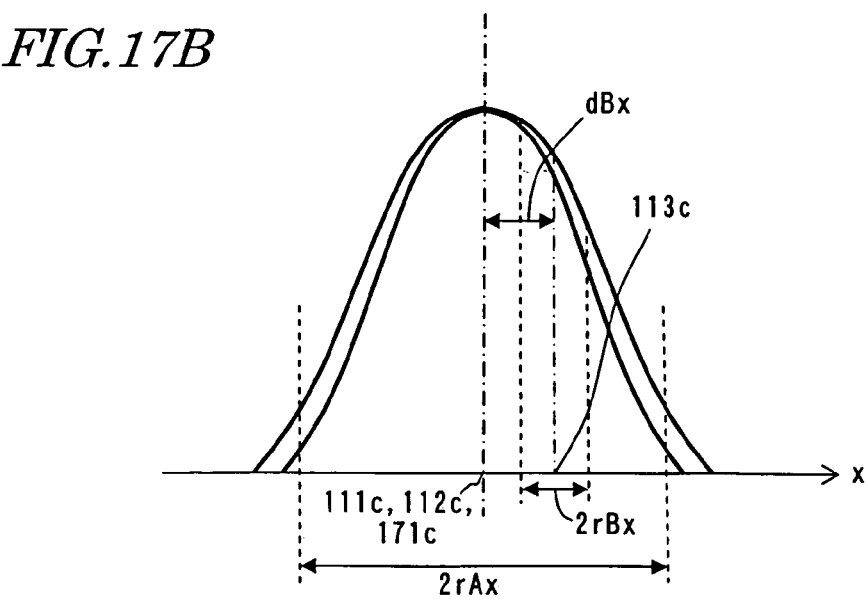
FIG. 17B shows the intensity distribution of the far-field pattern of FIG. 17A in the x direction.

FIG. 17A shows the respective far-field patterns 111 and 117 of the laser beams 2 and 14 emitted from the semiconductor lasers 1 and 13. The far-field patterns 111 and 117 are viewed on a plane perpendicular to the optical axes of those beams 2 and 14. FIG. 17B shows the light intensity distributions of those beams 2 and 14 in the x direction. In this preferred embodiment, since the optical axes of the laser beams 2 and 14 are aligned with each other, the laser beams 2 and 14 share the same aperture area 112 of the condenser lens 7. Also, the laser beams 2 and 14 emitted from the semiconductor lasers 1 and 13 both have the narrowest angle of radiation in the x direction. As already described for the first preferred embodiment, the photosensitive area 113 of the detector 5 is smaller than the aperture area 112. The center 112C of the aperture area 112 substantially agrees with the respective centers 111C and 1117C of the far-field patterns 111 and 117. Meanwhile, the center 113C of the photosensitive area 113 of the detector 5 is offset with respect to the respective centers 111C and 117C of the far-field patterns 111 and 117 in the horizontal (x) direction.

Supposing the aperture area 112 has a width of 2 rAx in the x direction, the photosensitive area 113 has a width of 2 rBx in the x direction, and the distance from the center of the photosensitive area 113 to the center 111C of the far-field pattern 111 in the x direction is dBx, rAx and rBx satisfy the inequality rAx>rBx as in the first preferred embodiment described above. Also, dBx and rA satisfy $0.25<dBx/rA<0.55$.

Also, supposing the optical powers of the semiconductor lasers 1 and 13 are identified by Po1 and Po2 and the intensities of the laser beams that have been emitted from these lasers and then have entered the detector 5 are identified by Pm1 and Pm2, respectively, the variations in Pm1/Po1 and Pm2/Po2 ratios can be minimized as in the first preferred embodiment even if the angle of radiation varies with the optical power.

Furthermore, the center of the photosensitive area of the detector 5 may be offset arbitrarily in the y direction. Thus, the variations in Pm1/Po1 and Pm2/Po2 ratios can be reduced by offsetting the center of the photosensitive area in the x direction as described above and the intensity of the light entering the detector can be adjusted by offsetting the center of the photosensitive area in the y direction. Optionally, the photosensitive area may also be arranged outside of the area of the reflective mirror as described above.

Figure 18:
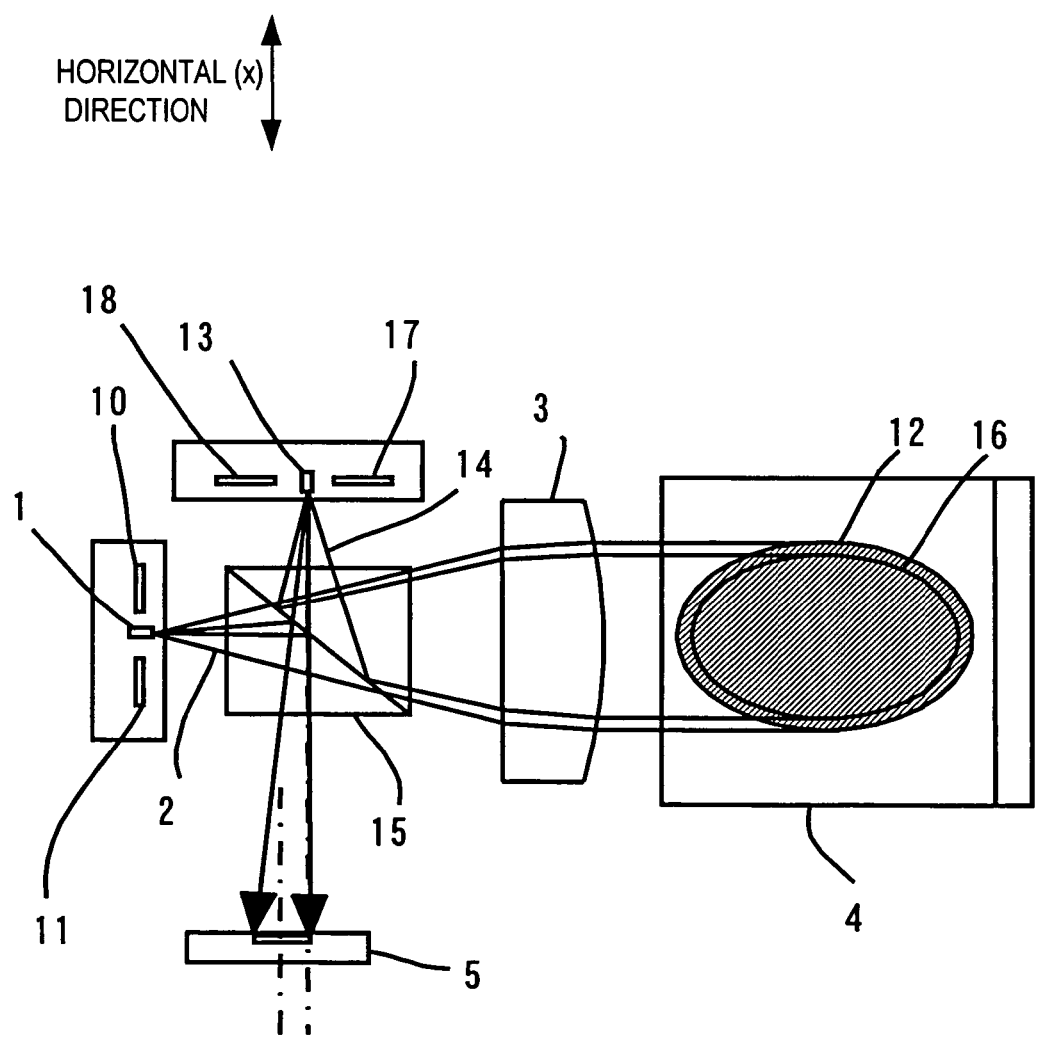
FIG. 18 illustrates a horizontal arrangement of main components in an optical information processor according to a modified example of the second preferred embodiment.

In the preferred embodiment described above, the detector is arranged to detect the light that has been transmitted through the reflective mirror 4. However, the detector may be arranged at a different position. For example, the beam splitter 15 may transmit the majority of (e.g., 95% of) the outgoing light of the semiconductor laser 1 and guide it to the collimator lens 3 and may reflect the rest (e.g., about 5%) and guide it to the detector 5 as shown in FIG. 18. In that case, the optical system may be designed such that the beam splitter 15 reflects the majority of the outgoing light of the semiconductor laser 13 and guide it to the collimator lens 3 and transmits the rest and guide it to the detector 5.

Embodiment 3

Figure 19A:
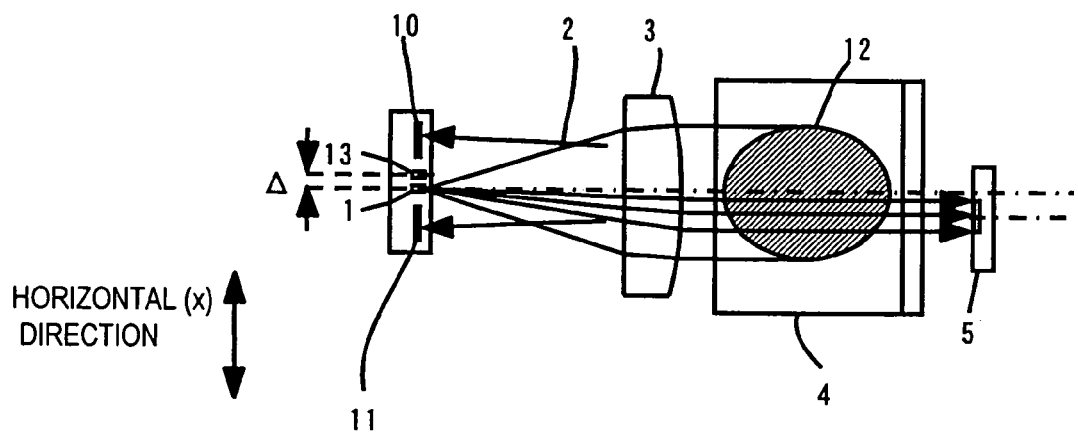
FIG. 19A illustrates a horizontal arrangement of main components in an optical information processor according to the second preferred embodiment.
Figure 19B:
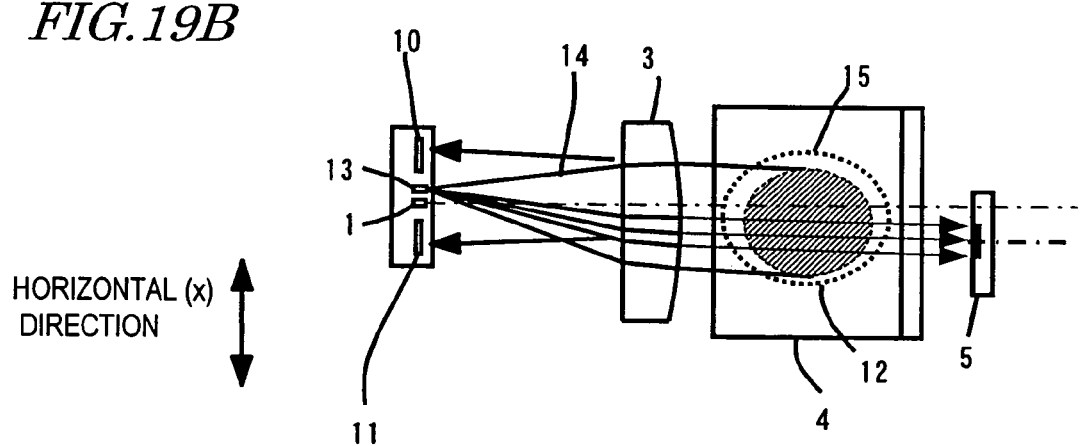
FIG. 19B illustrates another horizontal arrangement of main components in the optical information processor of the second preferred embodiment.
Figure 19C:
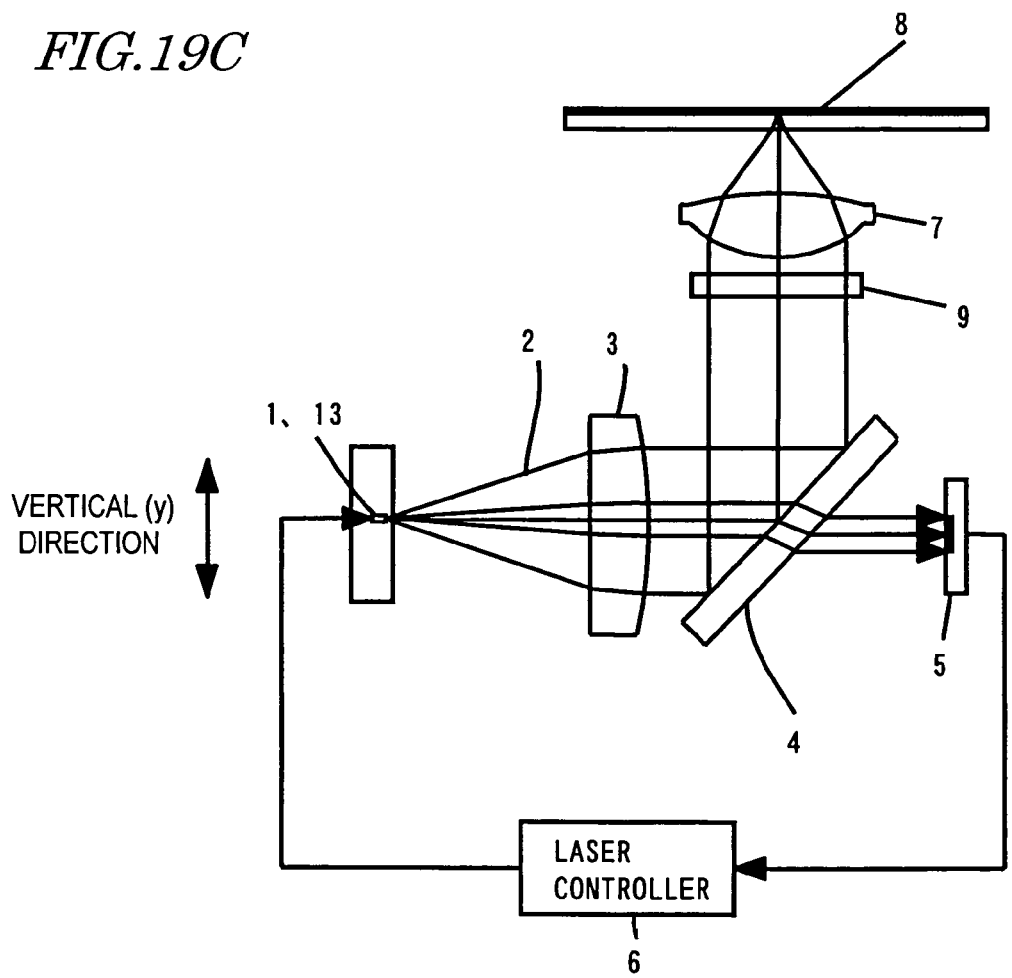
FIG. 19C illustrates a vertical arrangement of the main components in the optical information processor of the second preferred embodiment.

FIGS. 19A and 19B are top views illustrating the arrangement of an optical system for an optical disk drive according to a third preferred embodiment of the present invention. These top views show the optical system as viewed from over the storage medium. FIG. 19C is a side view illustrating the arrangement of the optical system in the optical disk drive of the third preferred embodiment.

As in the second preferred embodiment described above, the optical information processor of this preferred embodiment is also implemented as an optical disk drive including two semiconductor lasers 1 and 13 that radiate laser beams with mutually different wavelengths. However, the semiconductor lasers 1 and 13 of this preferred embodiment are arranged differently from the counterparts of the second preferred embodiment. Specifically, the semiconductor lasers 1 and 13 of this preferred embodiment are arranged adjacent to each other.

As shown in FIGS. 19A and 19C, the light 2 emitted from the semiconductor laser 1 as a first light source is transformed by the collimator lens 3 into a parallel beam, only a part of which is transmitted through the reflective mirror 4 and incident onto the optical power monitoring detector 5. The output of the detector 5 is supplied to the laser controller 6 as shown in FIG. 19C, which controls the output of the semiconductor laser 1 based on the output of the detector 5. On the other hand, another part of the light 2 is reflected by the reflective mirror 4, transmitted through the condenser lens 7 and then converged toward the storage medium 8. The light that has been reflected from the data storage layer of the storage medium 8 follows the same path in the opposite direction, and is diffracted by the detecting diffraction element 9, transmitted through the collimator lens 3, and then incident onto the signal detectors 10 and 11, which are arranged near the semiconductor laser 1. The signals generated responsive to the light that has entered the detectors 10 and 11 are then input to the control system 514 and data processing system 512.

As shown in FIGS. 19B and 19C, the light 14 emitted from the semiconductor laser 13 as a second light source is transformed by the collimator lens 3 into a parallel beam, only a part of which is transmitted through the reflective mirror 4 and incident onto the optical power monitoring detector 5. The output of the detector 5 is supplied to the laser controller 6 as shown in FIG. 19C, which controls the output of the semiconductor laser 13 based on the output of the detector 5. On the other hand, another part of the light 14 is reflected by the reflective mirror 4, transmitted through the condenser lens 7 and then converged toward the storage medium 8. The light that has been reflected from the data storage layer of the storage medium 8 follows the same path in the opposite direction, and is diffracted by the detecting diffraction element 9, transmitted through the collimator lens 3, and then incident onto signal detectors 10 and 11, which are arranged near the semiconductor laser 13. The signals generated responsive to the light that has entered the detectors 10 and 11 are then input to the control system 514 and data processing system 512.

The semiconductor lasers 1 and 13 are arranged in the same package so as to be have a gap $\Delta$ between them in the x direction. Also, the semiconductor laser 1 is arranged such that its emission point is located approximately on the optical axis of the optical system. Meanwhile, the semiconductor laser 13 is arranged such that its emission point is offset with respect to the optical axis of the optical system in the x direction. Consequently, the center of the far-field pattern of the light that has been emitted from the semiconductor laser 1 and then incident on the condenser lens 7 substantially agrees with the optical axis of the optical system in the x direction. On the other hand, the center of the far-field pattern of the light that has been emitted from the semiconductor laser 13 and then incident on the condenser lens 7 has an offset with respect to the optical axis of the optical system in the x direction.

Figure 20A:
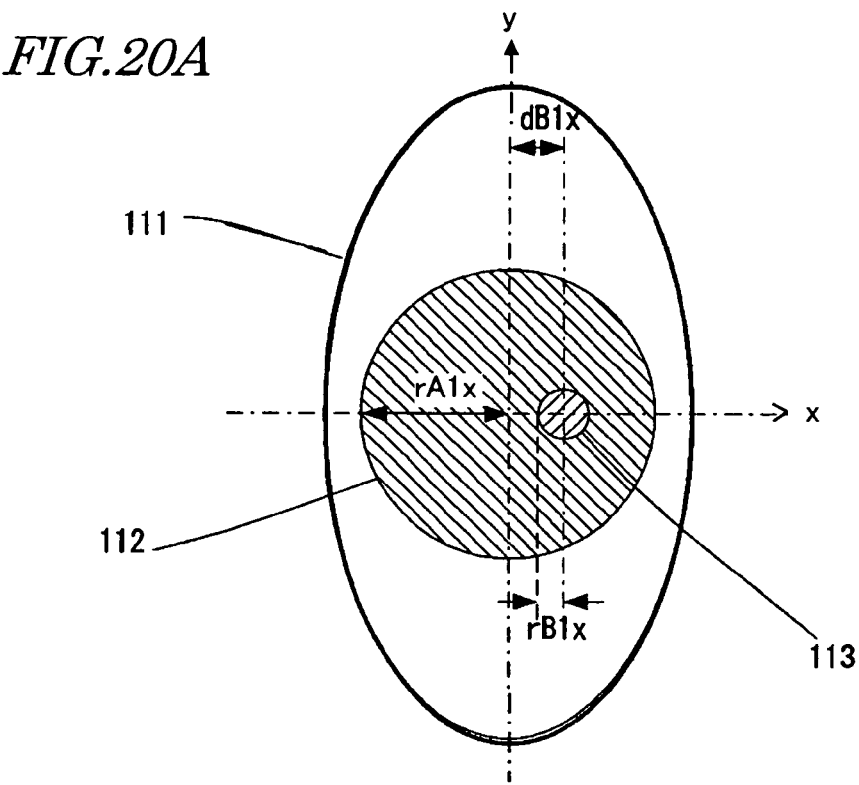
FIG. 20A shows a far-field pattern as viewed on a plane perpendicular to the optical axis of a first light source of the second preferred embodiment.
Figure 20B:
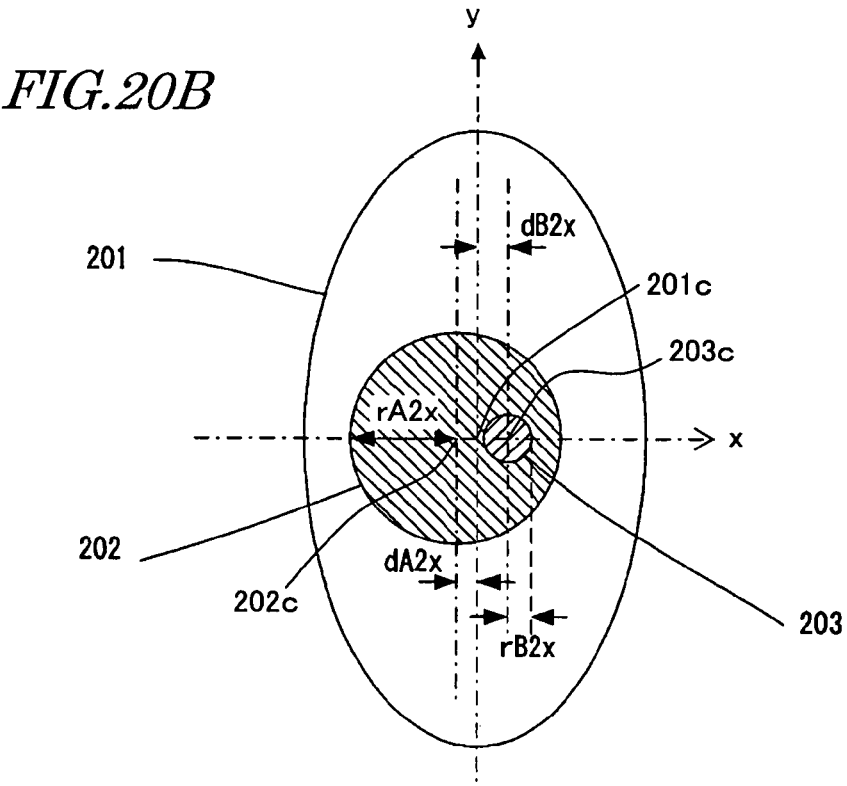
FIG. 20B shows a far-field pattern as viewed on a plane perpendicular to the optical axis of a second light source of the second preferred embodiment.
Figure 20C:
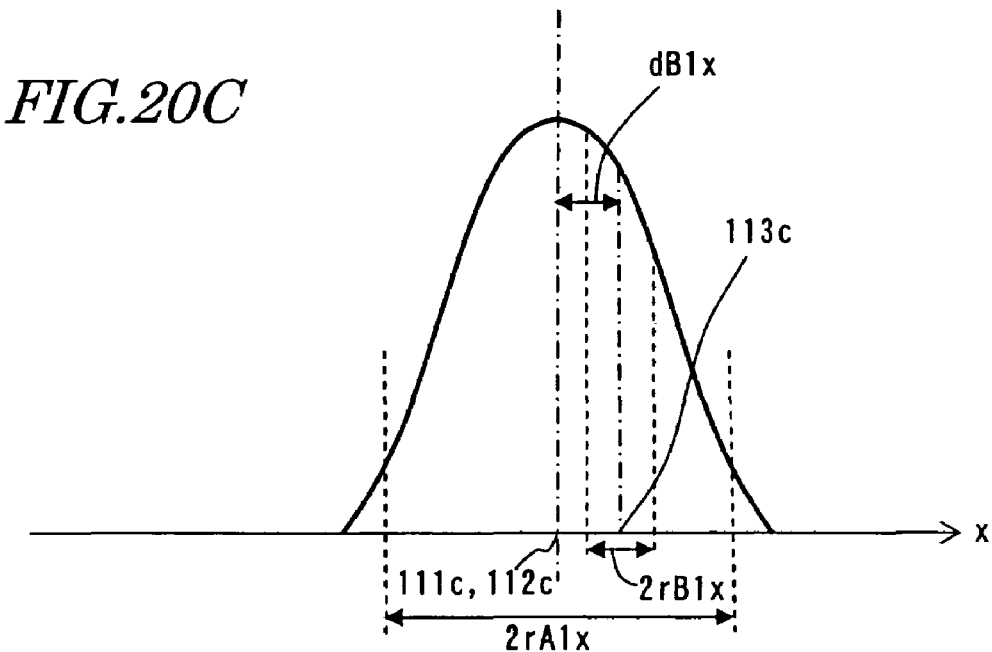
FIG. 20C shows the intensity distribution of the far-field pattern of FIG. 20A in the x direction.
Figure 20D:
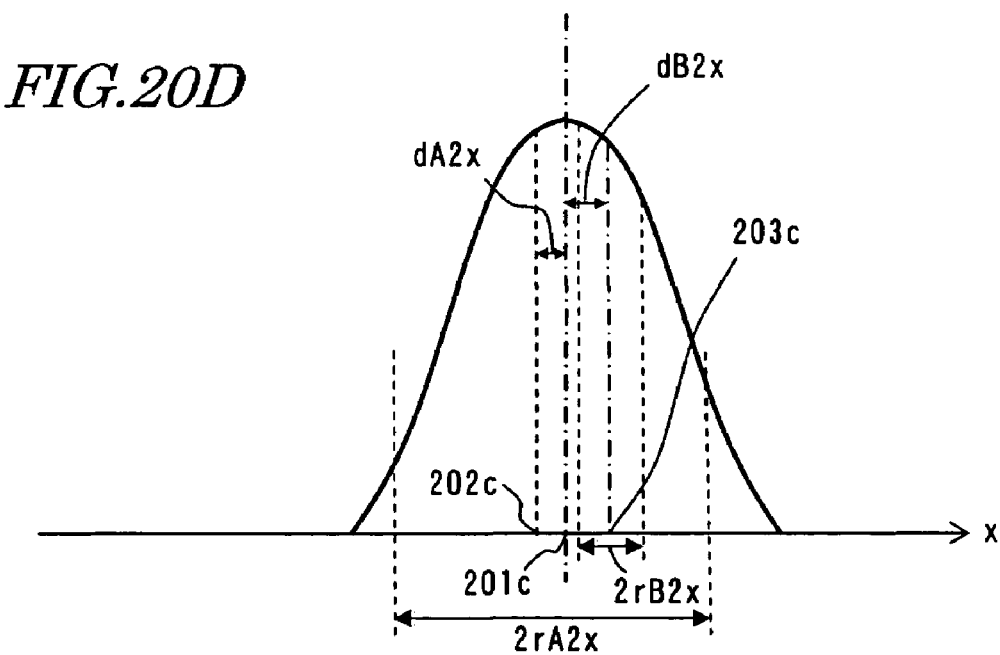
FIG. 20D shows the intensity distribution of the far-field pattern of FIG. 20B in the x direction.

FIGS. 20A and 20B show the far-field patterns of the laser beams 2 and 14 that have been emitted from the semiconductor lasers 1 and 13, respectively, and then incident on a plane perpendicular to their respective optical axes. FIGS. 20C and 20D show the light intensity distributions of the laser beams 2 and 14 emitted from the semiconductor lasers 1 and 13, respectively.

As described above, the optical axis of the laser beam 2 emitted from the semiconductor laser 1 is substantially aligned with that of the optical system. That is why the center 111C of the far-field pattern 111 agrees with the center 112C of the aperture area 112 of the condenser lens 7 in the x direction. On the other hand, the optical axis of the laser beam 14 emitted from the semiconductor laser 13 is offset with respect to that of the optical system. Therefore, the center 201C of the far-field pattern 201 of the laser beam 14 emitted from the semiconductor laser 13 is offset with respect to the center 202C of the aperture area 202 of the condenser lens 7 in the x direction.

The gap $\Delta$ between the semiconductor lasers 1 and 13 is supposed to be 0.11 mm. The semiconductor lasers 1 and 13 are supposed to have an angle of radiation $\theta x$ (Lo) of 8 degrees in the x (horizontal) direction in its low output mode and an angle of radiation $\theta x$ (Hi) of 10 degrees in the x (horizontal) direction in its high output mode. Meanwhile, the angle of radiation $\theta y$ thereof in the y (vertical) direction is supposed to be constant at 17 degrees without depending on the output. The collimator lens 3 is supposed to have a focal length fc of 20 mm. The condenser lens 7 is supposed to have a circular aperture. The aperture area 112 defined by the laser beam 2 emitted from the semiconductor laser 1 is supposed to have a radius rA1 of 2 mm, while the aperture area 202 defined by the laser beam 14 emitted from the semiconductor laser 13 is supposed to have a radius rA2 of 1.5 mm. The detector 5 is supposed to have a circular photosensitive area. The photosensitive areas 113 and 203 defined by the laser beams 2 and 14 emitted from the semiconductor lasers 1 and 13, respectively, are supposed to have a radius rA1 of 0.35 mm.

Suppose the intensity of the light emitted from the semiconductor laser 1, transmitted through the condenser lens 7 and then incident on the storage medium 8 is identified by Po1; the intensity of the light emitted from the semiconductor laser 1 and then incident on the optical power monitoring detector 5 is identified by Pm1; the intensity of the light emitted from the semiconductor laser 13, transmitted through the condenser lens 7 and then incident on the storage medium 8 is identified by Po2; and the intensity of the light emitted from the semiconductor laser 13 and then incident on the optical power monitoring detector 5 is identified by Pm2. Then, to minimize the variation in Pm1/Po1 ratio with Δθx (i.e., the variation in θx with the optical power), the distance dBx1 from the center 111C of the far-field pattern 111 of the light emitted from the semiconductor laser 1 to the center 113C of the photosensitive area 113 in the x direction is preferably 0.87.

In this case, the semiconductor laser 13 is arranged such that its emission point and the center 203C of the photosensitive area 203 are located on the opposite sides of the optical axis of the optical system in the x direction as shown in FIGS. 19A and 19B. According to such an arrangement, the center 201C of the far-field pattern 201 defined by the light emitted from the semiconductor laser 13 will be located between the center 202C of the aperture area 202 of the condenser lens 7 and the center 203C of the photosensitive area 203 since the emission point of the semiconductor laser 13 is offset with respect to the optical axis of the optical system. That is to say, if the distance from the center 201C of the far-field pattern 201 defined by the semiconductor laser 13 to the center 203C of the photosensitive area 203 is identified by dB2x, then dB1x and dB2x preferably satisfy the inequality dB1x>dB2x.

Figure 21A:
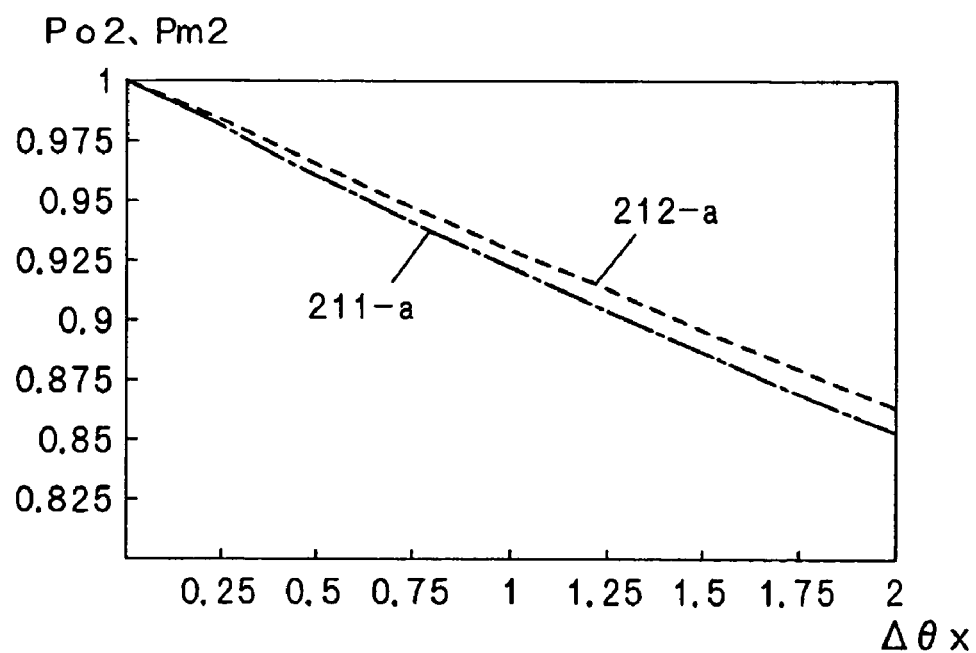
FIG. 21A shows how Po2 and Pm2 change depending on Δθx in a third preferred embodiment of the present invention if dB1x=0.87.
Figure 21B:
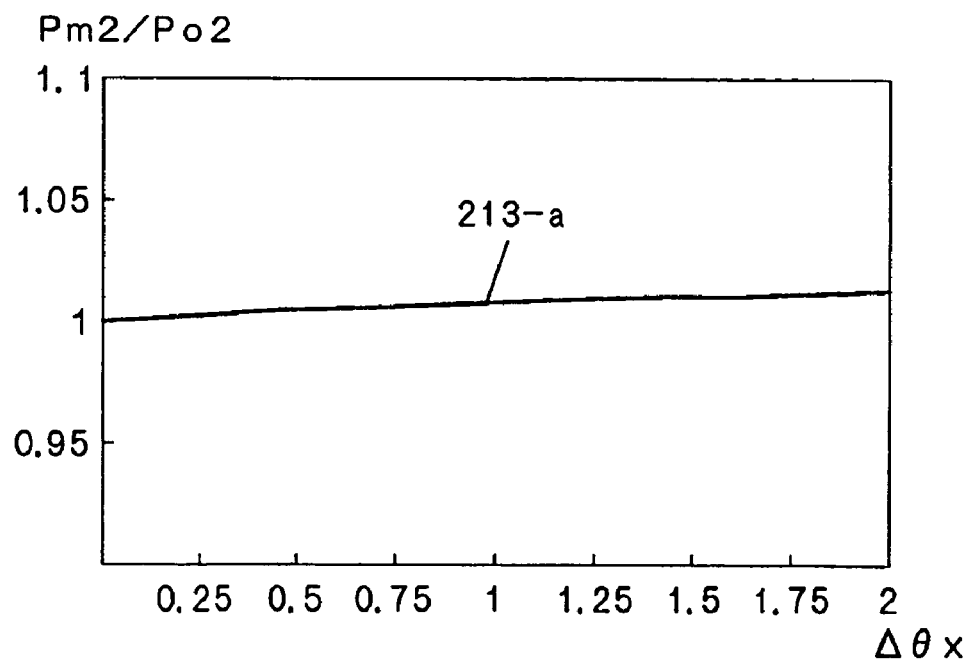
FIG. 21B shows how Pm2/Po2 changes depending on Δθx in the third preferred embodiment if dB1x=0.87.

In this case, the dependences of Po and Pm on Δθx are represented by the curves 211-*a* and 212-*a*, respectively, as shown in FIG. 21A. As is clear from FIG. 21A, there is little difference between the respective dependences of Po and Pm on Δθx. Accordingly, even when Δθx changes from 0 degrees into 2 degrees, the variation in Pm/Po ratio is only about 1%, which should be a good Pm/Po characteristic, as shown in FIG. 21B.

Figure 21C:
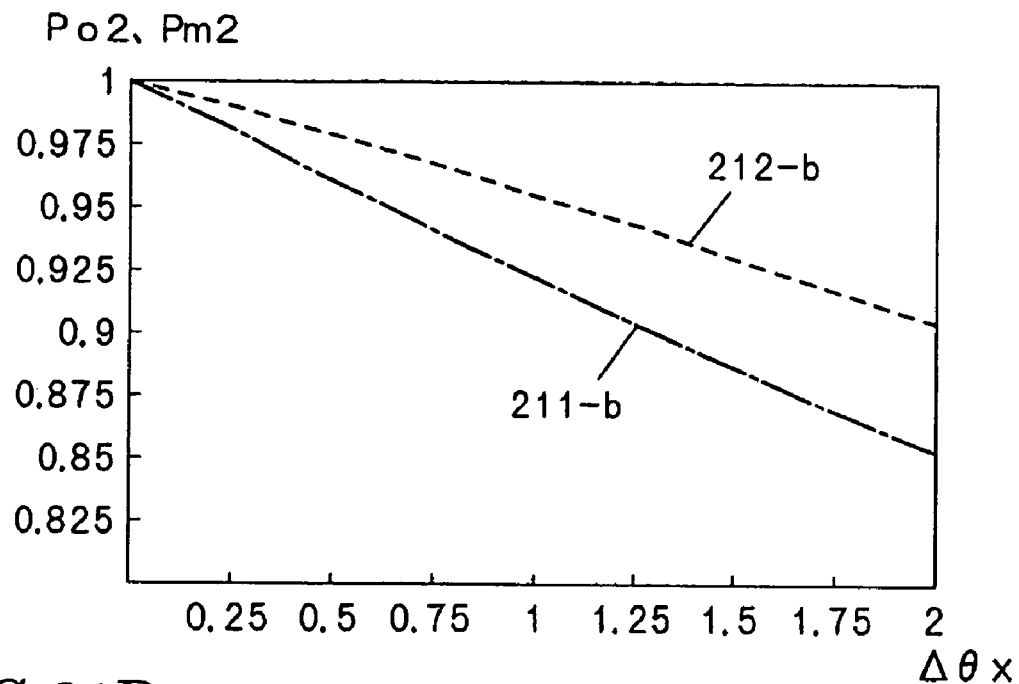
FIG. 21C shows how Po2 and Pm2 change depending on Δθx in the third preferred embodiment if dB1x=−0.87.
Figure 21D:
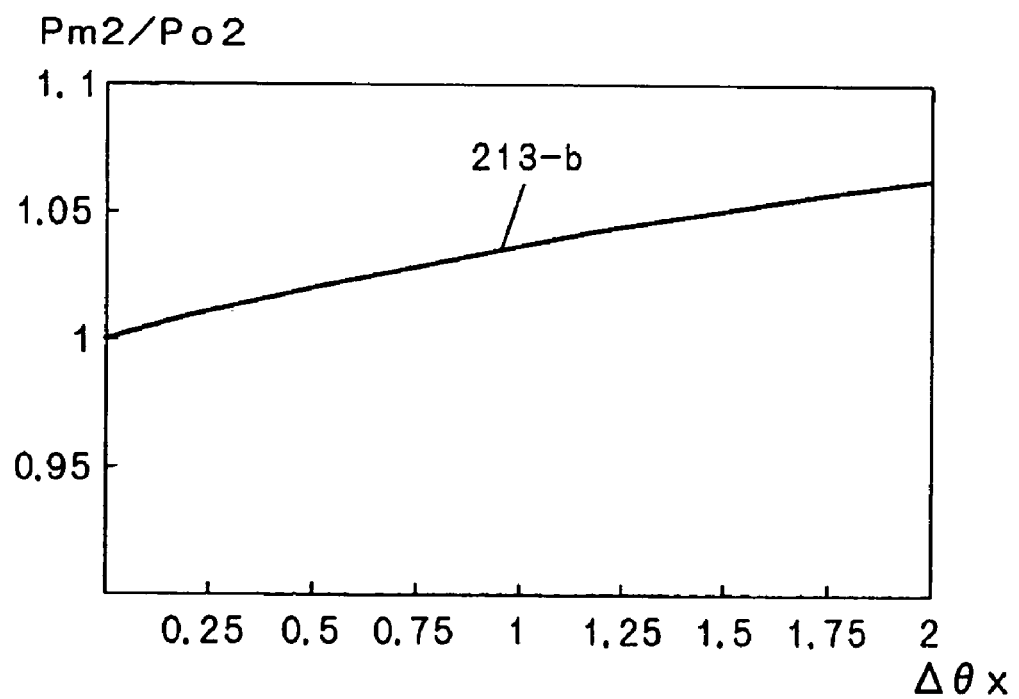
FIG. 21D shows how Pm2/Po2 changes depending on Δθx in the third preferred embodiment if dB1x=−0.87.
Figure 22A:
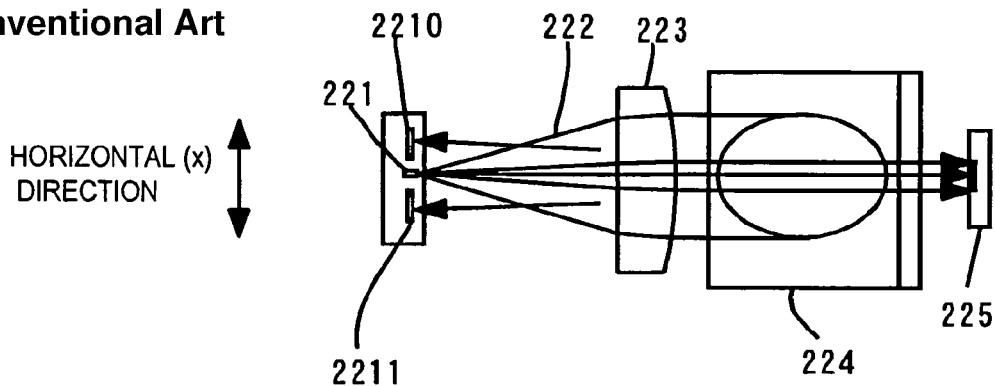
FIG. 22A illustrates a horizontal arrangement of main components in a conventional optical information processor.
Figure 22B:
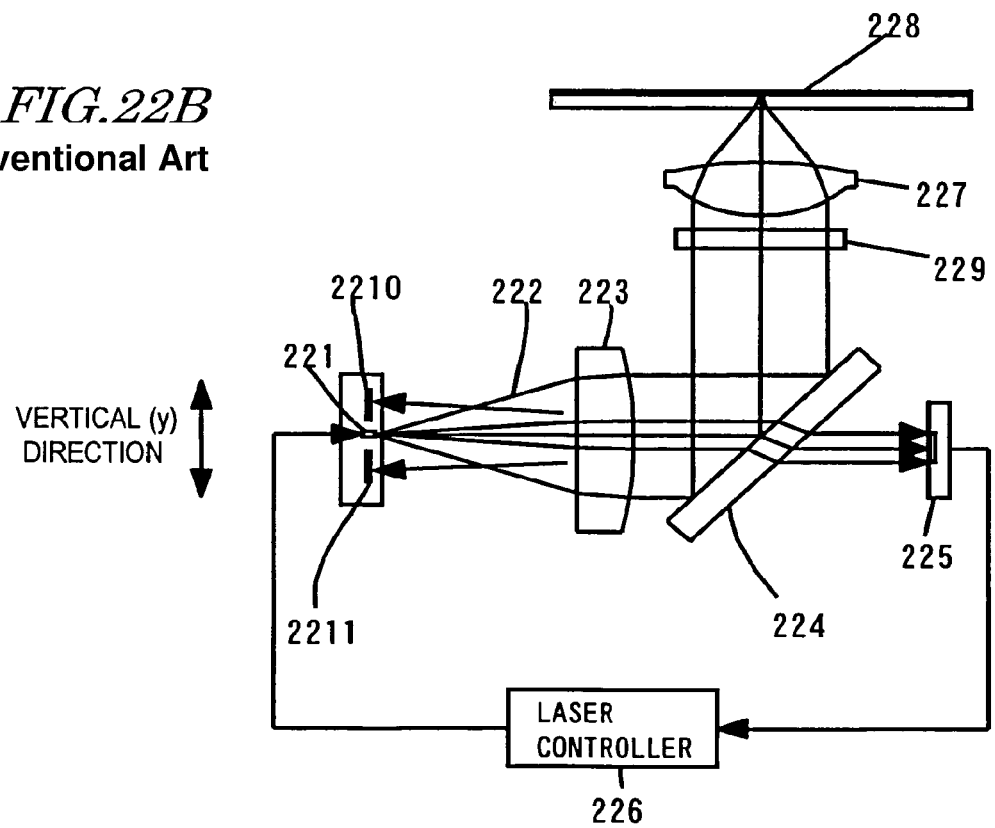
FIG. 22B illustrates a vertical arrangement of the main components in the conventional optical information processor.
Figure 23:
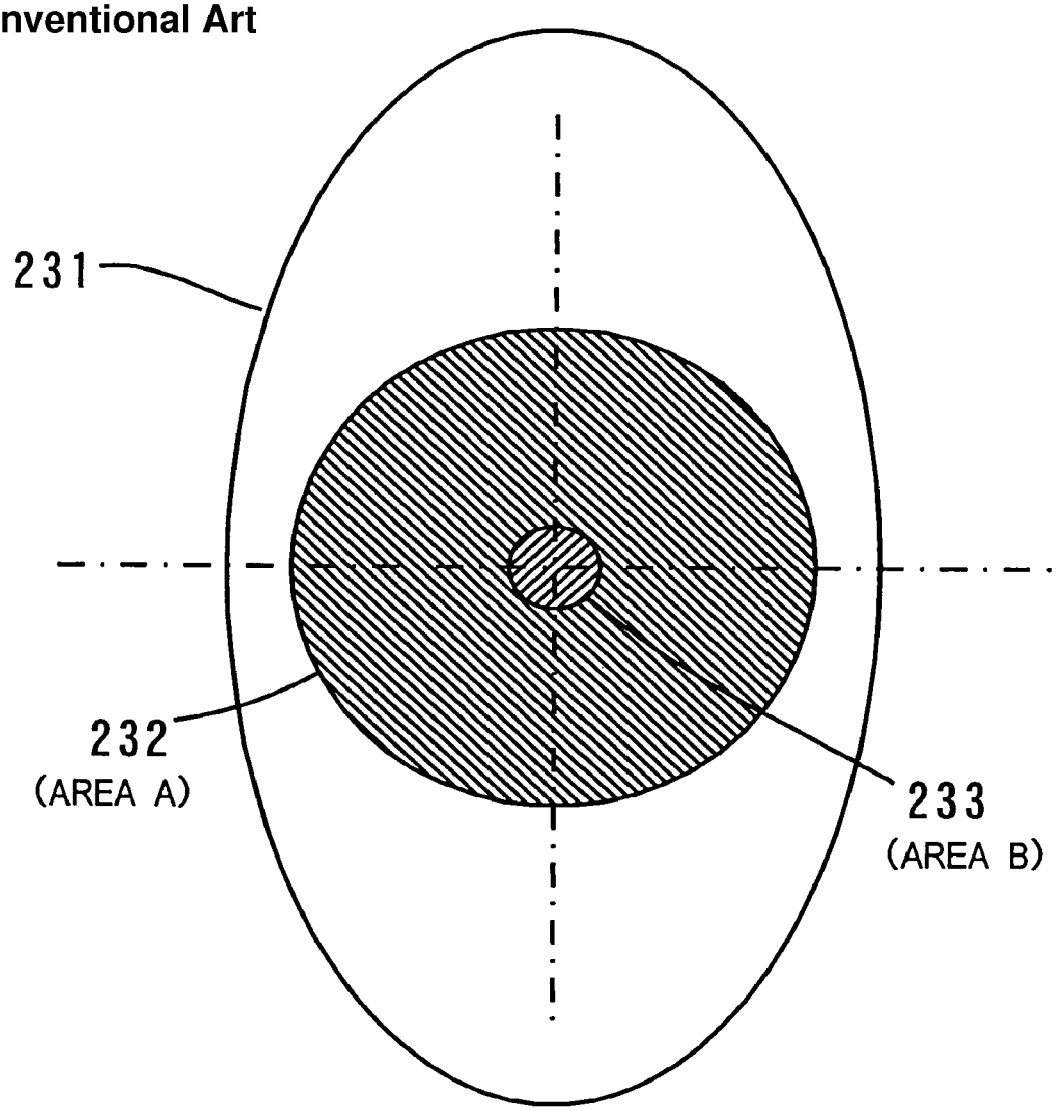
FIG. 23 shows a far-field pattern as viewed on a plane perpendicular to the optical axis of the light source of the conventional optical information processor.
Figure 24:
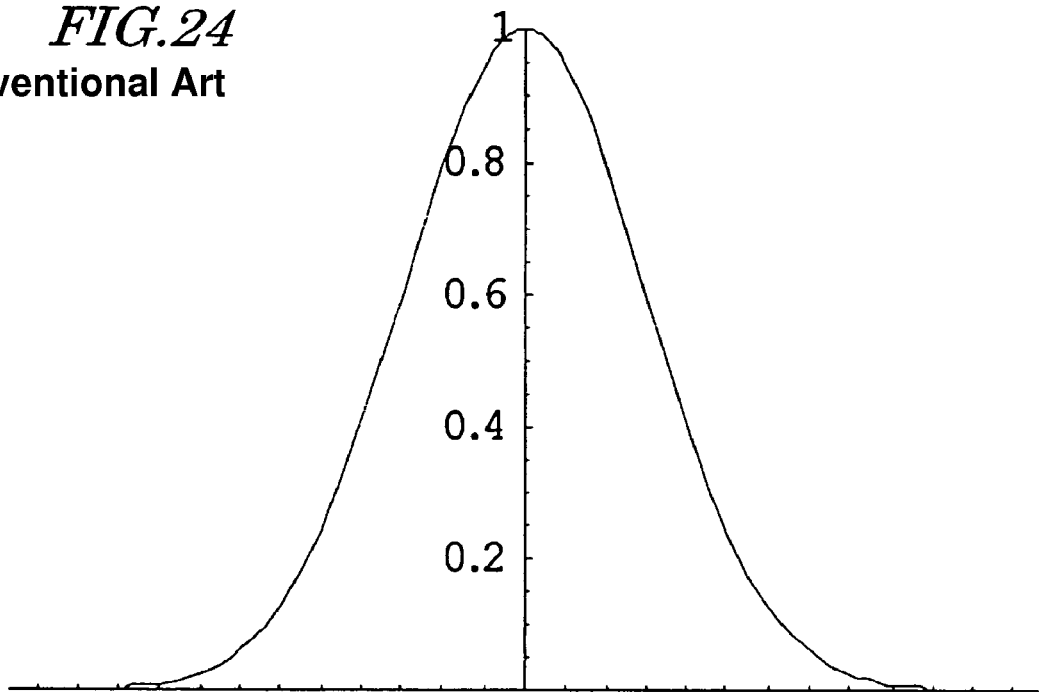
FIG. 24 shows the light intensity distribution of the far-field pattern of a light source.
Figure 25:
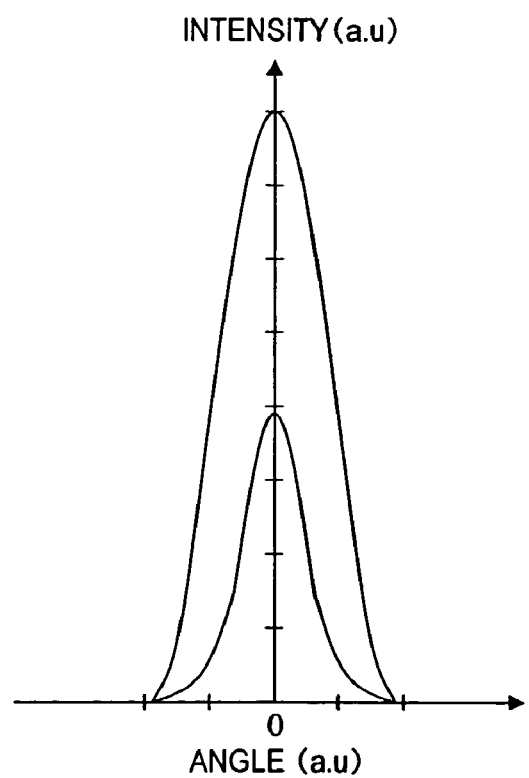
FIG. 25 shows the light intensity distribution of the far-field pattern of another light source.
Figure 26:
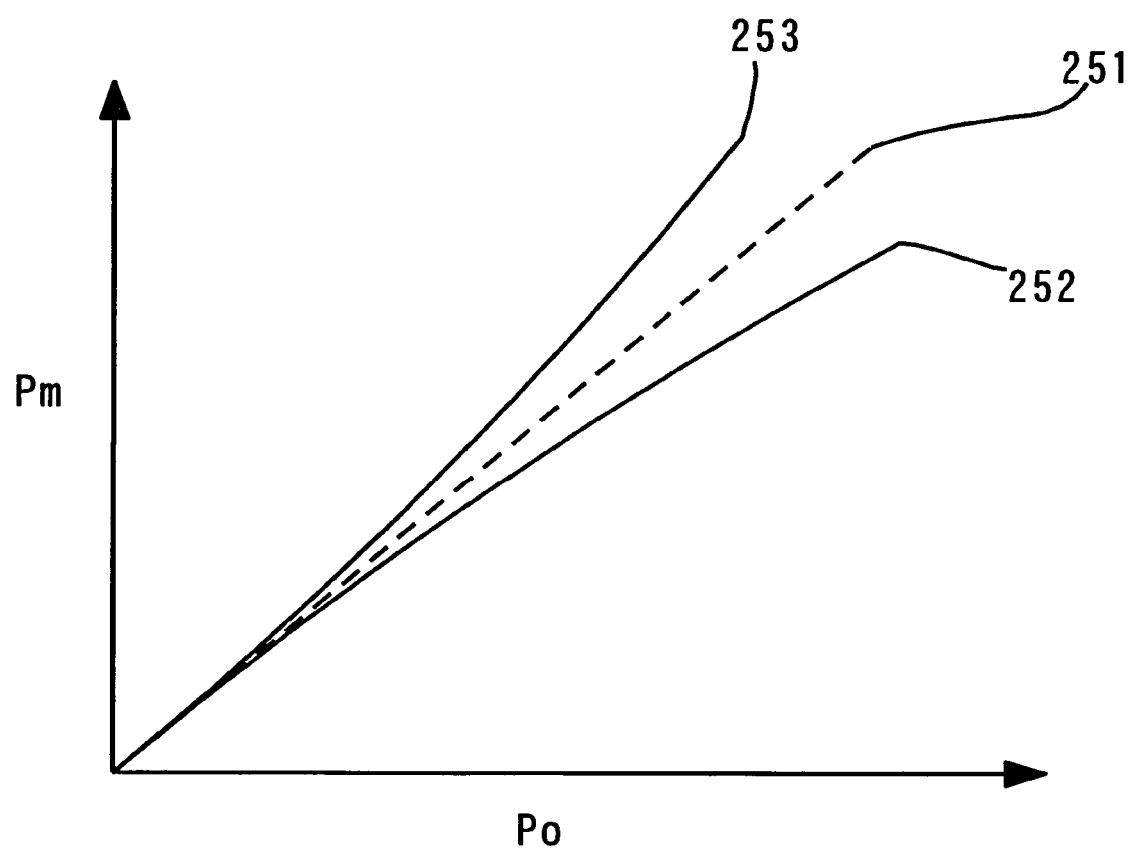
FIG. 26 shows how Pm/Po changes in a conventional optical information processor.

On the other hand, if the detector 5 is arranged such that its photosensitive area 113 and the emission point of the semiconductor laser 13 are located on the same side of the optical axis of the optical system (i.e., if dB1x=−0.87 mm), then the variation in Pm1/Po1 ratio with Δθx can also be reduced as well as the situation where dB1x=0.87 mm. In that case, however, the difference in Δθx dependence between Po2 and Pm2 increases as represented by the curves 211-*b* and 212-*b* in FIG. 21C. As a result, the variation in Pm2/Po2 ratio is greater than in the situation where dBx1=0.87 mm, and ΔPm2/Po2 is about 6% when Δθx changes from 0 degrees into 2 degrees as shown in FIG. 21D.

That is to say, to reduce the variation in Pm1/Po1 with Δθx of the semiconductor laser 1, the center 113C of the photosensitive area 113 of the detector 5 may be offset in either +x direction or −x direction because the same effects are achieved in either case. However, to reduce the variation in Pm2/Po2 with Δθx of the semiconductor laser 13 that is arranged in parallel with the semiconductor laser 1 in the x direction, the detector 5 is preferably arranged such that the offset of the center 113C of the photosensitive area 113 of the detector 5 satisfies dB1x>dB2x when rA1>rA2. Then, the Pm1/Po1 variation and the Pm2/Po2 variation can be both reduced sufficiently. In the same way, when rA1<rA2, the detector 5 is preferably arranged such that the offset of the center 113C of the photosensitive area 113 of the detector 5 satisfies dB1x<dB2x. Then, the Pm1/Po1 variation and the Pm2/Po2 variation can be both reduced sufficiently. By using light sources that emit light beams with mutually different wavelengths, the detector 5 may have photosensitive areas of different sizes. That is why these conditions are preferably standardized by the sizes of the photosensitive areas for the respective light sources. Specifically, if (rA1/rB1)>(rA2/rB2), then (dB1x/rB1)>(dB2x/rB2) is preferably satisfied. On the other hand, if (rA1/rB1)<(rA2/rB2), then (dB1x/rB1)<(dB2x/rB2) is preferably satisfied.

The conditions for reducing the variation in Pm/Po with the angle of radiation of the light source to ±6% or less are the same as those already described for first preferred embodiment. That is to say, rA1x, rB1x, dA1x and dB1x preferably satisfy the inequalities dA1x<0.25 rA1x and 0.25 rA1x<dB1x<0.55 rA1x.

Also, as already described for the first preferred embodiment, the center of the photosensitive area of the detector 5 may be offset arbitrarily in the y direction. Accordingly, by offsetting the center of the photosensitive area of the optical power monitoring detector with respect to the center of the far-field pattern defined by the light emitted from the semiconductor laser and to the center of the aperture area of the condenser lens in the y direction, the Pm1/Po1 variation and Pm2/Po2 variation can be both reduced and the intensities of the light beams entering the optical power monitoring detector can be equalized with each other, too.

Furthermore, the optical power monitoring detector may also be shifted in the y direction such that the photosensitive area of the detector is located outside of the aperture area of the condenser lens and outside of the reflective mirror. Then, the light can be guided to the condenser lens without sacrificing the intensity of the light for the purpose of monitoring the optical power.

Various preferred embodiments of the present invention described above can be used effectively in an optical information processor for at least one of reading and writing information optically, and are applicable particularly effectively to an optical information processor such as an optical disk drive including one, two or more light sources, of which the angle of radiation changes with the optical power.

This application is based on Japanese Patent Applications No. 2004-332991 filed on Nov. 17, 2004 and No. 2005-327272 filed Nov. 11, 2005, the entire contents of which are hereby incorporated by reference.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. An optical information processor for at least one of reading information from a storage medium and writing information on a storage medium by irradiating the storage medium with light that has been radiated from a light source, the optical information processor comprising:
   the light source for radiating the light;
   a condensing element for converging the light, radiated from the light source, toward the storage medium; and
   a detector for detecting a portion of the light that has been radiated from the light source,
   wherein in a far-field pattern of the light radiated from the light source, an aperture area A is defined by a part of the light entering the condensing element and a photosensitive area B is defined by another part of the light entering the detector and the light has the narrower angle of radiation in an x direction and the wider angle of radiation in a y direction, respectively, and the center of the photosensitive area B in the x direction is offset with respect to that of the far-field pattern in the x direction.

2. The optical information processor of claim 1, wherein the aperture area A has a width of 2 rAx in the x direction, the photosensitive area B has a width of 2 rBx in the x direction, a distance from the center of the aperture area A in the x direction to the center of light intensity distribution of the far-field pattern in the x direction is dAx, and a distance from the center of the photosensitive area B in the x direction to the center of the light intensity distribution of the far-field pattern in the x direction is dBx, respectively, rAx, rBx, dAx and dBx satisfy rAx>rBx and dAx<dBx.

3. The optical information processor of claim 1, wherein rAx, rBx, dAx and dBx satisfy dAx<0.25 rAx and 0.25 rAx<dBx<0.55 rAx.

4. The optical information processor of claim 2, wherein supposing a distance from the center of the aperture area A in the y direction to the center of the light intensity distribution of the far-field pattern in the y direction is dAy and a distance from the center of the photosensitive area B in the y direction to the center of the light intensity distribution of the far-field pattern in the y direction is dBy, respectively, day and dBy satisfy dBy>dAy.

5. The optical information processor of claim 4, wherein supposing the aperture area A has a width of 2 rAy in the y direction, dBy and rAy satisfy dBy>rAy.

6. The optical information processor of claim 1, further comprising at least one more light source, wherein optical axes defined from the light sources to the condensing element are aligned with each other at least partially.

7. An optical information processor for at least one of reading information from a storage medium and writing information on a storage medium by irradiating the storage medium with light beams that have been radiated from a plurality of light sources, the optical information processor comprising:

first and second light sources;

a condensing element for converging the light beams, radiated from the first and second light sources, toward the storage medium; and a detector for detecting respective portions of the light beams that have been radiated from the first and second light sources, wherein in a first far-field pattern of the light beam radiated from the first light source, an aperture area A1 is defined by a portion of the light beam entering the condensing element and a photosensitive area B1 is defined by another part of the light beam entering the detector and the light beam has the narrower angle of radiation in an x direction and the wider angle of radiation in a y direction, respectively, and the center of the photosensitive area B1 in the x direction is offset with respect to that of the first far-field pattern in the x direction, and wherein in a second far-field pattern of the light beam radiated from the second light source, an aperture area A2 is defined by a portion of the light beam entering the condensing element and a photosensitive area B2 is defined by another part of the light beam entering the detector and the light beam has the narrower angle of radiation in the x direction and the wider angle of radiation in the y direction, respectively, and the center of the photosensitive area B2 in the x direction is offset with respect to that of the second far-field pattern in the x direction.

8. The optical information processor of claim 7, wherein the aperture area A1 has a width of 2 rA1x in the x direction, the photosensitive area B1 has a width of 2 rB1x in the x direction, a distance from the center of the aperture area A1 in the x direction to the center of light intensity distribution of the first far-field pattern in the x direction is dA1x, and a distance from the center of the photosensitive area B1 in the x direction to the center of the light intensity distribution of the first far-field pattern in the x direction is dB1x, respectively, and wherein the aperture area A2 has a width of 2 rA2x in the x direction, the photosensitive area B2 has a width of 2 rB2x in the x direction, a distance from the center of the aperture area A2 in the x direction to the center of light intensity distribution of the second far-field pattern in the x direction is dA2x, and a distance from the center of the photosensitive area B2 in the x direction to the center of the light intensity distribution of the second far-field pattern in the x direction is dB2x, respectively, rA1x, rB1x, dA1x, dB1x, rA2x, rB2x, dA2x and dB2x satisfy rA1x>rB1x, rA2x>rB2x, (rA1x/rB1x)>(rA2x/rB2x) and (dB1x/rB1x)>(dB2x/rB2x).

9. The optical information processor of claim 8, wherein rA1x, rB1x, dA1x and dB1x satisfy dA1x<0.25 rA1x and 0.25 rA1x<dB1x<0.55 rA1x.

10. The optical information processor of claim 8, wherein a distance from the center of the aperture area A1 in the y direction to the center of the light intensity distribution of the first far-field pattern in the y direction is dA1y and a distance from the center of the photosensitive area B1 in the y direction to the center of the light intensity distribution of the first far-field pattern in the y direction is dB1y, respectively, dA1y and dB1y satisfy dB1y>dA1y.

11. The optical information processor of claim 10, wherein the aperture area A1 has a width of 2 rA1y in the y direction, dB1y and rA1y satisfy dB1y>rA1y.

* * * * *

UNITED STATES PATENT AND TRADEMARK OFFICE
CERTIFICATE OF CORRECTION

PATENT NO. : 7,522,484 B2
APPLICATION NO. : 11/274914
DATED : April 21, 2009
INVENTOR(S) : Yuuichi Takahashi It is certified that error appears in the above-identified patent and that said Letters Patent is hereby corrected as shown below:

Title Page, Section (73), line 1, "Panaosnic" should read -- Panasonic --.

Signed and Sealed this

Twenty-eighth Day of July, 2009

JOHN DOLL
*Acting Director of the United States Patent and Trademark Office*